(12) United States Patent
Furuichi

(10) Patent No.: US 12,267,816 B2
(45) Date of Patent: Apr. 1, 2025

(54) COMMUNICATION CONTROL DEVICE, COMMUNICATION DEVICE, AND COMMUNICATION CONTROL METHOD

(71) Applicant: SONY GROUP CORPORATION, Tokyo (JP)

(72) Inventor: Sho Furuichi, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 493 days.

(21) Appl. No.: 17/639,572

(22) PCT Filed: Aug. 31, 2020

(86) PCT No.: PCT/JP2020/032876
§ 371 (c)(1),
(2) Date: Mar. 1, 2022

(87) PCT Pub. No.: WO2021/049353
PCT Pub. Date: Mar. 18, 2021

(65) Prior Publication Data
US 2022/0295481 A1    Sep. 15, 2022

(30) Foreign Application Priority Data
Sep. 9, 2019    (JP) ................................. 2019-163921

(51) Int. Cl.
*H04W 72/0446*    (2023.01)
*H04W 16/14*    (2009.01)
(Continued)

(52) U.S. Cl.
CPC ..... *H04W 72/0446* (2013.01); *H04W 72/541* (2023.01); *H04W 72/56* (2023.01); *H04W 74/02* (2013.01); *H04W 16/14* (2013.01)

(58) Field of Classification Search
CPC .......... H04W 72/0446; H04W 72/541; H04W 72/56; H04W 74/02; H04W 16/14;
(Continued)

(56) References Cited

U.S. PATENT DOCUMENTS

2007/0165589 A1    7/2007    Sakoda
2014/0369245 A1*   12/2014   Pecen ............... H04W 52/0216
                                                           370/311
(Continued)

FOREIGN PATENT DOCUMENTS

JP    2005-151525 A    6/2005

OTHER PUBLICATIONS

International Search Report and Written Opinion of PCT Application No. PCT/JP2020/032876, issued on Nov. 10, 2020, 08 pages of ISRWO.

(Continued)

*Primary Examiner* — Kyaw Z Soe
(74) *Attorney, Agent, or Firm* — CHIP LAW GROUP

(57) ABSTRACT

A communication control device includes: an acquisition unit that acquires information regarding one or more communication devices; a determination unit that determines a medium reservation scheme for the one or more communication devices to share a predetermined channel based on the acquired information; and a notification unit that notifies the communication device of the determined medium reservation scheme.

20 Claims, 30 Drawing Sheets

(51) Int. Cl.
*H04W 72/541* (2023.01)
*H04W 72/56* (2023.01)
*H04W 74/02* (2009.01)

(58) Field of Classification Search
CPC ........... H04W 56/001; H04W 74/0808; H04W 88/12; H04B 7/18504
See application file for complete search history.

(56) References Cited

U.S. PATENT DOCUMENTS

2017/0041801 A1 2/2017 Liu
2019/0141713 A1 5/2019 Cimpu
2021/0329580 A1* 10/2021 Kim .................. H04W 56/0015

OTHER PUBLICATIONS

"CBRS Certified Professional Installer Accreditation Technical Specification", Document WINNF-TS-0247 Version V1.2.0, May 6, 2009, 19 pages.
"Signaling Protocols and Procedures for Citizens Broadband Radio Service (CBRS):Spectrum Access System (SAS)—Citizens Broadband Radio Service Device (CBSD) Interface Technical Specification", Document WINNF-TS-0016, Version V1.2.3, Oct. 31, 2018, 60 pages.
ECC Report 186, "Technical and operational requirements for the operation of white space devices under geo-location approach", Jan. 2013, 155 pages.
"Signaling Protocols and Procedures for Citizens Broadband Radio Service (CBRS): Spectrum Access System (SAS)—SAS Interface Technical Specification", Document WINNF-TS-0096, Version 1.3.1, Jan. 29, 2019, 44 pages.
"Requirements for Commercial Operation in the U.S. 3550-3700 MHZ Citizens Broadband Radio Service Band", Document WINNF-TS-0112, Version V1.7.0, May 6, 2019, 80 pages.
"Operations for Citizens Broadband Radio Service (CBRS):Priority Access License (PAL) Database Technical Specification", Document WINNF-TS-0245, Version V1.0.0, Jul. 26, 2017, 10 pages.
"Spectrum Sharing Committee Policy and Procedure Coordinated Periodic Activities Policy", WINNF-SSC-0008-V1.3.0, 03 pages.
"Prediction procedure for the evaluation of microwave interference between stations on the surface of the Earth at frequencies above about 0.7 GHZ", Recommendation ITU-R P.452-11, 37 Pages.
"Operations for Citizens Broadband Radio Service (CBRS); GAA Spectrum Coordination—Approach 2", Document WINNF-TR-2004, Version V1.0.0, May 16, 2019.
"White Space Database Provider (WSDB) Contract", https://www.ofcom.org.uk/_data/assets/pdf_file/0026/84077/white_space_database_contract_for_operational_use_of_wsds.pdf, 2015, 70 pages.
"Coexistence Methods for Geo-location Capable Devices Operating under General Authorization", IEEE Standard for Information technology—Telecommunications and information exchange between systems—Local and metropolitan area networks—Specific requirements—Part 19: TV White Space Coexistence Methods, 2017.
"Citizens Broadband Radio Service", 8: 47 C.F.R Part 96, Jun. 23, 2015, 14 pages.
"Test and Certification for Citizens Broadband Radio Service (CBRS); Conformance and Performance Test Technical Specification; SAS as Unit Under Test (UUT)", Document WINNF-TS-0061, Version V1.5.1, Apr. 29, 2019 193 pages.
"In the Matter of Unlicensed Use of the 6 GHz Band, Notice of Proposed Rulemaking", FCC, 2019.
Brenner, et al., "Comments of Qualcomm Incorporated", Federal Communications Commission Washington, DC 20554, Sep. 10, 2018, 17 pages.
Brenner, et al.,"Comments of Qualcomm Incorporated" Federal Communications Commission Washington, DC 20554, Feb. 15, 2019, 26 pages.
Zhou Zhenyu et al: "Cloud Miracles: Heterogeneous Cloud RAN for Fair Coexistenence of LTE-U and Wi-Fi in Ultra Dense 5G Networks", IEEE Communications Magazine, IEEE Service Center, Piscataway, US, vol. 56, No. 6, Jun. 1, 2018 (Jun. 1, 2018), pp. 64-71, XP011685536, ISSN: 0163-6804, DOI: 10.1109/MCOM.2018.1700458.

* cited by examiner

| COMMUNICATION DEVICE ID | $N_{m, Interference}$ | $\max_{0 \leq m \leq M-1} \{N_{m, Interference}\}$ | K |
|---|---|---|---|
| A | 1 | | |
| B | 3 | | |
| C | 1 | | |
| D | 4 | 4 | 5 |
| E | 3 | | |
| F | 4 | | |
| G | 2 | | |
| H | 2 | | |

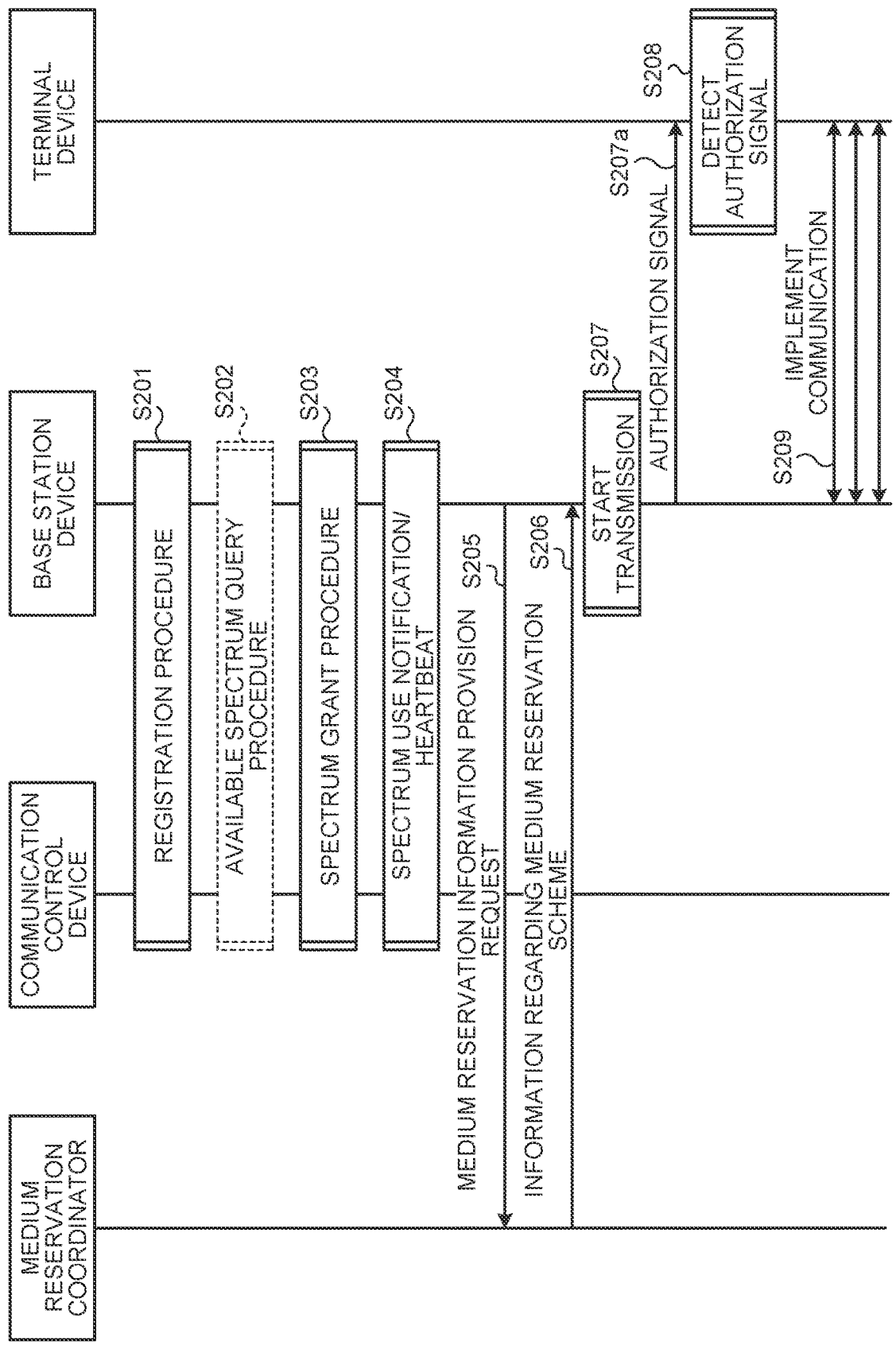

COMMUNICATION CONTROL DEVICE, COMMUNICATION DEVICE, AND COMMUNICATION CONTROL METHOD

CROSS REFERENCE TO RELATED APPLICATIONS

This application is a U.S. National Phase of International Patent Application No. PCT/JP2020/032876 filed on Aug. 31, 2020, which claims priority benefit of Japanese Patent Application No. JP 2019-163921 filed in the Japan Patent Office on Sep. 9, 2019. Each of the above-referenced applications is hereby incorporated herein by reference in its entirety.

FIELD

The present disclosure relates to a communication control device, a communication device, and a communication control method.

BACKGROUND

There is an emerging problem of exhaustion of radio resources available for allocation to radio systems (radio devices). Individual radio bands are already used by incumbent radio systems (radio devices), making it difficult to newly allocate radio resources to the radio systems. In view of this, in recent years, more effective use of radio resources by utilization of cognitive radio technology has started to attract attention. In the cognitive radio technology, radio resources are worked out by using temporally and spatially unused radio spectrum (white space) of an incumbent radio system.

CITATION LIST

Non Patent Literature

Non Patent Literature 1: WINNF-TS-0247-V1.2.0 CBRS Certified Professional Installer Accreditation Technical Specification.
Non Patent Literature 2: WINNF-TS-0016-V1.2.3 Signaling Protocols and Procedures for Citizens Broadband Radio Service (CBRS): Spectrum Access System (SAS)—Citizens Broadband Radio Service Device (CBSD) Interface Technical Specification
Non Patent Literature 3: ECC Report 186, Technical and operational requirements for the operation of white space devices under geo-location approach, CEPT ECC, 2013 January
Non Patent Literature 4: White Space Database Provider (WSDB) Contract, available at https://www.ofcom.org.uk/_data/assets/pdf_file/0026/84077/white_space_database_contract_for_operational_use_of_wsds.pdf
Non Patent Literature 5: WINNF-TS-0096-V1.3.1 Signaling Protocols and Procedures for Citizens Broadband Radio Service (CBRS): Spectrum Access System (SAS)—SAS Interface Technical Specification
Non Patent Literature 6: WINNF-TS-0112-V1.7.0 Requirements for Commercial Operation in the U.S. 3550-3700 MHz Citizens Broadband Radio Service Band
Non Patent Literature 7: IEEE Std 802.19.1aTM-2017 "Coexistence Methods for Geo-location Capable Devices Operating under General Authorization"
Non Patent Literature 8: 47 C.F.R Part 96 Citizens Broadband Radio Service, https://www.ecfr.gov/cgi-bin/text-idx?node=pt47.5.96#se47.5.96
Non Patent Literature 9: WINNF-TS-0245-V1.0.0 Operations for Citizens Broadband Radio Service (CBRS): Priority Access License (PAL) Database Technical Specification
Non Patent Literature 10: WINNF-TS-0061-V1.5.0 Test and Certification for Citizens Broadband Radio Service (CBRS); Conformance and Performance Test Technical Specification; SAS as Unit Under Test (UUT)
Non Patent Literature 11: WINNF-SSC-0008 Spectrum Sharing Committee Policy and Procedure Coordinated Periodic Activities Policy
Non Patent Literature 12: ITU-R P.452-11, "Prediction procedure for the evaluation of microwave interference between stations on the surface of the Earth at frequencies above about 0.7 GHz", https://www.itu.int/dms_pubrec/itu-r/rec/p/R-REC-P.452-11-200304-S!!PDF-E.pdf
Non Patent Literature 13: WINNF-TR-2004-V1.0.0 Operations for Citizens Broadband Radio Service (CBRS); GAA Spectrum Coordination—Approach 2
Non Patent Literature 14: "ET Docket No. 18-295 In the Matter of Unlicensed Use of the 6 GHz Band, Notice of Proposed Rulemaking," FCC, 2018.
Non Patent Literature 15: "Comments of Qualcomm Incorporated", GN Docket No. 14-177 (Sep. 10, 2018)
Non Patent Literature 16: "Comments of Qualcomm Incorporated", ET Docket No. 18-295 (Feb. 15, 2019)

SUMMARY

Technical Problem

In order to further improve efficiency of radio wave utilization, the cognitive radio technology is expected to be used in various frequency bands. For example, the cognitive radio technology is expected to be also used in a newly available unlicensed band. However, in this case, radio systems of various, that is, mutually different standards are expected to start operating in the unlicensed band all at once. This might cause a conflict between different types of systems, and there is a possibility that effective use of radio resources will not be achieved only by management using the cognitive radio technology performed by a communication management device, of the secondary use of spectrum of a communication device under management.

In view of this, the present disclosure proposes a communication control device, a communication device, and a communication control method capable of achieving an effective use of radio resources.

Solution to Problem

To solve the above problem, a communication control device according to the present disclosure includes: an acquisition unit that acquires information regarding one or more communication devices; a determination unit that determines a medium reservation scheme for the one or more communication devices to share a predetermined channel based on the acquired information; and a notification unit that notifies the communication device of the determined medium reservation scheme.

BRIEF DESCRIPTION OF DRAWINGS

FIG. 37 is a sequence diagram illustrating an operation related to medium reservation in a case where a medium reservation coordinator is present.

DESCRIPTION OF EMBODIMENTS

Figure 1:
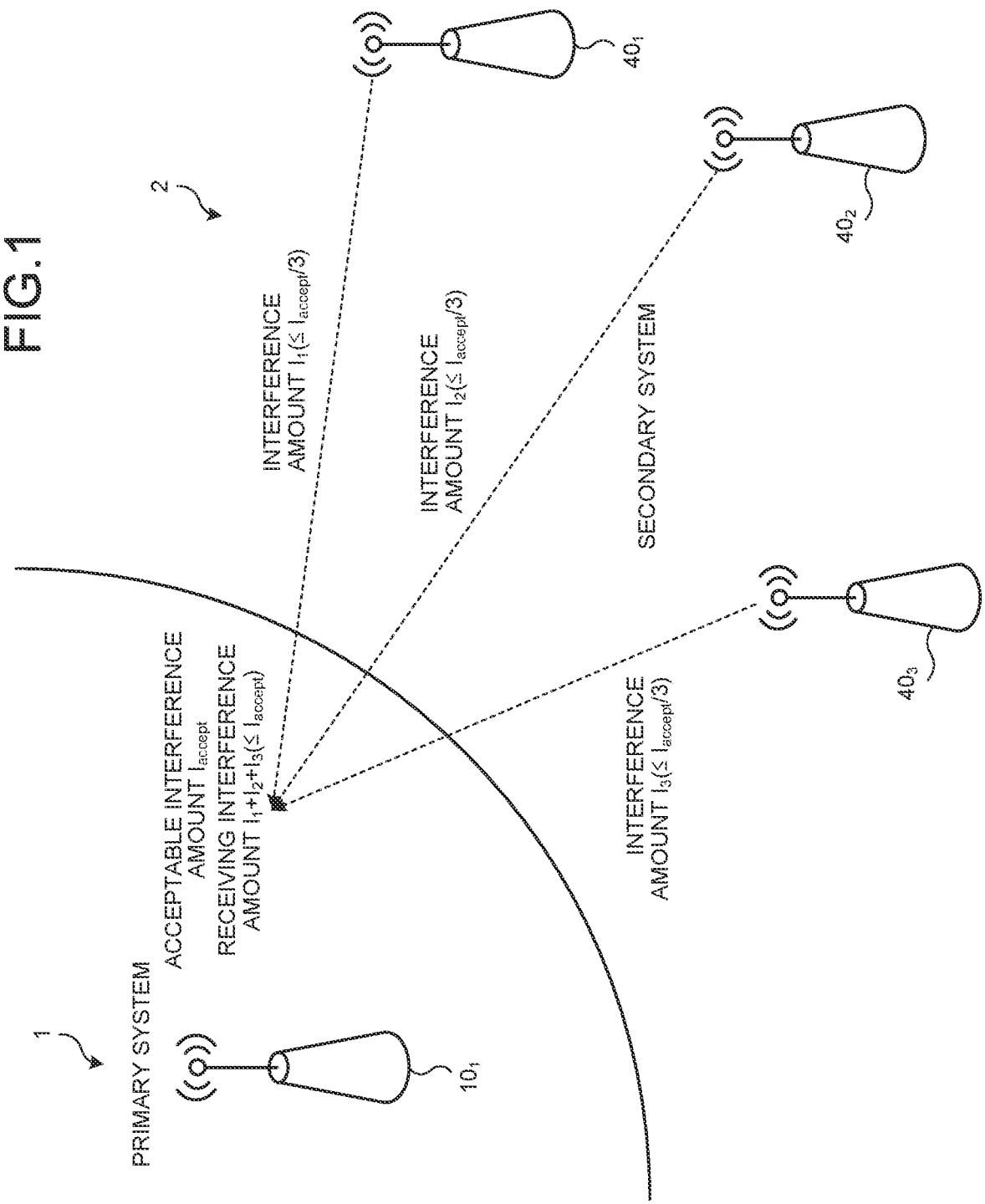
FIG. 1 is a diagram illustrating an example of allocation of an interference margin to each of communication devices constituting a secondary system.

Embodiments of the present disclosure will be described below in detail with reference to the drawings. In each of the following embodiments, the same parts are denoted by the same reference numerals, and a repetitive description thereof will be omitted.

Moreover, in the present specification and the drawings, a plurality of components having substantially the same functional configuration will be distinguished by attaching different numbers or alphabets after the same reference numerals. For example, a plurality of configurations having substantially the same functional configuration is distinguished as necessary, such as communication control devices $60_1$ and $60_2$. Moreover, a plurality of configurations having substantially the same functional configuration is distinguished as necessary, such as communication systems 2A and 2B. However, when it is not particularly necessary to distinguish between the plurality of components having substantially the same functional configuration, only the same reference numeral is given. For example, when there is no need to distinguish between the communication control devices $60_1$ and $60_2$ in particular, they are simply referred to as a communication control device 60. Furthermore, when there is no need to distinguish between the communication systems 2A and 2B in particular, they are simply referred to as a communication system 2.

The present disclosure will be described in the following order.

1. Introduction
　1-1. Control of radio system for achieving spectrum sharing
　1-2. Outline of present embodiment
　1-3. Terms related to spectrum and sharing
2. Configuration of communication system
　2-1. Overall configuration of communication system
　2-2. Configuration of radio wave utilization device
　2-3. Configuration of management device
　2-4. Configuration of terminal device
　2-5. Configuration of base station device
　2-6. Configuration of intermediate device
　2-7. Configuration of communication control device
3. Interference model
4. Primary system protection method
　4-1. Interference margin simultaneous allocation type
　4-2. Interference margin sequential allocation type 5. Description of various procedures
5-1. Registration procedure
5-2. Available spectrum query procedure
5-3. Spectrum grant procedure
5-4. Spectrum use notification/heartbeat
5-5. Supplement to various procedures
5-6. Various procedures related to terminal device
5-7. Procedure occurring between communication control devices
5-8. Representative operation flow
6. Operation related to medium reservation of communication control device
6-1. Units of application for medium reservation scheme
6-2. Determination criteria for medium reservation scheme
6-2-1. Determination criterion 1 (asynchronous channel access)
6-2-2. Determination criterion 2 (synchronous channel access)
6-3. Case of adopting synchronous channel access scheme
6-3-1. Configuration example of synchronization frame
6-3-2. Notification parameter
6-3-3. Allocation of medium reservation slots
6-3-4. Changing slot allocation
6-4. Decision-making
6-4-1. Autonomous decision-making
6-4-2. Centralized decision-making
6-4-3. Distributed decision-making
7. Operation related to medium reservation of base station device
7-1. Case having no function of communication control device
7-2. Case having function of communication control device
8. Operation related to medium reservation of terminal device
9. Sequence related to medium reservation
9-1. Operation related to medium reservation
9-2. Case where there is another entity that determines information
10. Modification
11. Conclusion

1. INTRODUCTION

With recent increase and diversification of radio environments having a mixture of various radio systems and the volume of content transferred via radio communications, there has been an emerging problem of exhaustion of radio resources (for example, frequency/spectrum) available for allocation to the radio systems. However, many radio bands are already used by incumbent radio systems, making it difficult to allocate new radio resources. In view of this, in recent years, more effective use of radio resources by utilization of cognitive radio technology has started to attract attention.

In the cognitive radio technology, radio resources are worked out by utilizing temporally and spatially unused radio spectrum (white space) of the incumbent radio system (for example, by using dynamic spectrum sharing referred to as Dynamic Spectrum Access (DSA)). In the recent United States, for example, with the aim of opening a Federal use band (3.55-3.70 GHz), which overlaps with a frequency band that is worldwide 3GPP bands 42 and 43, to the general public, legislation and standardization of a Citizens Broadband Radio Service (CBRS) utilizing a spectrum sharing technology are accelerating.

Note that the cognitive radio technology contributes not merely to dynamic spectrum sharing but also to improvement of spectrum use efficiency by a radio system. For example, ETSI EN 303 387 and IEEE 802.19.1-2014 define a technology of inter-radio system coexistence technology using unused radio spectrum.

<1-1. Control of Radio System for Achieving Spectrum Sharing>

In general case of spectrum sharing, it is required, by the National Regulatory Authority (NRA) of each country/region, to protect the radio system (primary system) of the primary user licensed or authorized for the use of a frequency band. Typically, an acceptable interference reference value regarding the primary system is defined by the NRA, and the radio system (secondary system) of the secondary user is required to suppress the interference occurring by sharing to a value below the acceptable interference reference value.

In the following description, a "system" represents a set of a plurality of components (devices, modules (components), and the like). At this time, it would not matter whether or not all the components are in the same housing. For example, each of a plurality of devices housed in separate housings and connected via a network or the like, and one device in which a plurality of modules is housed in one housing, is a "system" in each case. That is, a radio system such as a primary system and a secondary system may each be configured by a plurality of devices or may be configured by one device.

In order to achieve spectrum sharing, for example, a communication control device (for example, the spectrum management database) controls communication of the secondary system so as not to give fatal interference to the primary system. The communication control device is a device that manages communication and the like of the communication device. For example, the communication control device is a system for managing radio resources (for example, spectrum), such as a geo-location database (GLDB) and a spectrum access system (SAS). In the present embodiment, the communication control device corresponds to the communication control device 60 described below. The communication control device 60 will be described in detail below.

Here, the primary system is, for example, a system (for example, incumbent systems) that preferentially uses a predetermined frequency band over other systems including the secondary system. In addition, the secondary system is, for example, a system that performs secondary use (for example, dynamic spectrum sharing) of a frequency band used by the primary system. Each of the primary system and the secondary system may include a plurality of communication devices or may include one communication device. The communication control device allocates an interference tolerance to one or a plurality of communication devices constituting the secondary system such that interference aggregation of the one or a plurality of communication devices toward the primary system would not exceed an interference tolerance (also referred to as an interference margin) of the primary system. At this time, the interference tolerance may be an interference amount preliminarily determined by an operator of the primary system, a public organization that manages radio waves, or the like. In the following description, the interference margin refers to the interference tolerance. In addition, interference aggregation may be referred to as aggregated interfering power.

FIG. 1 is a diagram illustrating an example of allocation of an interference margin to each of communication devices constituting a secondary system. In the example of FIG. 1, a communication system 1 is the primary system, while a communication system 2 is the secondary system. The communication system 1 includes a radio wave utilization device $10_1$ and the like. Furthermore, the communication system 2 includes base station devices $40_1$, $40_2$, $40_3$, and the like. Although the example of FIG. 1 is a case where the communication system 1 includes only one radio wave utilization device 10, the communication system 1 may include a plurality of radio wave utilization devices 10. Furthermore, although the example of FIG. 1 is a case where the communication system 2 includes three base station devices 40, the number of base station devices 40 included in the communication system 2 may be less than or more than three. In addition, the radio communication device included in the communication system 2 does not necessarily have to be a base station device. Although the example of FIG. 1 illustrates only one primary system (the communication system 1 in the example of FIG. 1) and only one secondary system (the communication system 2 in the example of FIG. 1), the primary system and the secondary system may each be provided in plurality.

Each of the radio wave utilization device $10_1$ and the base station devices $40_1$, $40_2$, and $40_3$ can transmit and receive radio waves. The interference amount acceptable by the radio wave utilization device $10_1$ is $I_{accept}$. In addition, interference amounts given to predetermined protection points of the communication system 1 (primary system) by the base station devices $40_1$, $40_2$, and $40_3$ are interference amounts $I_1$, $I_2$, and $I_3$, respectively. Here, the protection point is a point of reference regarding interference calculation for protection of the communication system 1.

The communication control device allocates the interference margin $I_{accept}$ to the plurality of base station devices 40 such that interference aggregation to a predetermined protection point of the communication system 1 (receiving interference amount $I_1+I_2+I_3$ illustrated in FIG. 1) would not exceed the interference margin $I_{accept}$. For example, the communication control device allocates the interference margin $I_{accept}$ to each of the base station devices 40 such that the interference amounts $I_1$, $I_2$, and $I_3$ become $I_{accept}/3$, individually. Alternatively, the communication control device allocates the interference margin $I_{accept}$ to each base station device 40 such that the interference amounts $I_1$, $I_2$, and $I_3$ become $I_{accept}/3$ or less, individually. Note that the method of allocating the interference margin is not limited to this example.

The communication control device calculates the maximum transmission power acceptable for each of the base station devices 40 (hereinafter, referred to as maximum allowable transmission power) based on the interference amount that is allocated (hereinafter, referred to as an allocated interference amount). For example, the communication control device calculates the maximum allowable transmission power of each of the base station devices 40 by calculating back from the allocated interference amount based on the propagation loss, the antenna gain, and the like. Subsequently, the communication control device notifies each of the base station devices 40 of information of the calculated maximum allowable transmission power.

<1-2. Outline of Present Embodiment>

Meanwhile, in recent years, a 6 GHz band has attracted attention as a new shared band. For example, as described in Non Patent Literature 14, the FCC has announced that the 5,925-7,125 MHz frequency band is to be newly opened for unlicensed use. In addition, also in Europe, CEPT SE 45 has been examining shared use in the frequency band of 5,925-6,425 MHz.

Regarding an unlicensed band, an issue of coexistence with a wireless LAN (WLAN) operated in a 5 GHz band has been discussed at standardization of Licensed Assisted Access (LAA) using LTE in 3GPP. Standardization of NR unlicensed (NR-U) is also being discussed in the 5G NR, where similar discussion will be presumably conducted. However, the 6 GHz band that is expected to be newly opened in the future is a "greenfield", leading to a possibility that various different radio systems are to be simultaneously started to operate at the opening of the 6 GHz band as an unlicensed band. This leads to a demand for the development of a technology capable of achieving coexistence between heterogeneous radio systems while further increasing spectrum use efficiency to be higher than Listen Before Talk (LBT) that has been conventionally used for coexistence between heterogeneous radio systems.

On the other hand, with the opening the 6 GHz band, the FCC proposes introduction of a system referred to as automated frequency coordination (AFC) for the purpose of assisting secondary use of spectrum. This is a type of spectrum management database introduced in conventional spectrum sharing.

Therefore, in order to improve the spectrum use efficiency, it is important to integrate the management of secondary use of spectrum by the spectrum management database and the technology of coexistence between heterogeneous radio systems.

Figure 2:
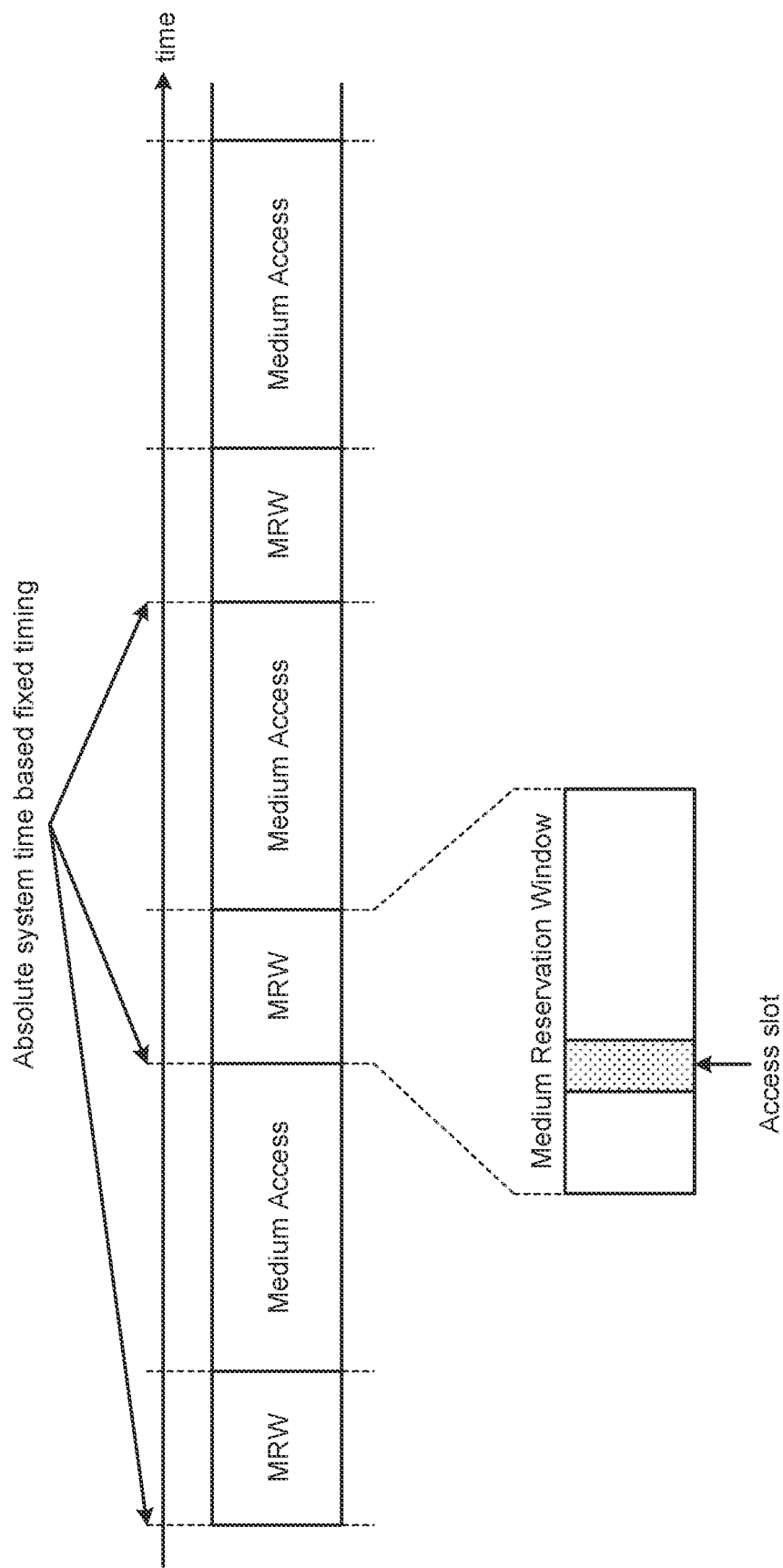
FIG. 2 is a diagram illustrating a synchronized medium reservation window.

As a problem of coexistence between heterogeneous radio systems, Non Patent Literatures 15 and 16 describe synchronization between heterogeneous radio systems. To solve this problem, there is proposed a concept of a synchronized medium reservation window which applies a common synchronization reference among heterogeneous radio systems. FIG. 2 is a diagram illustrating a synchronized medium reservation window. This makes it possible to set a periodic medium reservation period and reserve use of a medium by an access point or a client until the start of the next medium reservation period. Here, an example of the medium is a frequency band. According to Non Patent Literature 15, this can be achieved by controlling a receiver to transmit an active reception detection signal (also referred to as an active reception indication signal) detectable by a neighboring transmitter. On the other hand, an active slot (access slot) in the medium reservation window has flexibility such as random, deterministic, or partially random. However, Non Patent Literature 15 does not disclose these determination methods.

Basically, a communication device such as an access point or a client terminal has no knowledge of information regarding a neighboring communication device. Therefore, it is difficult to improve the spectrum efficiency by applying the technology illustrated in FIG. 2 to the communication device. That is, in an environment in which heterogeneous radio systems coexist in an identical frequency band, all communication devices have to use the conventionally used Listen Before Talk (LBT), which could inevitably result in the shared use of the frequency band with low spectrum use efficiency.

In view of these, in the present embodiment, the communication control device acquires information regarding a plurality of communication devices using a predetermined frequency band (for example, a predetermined unlicensed band). For example, the communication control device acquires information indicating whether the communication devices are capable of synchronization.

Subsequently, based on the acquired information, the communication control device determines a medium reservation scheme for the plurality of communication devices to share a predetermined frequency band. For example, in a case where there is a communication device that cannot be synchronized with another communication device among the plurality of communication devices, the asynchronous channel access scheme (for example, LBT) is determined as the medium reservation scheme. On the other hand, when all the plurality of communication devices are communication devices capable of synchronization, the synchronous channel access scheme (for example, a medium reservation scheme using the above-described medium reservation window) is determined as the medium reservation scheme.

Subsequently, the communication control device notifies the communication device of the determined medium reservation scheme. The communication device uses a predetermined frequency band in the notified medium reservation scheme.

This enables efficient medium reservation, leading to achievement of effective use of radio resources.

<1-3. Terms Related to Spectrum and Sharing>

Following the outline of the present embodiment described above, details of the present embodiment will be described below. Before describing the present embodiment in detail, terms related to spectrum and sharing used in the present embodiment will be clearly defined in order to facilitate understanding of the present embodiment.

The present embodiment assumes that the primary system (for example, the communication system 1) and the secondary system (for example, the communication system 2) are in a dynamic spectrum sharing environment. Hereinafter, terms related to spectrum and sharing will be described by using a Citizens Broadband Radio Service (CBRS) developed by the United States Federal Communications Commission (FCC), as an example. Note that the communication system 1 and the communication system 2 of the present embodiment are not limited to systems in the CBRS.

Figure 3:
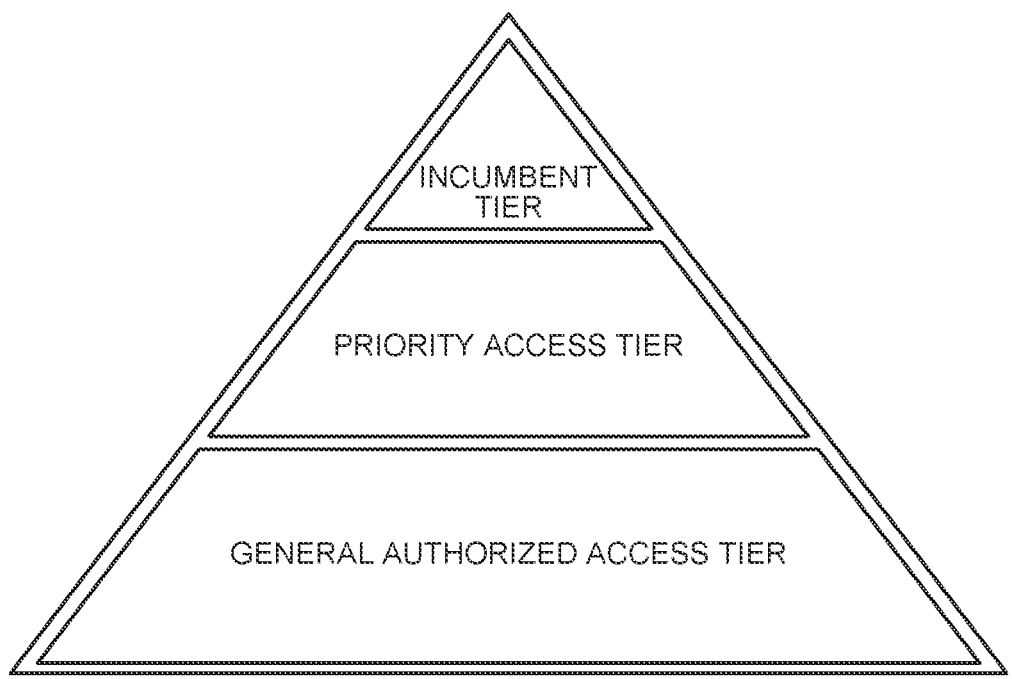
FIG. 3 is a diagram illustrating a hierarchical structure in CBRS.

FIG. 3 is a diagram illustrating a hierarchical structure in the CBRS. As illustrated in FIG. 3, each of users in a frequency band is classified into one of three groups. This group is referred to as a "tier". The three groups are defined as a hierarchical structure constituted with an Incumbent Tier, a Priority Access Tier, and a General Authorized Access Tier. In this hierarchical structure, the Priority Access Tier is located above the General Authorized Access Tier, and the Incumbent Tier is located above the Priority Access Tier. Using the CBRS as an example, for example, a system (incumbent system) located in the Incumbent Tier is a primary system, and systems located in the General Authorized Access Tier and the Priority Access Tier are secondary systems.

The Incumbent Tier is a group of incumbent users of a shared frequency band. The incumbent users defined in the CBRS include: the Department of Defense (DOD), fixed satellite service operators, and Grandfathered Wireless Broadband Licensees (GWBL). The Incumbent Tier is not required to avoid or suppress interference to lower priority tiers, namely, the Priority Access Tier and the General Authorized Access Tier (GAA Tier). In addition, the Incumbent Tier is protected against the interference from the Priority Access Tier and the General Authorized Access Tier (GAA Tier). That is, the user of the "Incumbent Tier" can use the frequency band without considering the presence of other groups.

The Priority Access Tier is a group of users having a license referred to as a Priority Access License (PAL). The Priority Access Tier is required to avoid or suppress interference to a higher priority tier, namely, the Incumbent Tier, but is not required to avoid or suppress interference to the lower priority tier, namely, the General Authorized Access Tier (GAA Tier). In addition, the Priority Access Tier is not protected against the interference from the higher priority tier, namely, the Incumbent Tier, but is protected against the interference from the lower priority tier, namely, the General Authorized Access Tier (GAA Tier).

The General Authorized Access Tier (GAA Tier) is a group of all the other users, that is, users not belonging to any of the Incumbent Tier or the Priority Access Tier. The General Authorized Access Tier is required to avoid or suppress interference to the higher priority tiers, namely, the Incumbent Tier and the Priority Access Tier. In addition, the General Authorized Access Tier (GAA Tier) is not protected against the interference from the higher priority tiers, namely, the Incumbent Tier and the Priority Access Tier. That is, the General Authorized Access Tier (GAA Tier) corresponds to a "tier" that is legislatively required to allow opportunistic spectrum use.

The hierarchical structure is not limited to these definitions. The CBRS typically is supposed to have a three-tier structure, but may have a two-tier structure. Typical examples of this include two-tier structures such as Licensed Shared Access (LSA) and TV band White Space (TVWS). The LSA has employed a structure equivalent to a combination of the Incumbent Tier and the Priority Access Tier. In addition, the TVWS has employed a structure equivalent to a combination of the Incumbent Tier and the General Authorized Access Tier (GAA Tier). In addition, there may be four or more tiers. Specifically, for example, an intermediate tier corresponding to the Priority Access Tier may be further prioritized. In addition, for example, the General Authorized Access Tier (GAA Tier) may be similarly prioritized.

Figure 4:
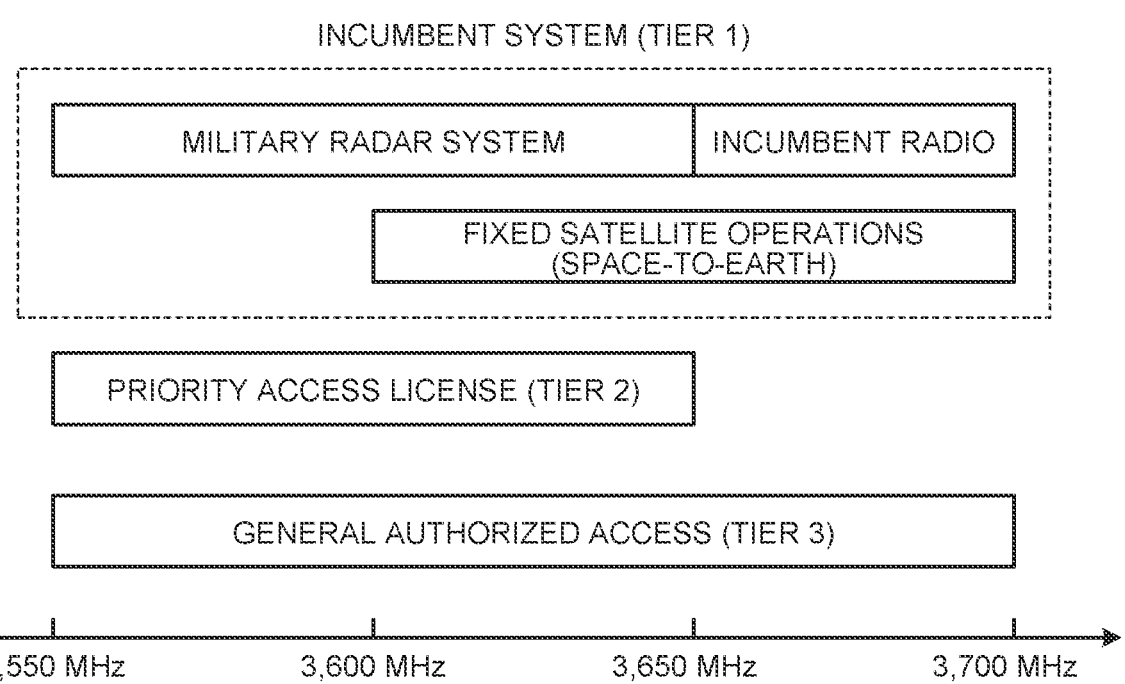
FIG. 4 is a diagram illustrating CBRS bands.

FIG. 4 is a diagram illustrating CBRS bands. In the CBRS described above as an example, the primary system is a military radar system, an incumbent radio system (referred to as a grandfathered wireless system), or a fixed satellite service (space-to-earth). Here, the military radar system is typically an in-ship radar. In addition, the secondary system is a radio network system including base stations and terminals referred to as a Citizens Broadband Radio Service Device (CBSD) and an End User Device (EUD). The secondary system is further prioritized into levels, namely, as a Priority Access License (PAL) for which a shared band can be licensed and a General Authorized Access (GAA) equivalent to unlicensed access. The Tier 1 illustrated in FIG. 4 corresponds to the Incumbent Tier illustrated in FIG. 3. The Tier 2 illustrated in FIG. 4 corresponds to the Priority Access Tier illustrated in FIG. 3. The Tier 3 illustrated in FIG. 4 corresponds to the General Authorized Access Tier illustrated in FIG. 3.

Note that the primary system and the secondary system are not limited to the above examples. For example, a radio system included in the Priority Access Tier may be regarded as a primary system, and a system included in a General Authorized Access Tier (GAA Tier) may be regarded as a secondary system.

In addition, the primary system (communication system 1) of the present embodiment is not limited to the example illustrated in FIG. 4. Other types of radio system may be used as the primary system (communication system 1). For example, other radio systems may be set as the primary system according to the country, region, and frequency band to be applied. For example, the primary system may be a television broadcasting system such as a Digital Video Broadcasting-Terrestrial (DVB-T) system. In addition, the primary system may be a radio system called a Fixed System (FS). In addition, spectrum sharing in other frequency bands may be used. Typical examples of this include LSA and TV band white space (TVWS). Furthermore, the primary system may be a cellular communication system such as Long Term Evolution (LTE) or New Radio (NR). The primary system may also be an aeronautical radio system such as an Aeronautical Radio Navigation Service (ARNS). Note that the primary system is not limited to the above radio system, and may be other types of radio system.

Furthermore, an unused radio spectrum (white space) used by the communication system 2 is not limited to the radio wave of the Federal use band (3.55-3.70 GHz). The communication system 2 may use a radio wave in a frequency band different from the Federal use band (3.55-3.70 GHz) as an unused radio spectrum. For example, when the primary system (communication system 1) is a television broadcasting system, the communication system 2 may be a system that uses a TV white space as an unused radio spectrum. Here, the TV white space refers to a frequency band that is not currently used by the television broadcasting system among frequency channels allocated to the television broadcasting system (primary system). At this time, the TV white space may be a channel that is not currently used according to the area.

The relationship between the communication system 1 and the communication system 2 is not limited to the spectrum sharing relationship in which the communication system 1 is a primary system and the communication system 2 is a secondary system. The relationship between the communication system 1 and the communication system 2 may be a network coexistence relationship between the same or different radio systems using the same spectrum.

As terms used in general regarding spectrum sharing, an incumbent system using a target band is referred to as a primary system, and a system of a secondary user is referred to as a secondary system. However, in a case where the present embodiment is applied to an environment other than the spectrum sharing environment, these systems (primary system and secondary system) may be replaced with a system with different terms. For example, a macro cell in HetNet may be defined as a primary system, and a small cell or a relay station may be defined as a secondary system. In addition, the base station may be defined as a primary system, and a relay UE or a vehicle UE implementing D2D or V2X present in its coverage may be defined as a secondary system. The base station is not limited to a fixed type, and may be a portable/mobile type. In such a case, for example, the communication control device provided by the present invention may be included in a base station, a relay station, a relay UE, or the like.

In the present disclosure, the term "frequency" or "spectrum" may be replaced with other terms. For example, the term "frequency" or "spectrum" may be replaced with terms such as "resource", "resource block", "resource element", "channel", "component carrier", "Bandwidth Part (BWP)", "carrier", "subcarrier", and "beam", or terms having similar meanings.

2. CONFIGURATION OF COMMUNICATION SYSTEM

Hereinafter, a communication system 1000 according to an embodiment of the present disclosure will be described. The communication system 1000 includes a communication system 1 and a communication system 2. The communication system 1 (first radio system) is a radio communication system that conducts radio communication using a predetermined frequency band (primary use). The communication system 2 (second radio system) is a radio communication system that conducts radio communication by performing secondary use of a frequency band used by the communication system 1. For example, the communication system 2 is a radio communication system that performs dynamic spectrum sharing of an unused radio spectrum of the communication system 1. The communication system 2 provides a radio service to a user or a device owned by the user by utilizing a predetermined radio access technology.

The communication systems 1 and 2 may be cellular communication systems such as wideband code division multiple access (W-CDMA), code division multiple access 2000 (cdma2000), LTE, NR, and the like. In the following, "LTE" shall include LTE-advanced (LTE-A), LTE-advanced pro (LTE-A Pro), and evolved universal terrestrial radio access (EUTRA). In addition, "NR" shall include new radio access technology (NRAT) and further EUTRA (FEUTRA).

NR is a radio access technology (RAT) as next generation (fifth generation) following LTE. The NR is a radio access technology that can support various use cases including enhanced mobile broadband (eMBB), massive machine type communications (mMTC), and Ultra-Reliable and Low Latency Communications (URLLC).

Note that the communication systems 1 and 2 are not limited to the cellular communication systems. For example, the communication system 2 may be other radio communication systems such as a wireless local area network (wireless LAN) system, a television broadcasting system, an aeronautical radio system, or a space radio communication system.

In the present embodiment, it is defined that the communication system 1 is a primary system, and the communication system 2 is a secondary system. As described above, the communication system 1 and the communication system 2 may each be provided in plurality. Although the example of FIG. 1 is a case where the communication system 1 includes one radio wave utilization device 10 (radio wave utilization device 10₁ illustrated in FIG. 1), the communication system 1 may include a plurality of radio wave utilization devices 10 as described above. The configuration of the radio wave utilization device 10 may be the same as or different from the configuration of a base station device 40 or a terminal device 30 described below.

<2-1. Overall Configuration of Communication System>

The communication system 1000 typically includes the following entities.

Communication devices (for example, a radio wave utilization device, a base station device, or an intermediate device)

Terminal device

Management device (for example, communication control device)

The following description is a case where the entities working as the communication devices are assumed to be the radio wave utilization device 10, the base station device 40, and an intermediate device 50. However, the entities working as the communication devices are not limited to these devices, and may be other communication devices (for example, a management device 20, the terminal device 30, and the communication control device 60). For example, an external device to be described below may be regarded as a part of the communication system 1000. Note that the external device need not be a part of the communication system 1000. Furthermore, the terminal device 30 may be regarded as an external device.

Figure 5:
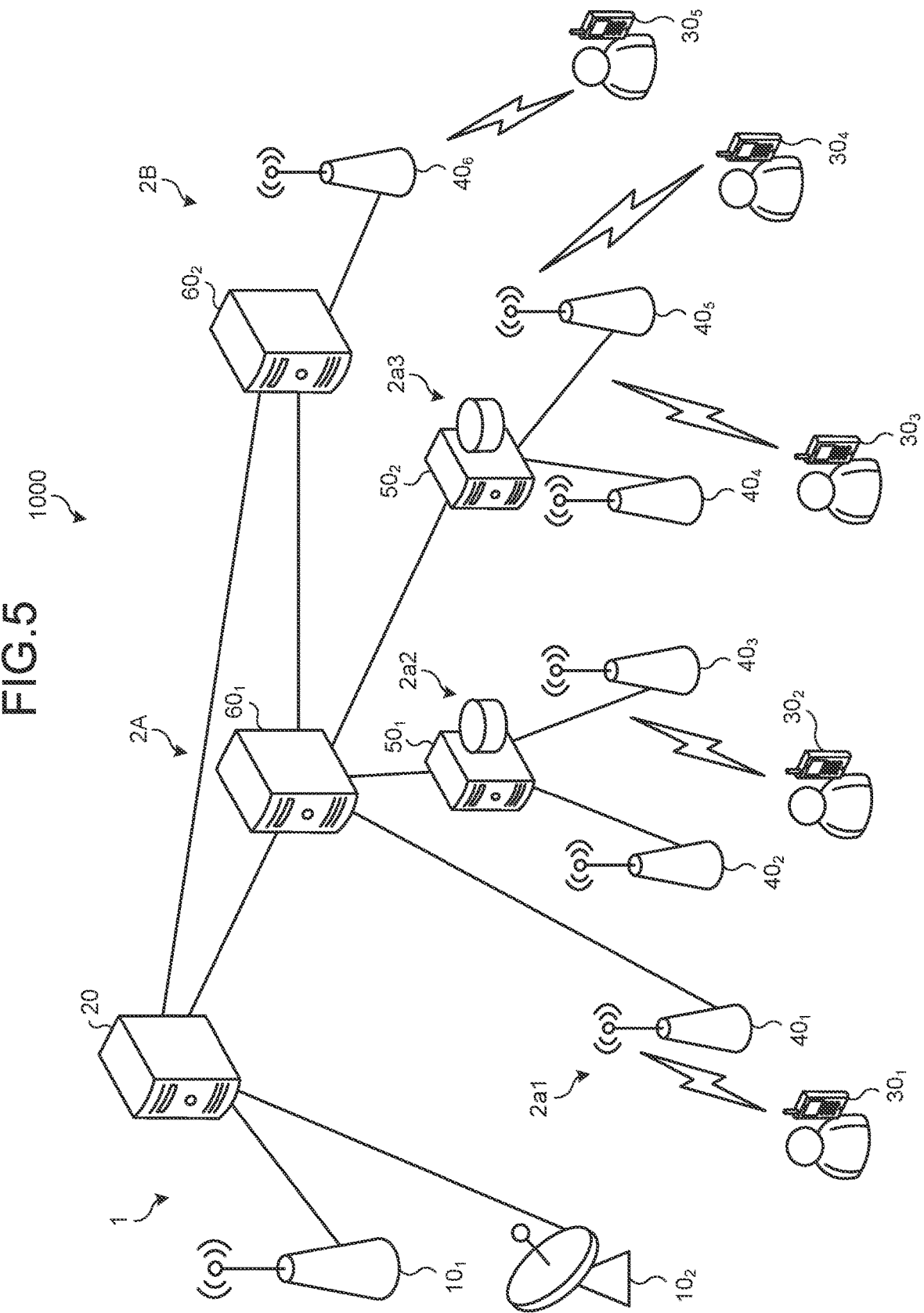
FIG. 5 is a diagram illustrating a configuration example of a communication system according to an embodiment of the present disclosure.

FIG. 5 is a diagram illustrating a configuration example of the communication system 1000 according to an embodiment of the present disclosure. As described above, the communication system 1000 includes the communication system 1 and the communication system 2. Note that the device in the figure can also be considered as a device in a logical sense. That is, parts of the device in the drawing may be partially actualized by a virtual machine (VM), a container, a docker, or the like, and they may be implemented on physically the same hardware.

The communication system 1 includes the radio wave utilization device 10 and the management device 20. In the example of FIG. 5, the communication system 1 includes the radio wave utilization devices $10_1$ and $10_2$ and the management device 20 that manages the radio wave utilization devices $10_1$ and $10_2$. Note that the communication system 1 does not necessarily have to include the management device 20. Furthermore, the communication system 1 may include a plurality of radio wave utilization devices 10 or may include only one radio wave utilization device. In the example of FIG. 5, each of the radio wave utilization devices $10_1$ and $10_2$ can be regarded as one communication system 1.

The communication system 2 includes the terminal device 30, the base station device 40, the intermediate device 50, and the communication control device 60. In the example of FIG. 5, the communication system 2 is described as a communication system 2A and a communication system 2B. The communication system 2A includes a communication system 2$a$1, a communication system 2$a$2, and a communication system 2$a$3. The communication system 2$a$1 includes a terminal device $30_1$ and a base station device $40_1$; the communication system 2$a$2 includes a terminal device $30_2$, base station devices $40_2$ to $40_3$, and an intermediate device $50_1$; and the communication system 2$a$3 includes terminal devices $30_2$ to $30_4$, base station devices $40_4$ to $40_5$, and an intermediate device $50_2$. The communication system 2B includes a terminal device $30_5$ and a base station device $40_6$.

Note that the communication system 2 does not necessarily have to include the communication control device 60. To describe by using the example of FIG. 5, each of the communication system 2$a$2 and the communication system 2$a$3 having an external communication control device 60 may be regarded as one communication system 2. Furthermore, the communication system 2 does not necessarily have to include the intermediate device 50. In the example of FIG. 5, the communication system 2$a$1 without the intermediate device 50 may be regarded as one communication system 2.

With cooperative operations of the devices (for example, communication devices such as radio communication devices) constituting the communication systems 1 and 2, the communication systems 1 and 2 provide radio services to a user or a device possessed by the user. The radio communication device is a device having a function of radio communication. In the example of FIG. 5, the radio communication device corresponds to the radio wave utilization device 10, the base station device 40, and the terminal device 30.

Note that the intermediate device 50 and the communication control device 60 may have a wireless communication function. In this case, the intermediate device 50 and the communication control device 60 can also be regarded as radio communication devices. In the following description, a radio communication device may be simply referred to as a communication device. The communication device is not limited to a radio communication device, and for example, a device capable of wired communication alone and not equipped with a wireless communication function can also be regarded as a communication device.

In the present embodiment, the concept of the "communication device" includes not only a portable mobile device (for example, a terminal device) such as a mobile terminal but also a device installed in a structure or a mobile body. The structure or a mobile body itself may be regarded as a communication device. In addition, the concept of the communication device includes not only a terminal device but also a base station device and a relay device. The communication device is a type of processing device and information processing device. The description of the "communication device" in the following description can be appropriately rephrased as a "transmission device" or a "reception device". In the present embodiment, the concept of "communication" shall include "broadcasting". In this case, the description of the "communication device" can be appropriately rephrased as a "broadcasting device". Accordingly, the description of the "communication device" may be appropriately rephrased as a "transmission device" or a "reception device".

The communication system 2 may include a plurality of the terminal devices 30, a plurality of the base station devices 40, a plurality of the communication control devices 60, and a plurality of the intermediate devices 50. In the example of FIG. 5, the communication system 2 includes terminal devices $30_1$, $30_2$, $30_3$, $30_4$, $30_5$, and the like, as the terminal device 30. Furthermore, the communication system 2 includes base station devices $40_1$, $40_2$, $40_3$, $40_4$, $40_5$, $40_6$, and the like, as the base station device 40. The communication system 2 includes communication control devices $60_1$, $60_2$, and the like, as the communication control device 60.

In the following description, a radio communication device may be referred to as a radio system. For example, each of the terminal devices $30_1$ to $30_5$ is one radio system. In addition, each of the radio wave utilization device 10 and the base station devices $40_1$ to $40_6$ is one radio system. In the following description, the communication system 1 is referred to as a first radio system. However, each of one or a plurality of radio wave utilization devices 10 included in the communication system 1 may be regarded as the first radio system. In the following description, each of one or a plurality of base station devices 40 included in the communication system 2 is referred to as a second radio system. However, the communication system 2 itself may be regarded as a second radio system, or each of one or the plurality of terminal devices 30 included in the communication system 2 may be regarded as a second radio system. When the intermediate device 50 and the communication control device 60 have a wireless communication function, each of the intermediate devices 50 or each of the communication control devices 60 may be regarded as the second radio system.

Note that the radio system may be one system including a plurality of communication devices including at least one radio communication device. For example, a system including one or a plurality of base station devices 40 and one or a plurality of terminal devices 30 under the base station devices 40 may be regarded as one radio system. Furthermore, the communication system 1 and the communication system 2 can each be regarded as one radio system. In the following description, a communication system including a plurality of communication devices including at least one radio communication device may be referred to as a radio communication system or simply as a communication system. Note that one system including a plurality of communication devices including one radio communication device may be regarded as the first radio system or the second radio system.

In the present embodiment, a system represents a set of a plurality of components (devices, modules (components), or the like). At this time, all the components constituting the system may be or need not be in the same housing. For example, a plurality of devices housed in separate housings and connected by wired and/or wireless connection is defined as one system. In addition, one device having a plurality of modules housed in one housing is also one system.

[Radio Wave Utilization Device]

The radio wave utilization device 10 is a radio communication device constituting the communication system 1 (primary system). The radio wave utilization device 10 may be a radio wave emission device such as a radar or a reflected wave reception device. As described above, the primary system is, for example, a military radar system, an incumbent system (for example, a television broadcasting system or an incumbent cellular communication system), or a fixed satellite service system.

When the communication system 1 is a military radar system, the radio wave utilization device 10 is an in-ship radar, for example. When the communication system 1 is a television broadcasting system, the radio wave utilization device 10 is a broadcasting station (broadcasting station as a facility) such as a broadcasting relay station, for example. When the communication system 1 is a fixed satellite service system, the radio wave utilization device 10 is a parabolic antenna that receives radio waves from an artificial satellite, for example. Note that the radio wave utilization device 10 is not limited to these devices. For example, when the communication system 1 is an incumbent cellular communication system, the radio wave utilization device 10 may be a base station device.

Similarly to the base station device 40 to be described below, the radio wave utilization device 10 may be capable of communicating with other communication devices using a radio access technology. Note that the radio access technology used by the radio wave utilization device 10 may be a cellular communication technology or a wireless LAN technology. Note that the radio access technology used by the base station device 40 is not limited thereto, and may be other radio access technologies. For example, the radio access technology used by the radio wave utilization device 10 may be a low power wide area (LPWA) communication technology. Here, the LPWA communication is communication conforming to the LPWA standard. Examples of the LPWA standard include ELTRES, ZETA, SIGFOX, LoRaWAN, and NB-IoT. Naturally, the LPWA standard is not to be limited thereto, and may be other LPWA standards. In addition, the radio communication used by the radio wave utilization device 10 may be radio communication using millimeter waves. Furthermore, the radio communication used by the radio wave utilization device 10 may be radio communication using radio waves or wireless communication (optical wireless communication) using infrared rays or visible light.

In addition, the configuration of the radio wave utilization device 10 may be similar to the configuration of the terminal device 30 or the base station device 40 described below.

[Management Device]

The management device 20 is a device that manages the radio wave utilization device 10. For example, the management device 20 is a server or a database owned by an operator or an administrator of the communication system 1.

The management device 20 may be a server or a database owned by a public organization. For example, the management device 20 may be a database (for example, a regulatory database) managed and operated by a national or regional radio administration agency. Examples of the regulatory database include Universal Licensing System (ULS) operated by Federal Communications Commissions (FCC).

In addition, when the communication system 1 is an incumbent cellular communication system, the management device 20 may be a device that manages a radio network. For example, the management device 20 may be a device that functions as a Mobility Management Entity (MME), an Access and Mobility Management Function (AMF), or Session Management Function (SMF).

When the communication system 2 constitutes a network including the radio wave utilization device 10 as one of nodes, the management device 20 may be a network manager that integrally controls the radio wave utilization device 10 in the network, for example.

Note that the management device 20 is not limited to these examples. The radio wave utilization device 10 may have the function of the management device 20. In this case, the radio wave utilization device 10 can be regarded as the management device 20.

In addition, the management device 20 may have a function of a communication control device. In this case, the management device 20 can be regarded as the communication control device 60.

[Terminal Device]

The terminal device 30 is a communication device having a communication function. The terminal device 30 is typically a communication device such as a smartphone. The terminal device 30 may be a user terminal such as a mobile phone, a smart device (smartphone or tablet), a wearable terminal, an Internet of Things (IoT) device, a personal digital assistant (PDA), or a personal computer. Furthermore, the terminal device 30 may be a business camera equipped with a communication function, or may be a motorcycle, a moving relay vehicle, or the like on which a communication device such as a field pickup unit (FPU) is mounted. The terminal device 30 may be a machine to machine (M2M) device or an internet of things (IoT) device. The terminal device may also be referred to as User Equipment, User Terminal, User Station, Mobile Terminal, Mobile Station, or the like. Furthermore, the terminal device 30 may also be referred to as terms such as MTC UE, NB-IoT UE, or Cat.M UE, for example.

Furthermore, the terminal device 30 may be capable of sidelink communication with another terminal device 30. When performing sidelink communication, the terminal device 30 may be able to use an automatic retransmission technology such as hybrid automatic repeat request (Hybrid ARQ (HARQ)). The radio communication (including sidelink communication) used by the terminal device 30 may be radio communication using radio waves or wireless communication (optical wireless communication) using infrared rays or visible light.

Furthermore, the terminal device 30 may be a mobile device. Here, the mobile device is a movable radio communication device. At this time, the terminal device 30 may be a radio communication device installed on a mobile body, or may be the mobile body itself. For example, the terminal device 30 may be a vehicle that moves on a road, such as an automobile, a bus, a truck, or a motorbike, or may be a radio communication device mounted on the vehicle. The mobile body may be a mobile terminal, or may be a mobile body that moves on land (on the ground in a narrow sense), in the ground, on water, or under water. Furthermore, the mobile body may be a mobile body that moves inside the atmosphere, such as a drone or a helicopter, or may be a mobile body that moves outside the atmosphere, such as an artificial satellite.

The terminal device 30 may perform communication while being simultaneously connected to a plurality of base station devices or a plurality of cells. For example, when one base station device supports a communication area via a plurality of cells (for example, pCell and sCell), it is possible to bundle the plurality of cells and communicate between the base station device 40 and the terminal device 30 by using a carrier aggregation (CA) technology, a dual connectivity (DC) technology, or a multi-connectivity (MC) technology. Alternatively, the terminal device 30 and the plurality of base station devices 40 can communicate with each other by a Coordinated Multi-Point Transmission and Reception (CoMP) technology via cells of different base station devices 40.

Note that the terminal device 30 does not need to be used by a person. The terminal device 30 may be a sensor installed in a machine or a building of a factory, such as a sensor used for communication referred to as machine type communication (MTC). The terminal device 30 may be a machine to machine (M2M) device or an internet of things (IoT) device. Furthermore, the terminal device 30 may be a device having a relay communication function as represented by Device-to-Device (D2D) and Vehicle-to-everything (V2X). Furthermore, the terminal device 30 may be a device referred to as Customer Premises Equipment (CPE) used in a radio backhaul or the like. Furthermore, the terminal device 30 may be a radio communication device installed on a mobile body, or may be the mobile body itself.

[Base Station Device]

The base station device 40 (second radio system) is a radio communication device that performs radio communication with the terminal device 30 or other communication devices (other base station devices 40 or other intermediate devices 50). The base station device 40 is a type of communication device. The base station device 40 is, for example, a device corresponding to a radio base station (also referred to as Base Station, Node B, eNB, gNB, etc.) or a radio access point. When the base station device 40 is a radio access point, the base station device 40 may be referred to as non-3GPP access. The base station device 40 may be a radio relay station (also referred to as a Relay Node). Furthermore, the base station device 40 may be an on-road base station device such as a Road Side Unit (RSU). Furthermore, the base station device 40 may be an optical link device referred to as a Remote Radio Head (RRH). Furthermore, the base station device 40 may be a receiving station device such as a field pickup unit (FPU). In addition, the base station device 40 may be an Integrated Access and Backhaul (IAB) donor node or an IAB relay node that provides a radio access channel and a radio backhaul channel by using time division multiplexing, frequency division multiplexing, or space division multiplexing.

Note that the radio access technology used by the base station device 40 may be a cellular communication technology or a wireless LAN technology. Note that the radio access technology used by the base station device 40 is not limited thereto, and may be other radio access technologies. For example, the radio access technology used by the base station device 40 may be a low power wide area (LPWA) communication technology. Here, the LPWA communication is communication conforming to the LPWA standard. Examples of the LPWA standard include ELTRES, ZETA, SIGFOX, LoRaWAN, and NB-IoT. Naturally, the LPWA standard is not to be limited thereto, and may be other LPWA standards. In addition, the radio communication used by the base station device 40 may be radio communication using millimeter waves. Furthermore, the radio communication used by the base station device 40 may be radio communication using radio waves or wireless communication (optical wireless communication) using infrared rays or visible light.

In the present embodiment, a base station of a radio communication system may be referred to as a base station device. Note that the radio access technology used by the base station device 40 may be a cellular communication technology or a wireless LAN technology. Note that the radio access technology used by the base station device 40 is not limited thereto, and may be other radio access technologies. Furthermore, the radio communication used by the base station device 40 may be radio communication using radio waves or wireless communication (optical wireless communication) using infrared rays or visible light.

The base station device 40 is not necessarily to be fixed, and may be installed in a moving object such as an automobile. Furthermore, the base station device 40 does not necessarily need to exist on the ground. The communication device function may be provided on an object existing in the air or space, such as an aircraft, a drone, a helicopter, or a satellite, or on an object existing on the sea or under the sea, such as a ship or a submarine. In such a case, the base station device 40 can perform radio communication with another fixedly installed communication device.

The concept of the base station device (also referred to as a base station) includes not only a donor base station but also a relay base station (also referred to as a relay station or a relay station device). The concept of a base station also includes an access point. Furthermore, a base station conceptually includes not only a structure having a function of a base station but also a device installed in the structure.

Examples of the structure include a building such as an office building, a house, a steel tower, a station facility, an airport facility, a port facility, or a stadium. A structure conceptually includes not only buildings but also non-building structures such as tunnels, bridges, dams, fences, and steel columns, as well as facilities such as cranes, gates, and windmills. In addition, a structure conceptually includes not only land-based (ground-based, in a narrow sense) structures or underground structures but also structures on the water, such as a jetty and a mega-float, and underwater structures such as an ocean observation facility.

The base station device 40 may be a donor station or a relay station. In a case where the base station device 40 is a relay station, there is no limitation regarding the device on which the base station device 40 is mounted as long as the function of relay is satisfied. For example, the base station device 40 may be mounted on a terminal device such as a smartphone, may be mounted on an automobile or a human-powered vehicle, may be mounted on a balloon, an airplane, or a drone, or on a home appliance such as a television, a game machine, an air conditioner, a refrigerator, or a lighting fixture. Naturally, these devices themselves may be regarded as the base station device 40.

The base station device 40 may be a fixed station or a mobile station. The mobile station is a radio communication device (for example, a base station device) configured to be movable. At this time, the base station device 40 may be a device installed on a mobile body, or may be the mobile body itself. For example, a relay station device having mobility can be regarded as the base station device 40 as a mobile station. In addition, a device designed to have mobility, such as a vehicle, a drone, or a smartphone, and having a function of a base station device (at least a part of the function of a base station device) also corresponds to the base station device 40 as a mobile station.

Here, the mobile body may be a mobile terminal such as a smartphone or a mobile phone. The mobile body may be a mobile body that moves on the land (ground in a narrow sense) (for example, a vehicle such as an automobile, a bicycle, a bus, a truck, a motorbike, a train, or a linear motor car), or a mobile body (for example, subway) that moves under the ground (for example, through a tunnel).

The mobile body may be a mobile body that moves on the water (for example, a ship such as a passenger ship, a cargo ship, and a hovercraft), or a mobile body that moves underwater (for example, a submersible ship such as a submersible boat, a submarine, or an unmanned submarine).

Furthermore, the mobile body may be a mobile body that moves in the atmosphere (for example, an aircraft (also referred to as an aerial vehicle) such as an airplane, an airship, or a drone), or may be a mobile body that moves outside the atmosphere (for example, an artificial astronomical object such as an artificial satellite, a spaceship, a space station, or a spacecraft). A mobile body moving outside the atmosphere can be rephrased as a space mobile body.

Furthermore, the base station device 40 may be a terrestrial base station device (ground station device) installed on the ground. For example, the base station device 40 may be a base station device arranged in a structure on the ground, or may be a base station device installed in a mobile body moving on the ground. More specifically, the base station device 40 may be an antenna installed in a structure such as a building and a signal processing device connected to the antenna. Note that the base station device 40 may be a structure or a mobile body itself. The "ground" represents not only a land (ground in a narrow sense) but also a ground or terrestrial in a broad sense including underground, above-water, and underwater.

Note that the base station device 40 is not limited to the terrestrial base station device. The base station device 40 may be a non-terrestrial base station device (non-terrestrial station device) capable of floating in the air or space. For example, the base station device 40 may be an aircraft station device or a satellite station device.

The aircraft station device is a radio communication device capable of floating in the atmosphere (including stratosphere), such as an aircraft. The aircraft station device may be a device mounted on an aircraft or the like, or may be an aircraft itself. The concept of the aircraft includes not only heavy aircraft such as an airplane and a glider but also light aircraft such as a balloon and an airship. In addition, the concept of an aircraft includes not only a heavy aircraft and a light aircraft but also a rotorcraft such as a helicopter and an auto-gyro. Note that the aircraft station device (or an aircraft on which an aircraft station device is mounted) may be an unmanned aerial vehicle such as a drone.

Note that the concept of the unmanned aerial vehicle also includes an unmanned aircraft system (UAS) and a tethered UAS. The concept of unmanned aerial vehicles also includes a Lighter-than-Air (LTA) unmanned aircraft system (UAS) and a Heavier-than-Air (HTA) unmanned aircraft system (UAS). Other concepts of unmanned aerial vehicles also include High Altitude Platforms (HAPs) unmanned aircraft system (UAS).

The satellite station device is a radio communication device capable of floating outside the atmosphere. The satellite station device may be a device mounted on a space mobile body such as an artificial satellite, or may be a space mobile body itself. The satellite serving as the satellite station device may be any of a low earth orbiting (LEO) satellite, a medium earth orbiting (MEO) satellite, a geostationary earth orbiting (GEO) satellite, or a highly elliptical orbiting (HEO) satellite. Accordingly, the satellite station device may be a device mounted on a low earth orbiting satellite, a medium earth orbiting satellite, a geostationary earth orbiting satellite, or a highly elliptical orbiting satellite.

As described above, the base station device 40 may be a relay station device. The relay station device is an aeronautical station or an earth station, for example. The relay station device can be regarded as a type of the above-described relay device. The aeronautical station is a radio station installed on the ground or a mobile body moving on the ground in order to communicate with an aircraft station device. Furthermore, the earth station is a radio station located on the earth (including air) in order to communicate with the satellite station device. The earth station may be a large earth station or a small earth station such as a very small aperture terminal (VSAT).

Note that the earth station may be a VSAT control earth station (also referred to as a master station or a HUB station) or may be a VSAT earth station (also referred to as a slave station). Furthermore, the earth station may be a radio station installed in a mobile body moving on the ground. Examples of an earth station mounted on a ship include Earth Stations on board Vessels (ESV). Furthermore, the earth station may include an aircraft earth station that is installed in an aircraft (including a helicopter) and that communicates with a satellite station. Furthermore, the earth station may include an aeronautical earth station that is installed on a mobile body moving on the ground and that communicates with the aircraft earth station via a satellite station. Note that the relay station device may be a mobile radio station that communicates with a satellite station or an aircraft station.

The coverage of the base station device 40 may be large such as a macro cell or small such as a pico cell. Needless to say, the coverage of the base station device 40 may be extremely small such as a femto cell. Furthermore, the base station device 40 may have a beamforming capability. In this case, the base station device 40 may form a cell or a service area for each beam.

The base station device 40 can be utilized, operated, and/or managed by various entities. Assumable examples of the base station device 40 include: a mobile network operator (MNO), a mobile virtual network operator (MVNO), a mobile virtual network enabler (MVNE), a neutral host network (NHN) operator, an enterprise, an educational institution (incorporated educational institutions, boards of education of local governments, and the like), a real estate (building, apartment, etc.) administrator, or an individual. Note that the subject of use, operation, and/or management of the base station device 40 is not limited thereto.

The base station device 40 may be installed and/or operated by one business operator, or may be installed and/or operated by one individual. Note that the installation/operation subject of the base station device 40 is not limited thereto. For example, the base station device 40 may be installed and operated by a plurality of business operators or a plurality of individuals in cooperation. Furthermore, the base station device 40 may be a shared facility used by a plurality of business operators or a plurality of individuals. In this case, installation and/or operation of the facility may be performed by a third party different from the user.

The base station device 40 operated by business operators is typically connected to the Internet via a core network. Furthermore, operation management and maintenance of the base station device 40 is performed by a function referred to as Operation, Administration & Maintenance (OA & M). Incidentally, the communication system 2 can include a network manager that integrally controls the base station device 40 in the network, for example.

In a case where the radio access technology used by the base station device 40 is a cellular communication technology, each of the plurality of base station devices 40 may form a cell. The cell provided by the base station device 40 is referred to as a serving cell, for example. The serving cell may include a primary cell (pCell) and a secondary cell (sCell). When the dual connectivity is provided to the UE (for example, the terminal device 30), the pCell and the sCell(s) provided by a master node (MN) are referred to as a master cell group. Examples of dual connectivity include EUTRA-EUTRA Dual Connectivity, EUTRA-NR Dual Connectivity (ENDC), EUTRA-NR Dual Connectivity with 5GC, NR-EUTRA Dual Connectivity (NEDC), and NR-NR Dual Connectivity.

Furthermore, the serving cell may include a Primary Secondary Cell or Primary SCG Cell (PSCell). That is, in a case where dual connectivity is provided to the UE, the PSCell and the sCell(s) provided by a secondary node (SN) are referred to as Secondary Cell Group (SCG).

One downlink component carrier and one uplink component carrier may be associated with one cell. In addition, the system bandwidth corresponding to one cell may be divided into a plurality of bandwidth parts (BWPs). In this case, one or a plurality of BWPs may be configured for the UE, and one BWP may be used for the UE as an active BWP. In addition, radio resources (for example, a frequency band, a numerology (subcarrier spacing), and a slot format (slot configuration)) usable by the terminal device 30 may be different for each cell, each component carrier, or each BWP. Furthermore, one base station device 40 may provide a plurality of cells.

[Intermediate Device]

The intermediate device 50 is a device that communicates with the communication control device 60 substituting (representing) one or a plurality of communication devices (for example, the base station device 40). For example, the intermediate device 50 is a proxy device (proxy system). The intermediate device 50 is also a type of communication device.

The intermediate device 50 may be a domain proxy (DP) defined in Non Patent Literature 2 and the like. Here, the DP refers to an entity that communicates with a communication control device such as SAS instead of each of a plurality of CBSDs, or an entity that communicates with a communication control device such as SAS instead of a network including a plurality of CBSDs. The intermediate device 50 is not limited to the DP defined in Non Patent Literature 2 as long as it has a function of communicating with the communication control device 60 substituting (representing) one or a plurality of communication devices. A network manager that integrally controls the base station device 40 in the network may be regarded as the intermediate device 50.

Note that the proxy system may include one device or a plurality of devices. Communication between the intermediate device 50 and the base station device 40 may be wired communication or wireless communication. Similarly, the communication between the intermediate device 50 and the communication control device 60 may be wired communication or wireless communication.

The communication device substituted (or represented) by the intermediate device 50 is not limited to the base station device 40, and may be the terminal device 30, for example. In the following description, one or a plurality of communication devices (for example, one or a plurality of base station devices 40) substituted (or represented) by the intermediate device 50 will sometimes be referred to as subordinate communication devices (for example, the subordinate base station device 40).

[Communication Control Device]

The communication control device 60 is a device that manages the base station device 40. For example, the communication control device 60 is a device that controls radio communication of the base station device 40. For example, the communication control device 60 is a device that determines communication parameters (also referred to as operational parameters) to be used by the base station device 40 and gives permission or an instruction to the base station device 40.

At this time, the communication control device 60 may be a network manager that integrally controls radio devices within the network. In an example of definition of ETSI EN 303 387 or IEEE 802.19.1-2014, the communication control device 60 may be a control device such as a Spectrum Manager/Coexistence Manager that performs radio wave interference control between radio devices. Furthermore, for example, a registered location secure server (RLSS) defined in IEEE 802.11-2016 can also work as the communication control device 60. In addition, under the spectrum sharing environment, a database (database server, device, and system) such as a geo-location database (GLDB) or a spectrum access system (SAS) can also work as the communication control device 60.

When the communication system 2 is a cellular communication system, the communication control device 60 may be a device constituting a core network. The core network CN is, for example, an evolved packet core (EPC) or a 5G core network (5GC). When the core network is the EPC, the communication control device 60 may be a device having a function as a mobility management entity (MME), for example. When the core network is a 5GC, the communication control device 60 may be a device having a function as an access and mobility management function (AMF) or a session management function (SMF), for example. Note that even when the communication system 2 is a cellular communication system, the communication control device 60 does not necessarily have to be a device constituting a core network. For example, the communication control device 60 may be a device having a function as a radio network controller (RNC).

Note that the communication control device 60 may have a function of a gateway. For example, when the core network is an EPC, the communication control device 60 may be a device having a function as a serving gateway (S-GW) or a packet data network gateway (P-GW). When the core network is a 5GC, the communication control device 60 may be a device having a function as a user plane function (UPF). Furthermore, the communication control device 60 may be an SMF, a PCF, a UDM, or the like. The core network CN may include an SMF, a PCF, a UDM, and the like.

Note that the communication control device 60 does not necessarily have to be a device constituting the core network. For example, it is assumed that the core network is a core network of Wideband Code Division Multiple Access (W-CDMA) or Code Division Multiple Access 2000 (cdma2000). At this time, the communication control device 60 may be a device that functions as a radio network controller (RNC).

The communication control device 60 may be connected to each of the plurality of base station devices 40. For example, in the case of 5GC, an N2 reference point exists between the AMF and the NG-RAN, and the AMF and the NG-RAN are logically connected to each other via an NG interface.

The communication control device 60 manages communication of the base station device 40. For example, the communication control device 60 may manage the location of the terminal device 30 for each terminal device 30 in units of areas (for example, tracking areas or RAN notification areas) including a plurality of cells. Note that the communication control device 60 may grasp and manage, for each terminal device 30, which base station device 40 (or which cell) the terminal device is connected to, in which base station device 40 (or which cell) the terminal device 30 exists in the communication area, and the like.

Basically, the communication control device 60 has the base station device 40 as a control target, but the communication control device 60 may also control the terminal device 30 under the base station device 40. Furthermore, the communication control device 60 may control a plurality of secondary systems. In this case, the communication system 2 can be regarded as a system including the plurality of secondary systems.

Figure 6:
FIG. 6 is a diagram illustrating a model in which communication control devices are arranged in a distributed manner.

Furthermore, a plurality of communication control devices 60 may be present in one communication system 2. FIG. 6 is a diagram illustrating a model in which the communication control devices 60 are arranged in a distributed manner. In this case, the plurality of communication control devices 60 (the communication control device 60₃ and the communication control device 60₄ in the case of the example of FIG. 6) exchanges information of their managed base station devices 40 with each other, and performs allocation of necessary spectrum and calculation of interference control.

Figure 7:
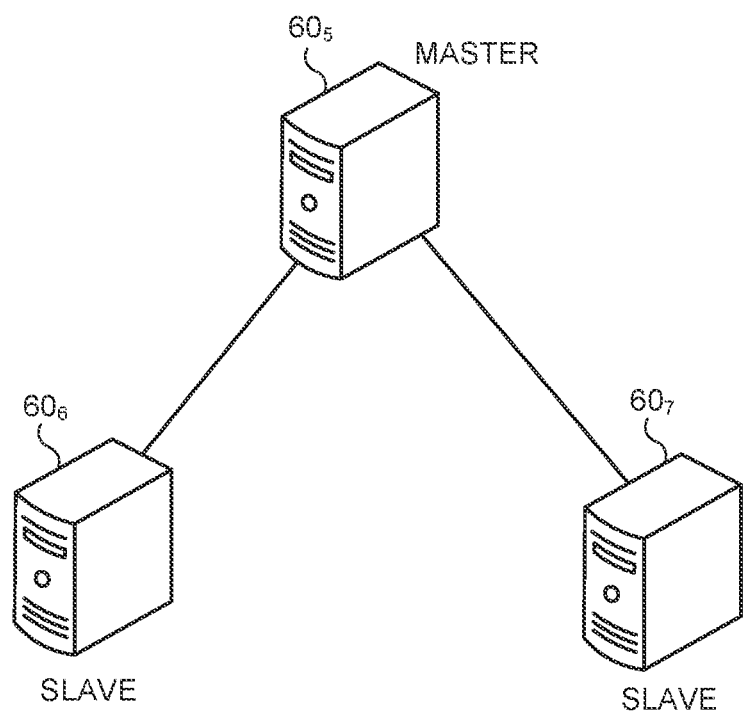
FIG. 7 is a diagram illustrating a model in which one communication control device centrally controls a plurality of communication control devices.

Furthermore, the communication control devices 60 may be master-slave devices. FIG. 7 is a diagram illustrating a model (referred to as a master-slave model) in which one communication control device centrally controls a plurality of communication control devices. In the example of FIG. 7, the communication control device 60₆ is a master communication control device, while the communication control devices 60₆ and 60₇ are slave communication control devices. In such a system, the master communication control device can integrally control the plurality of slave communication control devices to collectively make a decision. In addition, the master communication control device can also perform delegation, discarding, and the like of the decision-making authority to each of the slave communication control devices for the purpose of load balancing and the like.

Note that the communication control device 60 can also acquire necessary information from entities other than the base station device 40, the terminal device 30, and the intermediate device 50 for achieving its functions. Specifically, the communication control device 60 can acquire information necessary for protection, such as location information of the primary system, from a database (regulatory database) managed and operated by a national or regional radio administration agency, for example. An example of the regulatory database is a Universal Licensing System (ULS) operated by the United States Federal Communications Commission. Other examples of information necessary for protection can include information such as Out-of-Band Emission (OOBE) limit, Adjacent Channel Leakage Ratio (ACLR), Adjacent Channel Selectivity, fading margin, and/or protection ratio (PR), for example. For these examples, in a case where numerical values are fixedly given by law, it is desirable to use the given numerical values.

Furthermore, as another example, it is also conceivable that the communication control device 60 acquires radio wave sensing information from a radio wave sensing system installed and operated for the purpose of radio wave detection in the primary system. As a specific example, the communication control device 60 can acquire radio wave detection information of the primary system from a radio wave sensing system such as an Environmental Sensing Capability (ESC) in CBRS of the United States. Furthermore, in a case where the communication device or the terminal has a sensing function, the communication control device 60 may acquire radio wave detection information of the primary system from the communication device or the terminal.

Hereinafter, configurations of individual devices included in the communication system 1000, together with an external device, will be specifically described.

<2-2. Configuration of Radio Wave Utilization Device>

Figure 8:
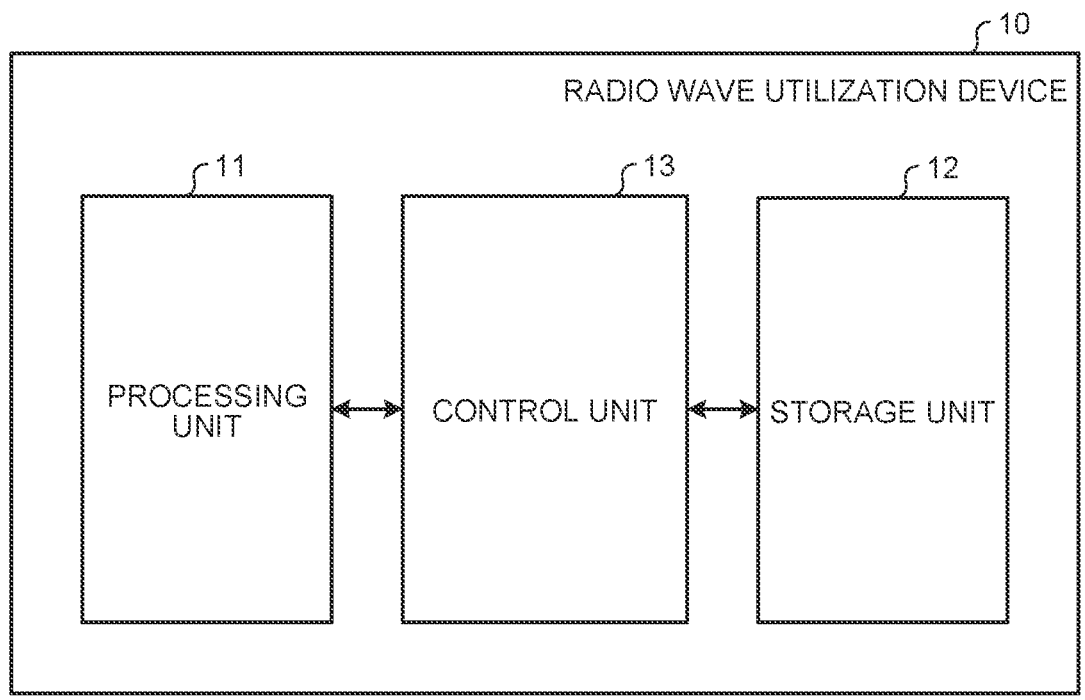
FIG. 8 is a diagram illustrating a configuration example of a radio wave utilization device according to an embodiment of the present disclosure.

First, the configuration of the radio wave utilization device 10 will be described. FIG. 8 is a diagram illustrating a configuration example of the radio wave utilization device 10 according to an embodiment of the present disclosure. The radio wave utilization device 10 performs primary use of a predetermined frequency band. For example, the radio wave utilization device 10 is a communication device (radio system) that performs radio communication with other radio communication device(s). In this case, the radio wave utilization device 10 can be regarded as a type of communication device. Note that the radio wave utilization device 10 may be a radio wave emission device or a reflected wave reception device. The radio wave utilization device 10 is a type of information processing device.

The radio wave utilization device 10 includes a processing unit 11, a storage unit 12, and a control unit 13. Note that the configuration illustrated in FIG. 8 is a functional configuration, and the hardware configuration may be different from this. Furthermore, the functions of the radio wave utilization device 10 may be implemented in a distributed manner in a plurality of physically separated configurations.

The processing unit 11 is a processing unit for utilizing a radio wave in a predetermined frequency band. For example, the processing unit 11 is a signal processing unit that performs various processes for outputting and receiving a radio wave in a predetermined frequency band. When the radio wave utilization device 10 works as a radio communication device, the processing unit 11 may be a radio communication interface that performs radio communication with other communication device(s). Here, the other communication devices include not only communication devices that perform cellular communication and the like but also transmission devices that transmit broadcast waves, such as television broadcasting, and reception devices that receive broadcast waves.

The storage unit 12 is a data readable/writable storage device such as dynamic random access memory (DRAM), static random access memory (SRAM), a flash drive, or a hard disk. The storage unit 12 functions as a storage means in the radio wave utilization device 10.

The control unit 13 is a controller that controls individual components of the radio wave utilization device 10. The control unit 13 is actualized by a processor such as a central processing unit (CPU) or a micro processing unit (MPU), for example. For example, the control unit 13 is actualized by execution of various programs stored in the storage device inside the radio wave utilization device 10 by the processor using random access memory (RAM) or the like as a work area. Note that the control unit 13 may be actualized by an integrated circuit such as an application specific integrated circuit (ASIC) or a field programmable gate array (FPGA). The CPU, MPU, ASIC, and FPGA can all be regarded as controllers.

Note that the radio wave utilization device 10 may have a function as the management device 20. In this case, the control unit 13 may have individual functional blocks included in the control unit of the management device 20.

<2-3. Configuration of Management Device>

Figure 9:
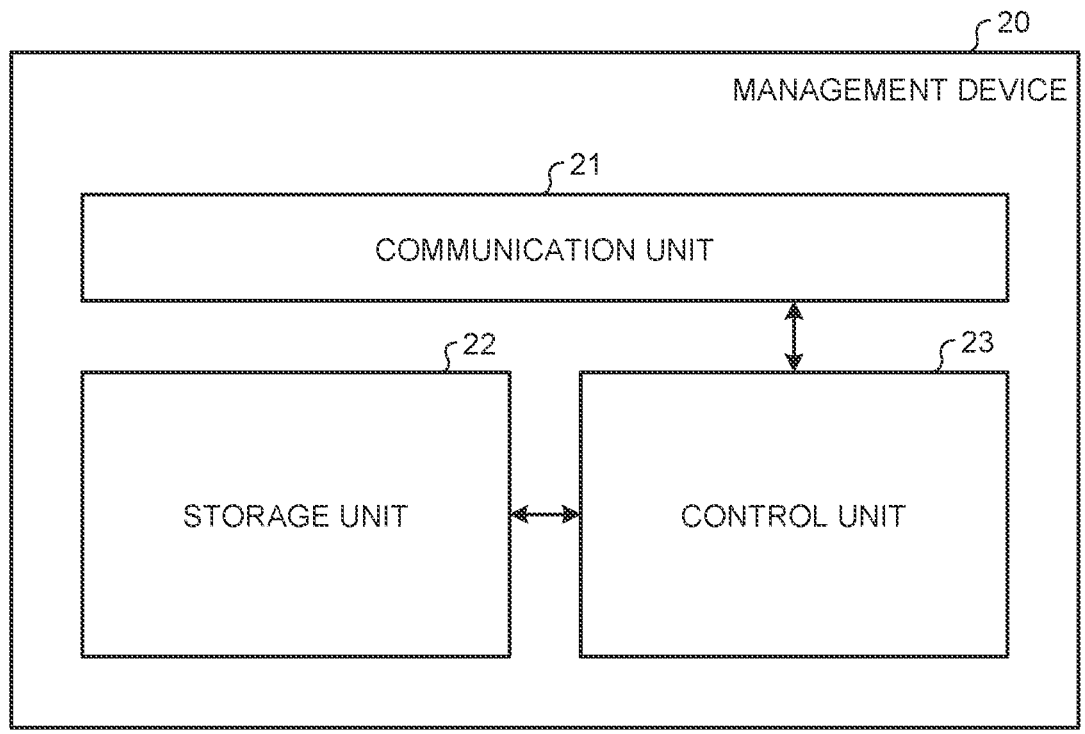
FIG. 9 is a diagram illustrating a configuration example of a management device according to an embodiment of the present disclosure.

Next, a configuration of the management device 20 will be described. FIG. 9 is a diagram illustrating a configuration example of the management device 20 according to an embodiment of the present disclosure. The management device 20 is a device that manages the radio wave utilization device 10. The management device 20 may be a device that manages radio wave output of the radio wave utilization device 10, or may be a device that manages information such as an installation mode and a management subject of the radio wave utilization device 10. The management device 20 is a type of information processing device.

The management device 20 includes a communication unit 21, a storage unit 22, and a control unit 23. Note that the configuration illustrated in FIG. 8 is a functional configuration, and the hardware configuration may be different from this. Furthermore, the functions of the management device 20 may be implemented in a distributed manner in a plurality of physically separated configurations.

The communication unit 21 is a communication interface for communicating with other devices. The communication unit 21 may be a network interface or a device connection interface. For example, the communication unit 21 may be a local area network (LAN) interface such as a network interface card (NIC), or may be a universal serial bus (USB) interface including a USB host controller, a USB port, and the like. Furthermore, the communication unit 21 may be a wired interface or a wireless interface. The communication unit 21 functions as a communication means of the management device 20. The communication unit 21 communicates with the radio wave utilization device 10 under the control of the control unit 23.

The storage unit 22 is a data readable/writable storage device such as DRAM, SRAM, a flash drive, and a hard disk. The storage unit 22 functions as a storage means in the management device 20. The storage unit 22 stores the first identifier and the like. The first identifier will be described below.

The control unit 23 is a controller that controls individual parts of the management device 20. The control unit 23 is actualized by a processor such as a CPU or an MPU, for example. For example, the control unit 23 is actualized by the processor executing various programs stored in the storage device inside the management device 20 using RAM or the like as a work area. Note that the control unit 23 may be actualized by an integrated circuit such as an ASIC or an FPGA. The CPU, MPU, ASIC, and FPGA can all be regarded as controllers.

As described above, the radio wave utilization device 10 can be regarded as the management device 20. In this case, the description of "management device 20" in the following description can be appropriately replaced with "radio wave utilization device 10".

<2-4. Configuration of Terminal Device>

Figure 10:
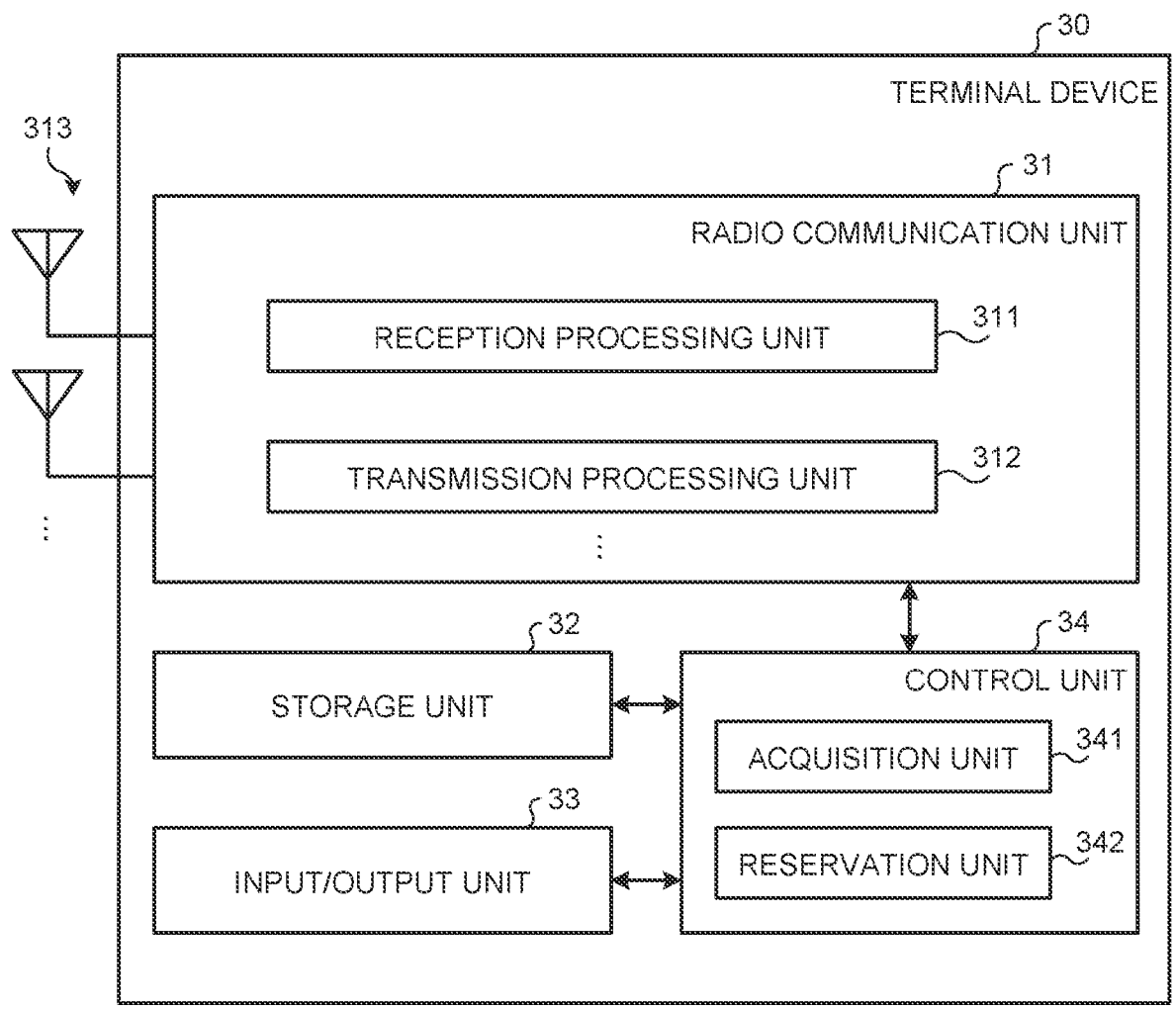
FIG. 10 is a diagram illustrating a configuration example of a terminal device according to an embodiment of the present disclosure.

Next, a configuration of the terminal device 30 will be described. FIG. 10 is a diagram illustrating a configuration example of the terminal device 30 according to an embodiment of the present disclosure. The terminal device 30 is a communication device (radio system) that performs radio communication with the base station device 40 and/or the communication control device 60. The terminal device 30 is a type of information processing device.

The terminal device 30 includes a radio communication unit 31, a storage unit 32, an input/output unit 33, and a control unit 34. Note that the configuration illustrated in FIG. 10 is a functional configuration, and the hardware configuration may be different from this. Furthermore, the functions of the terminal device 30 may be implemented in a distributed manner in a plurality of physically separated configurations.

The radio communication unit 31 is a radio communication interface that performs radio communication with other communication devices (for example, the base station device 40 and other terminal device(s) 30). The radio communication unit 31 operates under the control of the control unit 34. The radio communication unit 31 may support one or a plurality of radio access methods. For example, the radio communication unit 31 supports both NR and LTE. The radio communication unit 31 may support other radio access methods such as W-CDMA and cdma2000.

The radio communication unit 31 includes a reception processing unit 311, a transmission processing unit 312, and an antenna 313. The radio communication unit 31 may include a plurality of the reception processing units 311, a plurality of the transmission processing units 312, and a plurality of the antennas 313. In a case where the radio communication unit 31 supports a plurality of radio access methods, individual portions of the radio communication unit 31 can be configured separately for each of the radio access methods. For example, the reception processing unit 311 and the transmission processing unit 312 may be individually configured depending on LTE and NR. The configurations of the reception processing unit 311 and the transmission processing unit 312 are similar to those of a reception processing unit 411 and a transmission processing unit 412 of the base station device 40.

The storage unit 32 is a data readable/writable storage device such as DRAM, SRAM, a flash drive, and a hard disk. The storage unit 32 functions as a storage means in the terminal device 30.

The input/output unit 33 is a user interface for exchanging information with the user. For example, the input/output unit 33 is an operation device such as a keyboard, a mouse, operation keys, and a touch panel, used by a user to perform various operations. Alternatively, the input/output unit 33 is a display device such as a liquid crystal display, or an organic electroluminescence (EL) display. The input/output unit 33 may be an acoustic device such as a speaker or a buzzer. Furthermore, the input/output unit 33 may be a lighting device such as a light emitting diode (LED) lamp. The input/output unit 33 functions as an input/output means (input means, output means, operation means, or notification means) provided on the terminal device 30.

The control unit 34 is a controller that controls individual parts of the terminal device 30. The control unit 34 is actualized by a processor such as a CPU or an MPU, for example. For example, the control unit 34 is actuated by a processor executing various programs stored in a storage device inside the terminal device 30 using RAM or the like as a work area. Note that the control unit 34 may be actualized by an integrated circuit such as an ASIC or an FPGA. The CPU, MPU, ASIC, and FPGA can all be regarded as controllers. Note that the control unit 34 may include individual functional blocks included in the control unit of the base station device 40.

As illustrated in FIG. 10, the control unit 34 includes an acquisition unit 341 and a reservation unit 342. Individual blocks (the acquisition unit 341 to the reservation unit 342) constituting the control unit 34 are functional blocks individually indicating functions of the control unit 34. These functional blocks may be software blocks or hardware blocks. For example, each of the functional blocks described above may be one software module actualized by software (including a microprogram) or one circuit block on a semiconductor chip (die). Needless to say, each of the functional blocks may be formed as one processor or one integrated circuit. The functional block may be configured by using any method. Note that the control unit 34 may be configured in a functional unit different from the above-described functional block.

<2-5. Configuration of Base Station Device>

Figure 11:
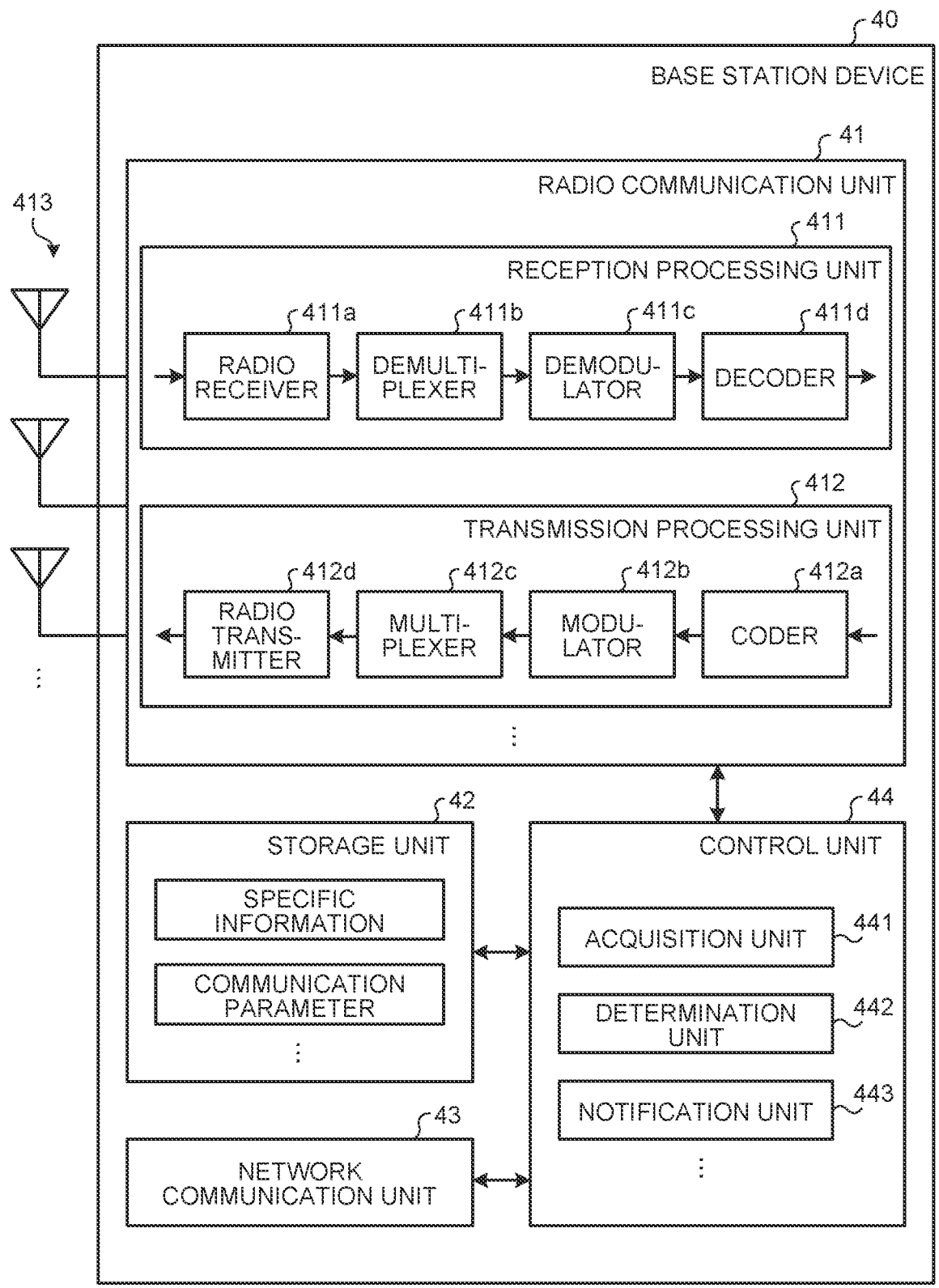
FIG. 11 is a diagram illustrating a configuration example of a base station device according to an embodiment of the present disclosure.

Next, a configuration of the base station device 40 will be described. FIG. 11 is a diagram illustrating a configuration example of the base station device 40 according to an embodiment of the present disclosure. The base station device 40 is a communication device (radio system) that performs radio communication with the terminal device 30 under the control of the communication control device 60. The base station device 40 is a type of information processing device.

The base station device 40 includes a radio communication unit 41, a storage unit 42, a network communication unit 43, and a control unit 44. Note that the configuration illustrated in FIG. 11 is a functional configuration, and the hardware configuration may be different from this. Furthermore, the functions of the base station device 40 may be implemented in a distributed manner in a plurality of physically separated devices.

The radio communication unit 41 is a radio communication interface that performs radio communication with other communication devices (for example, the terminal device 30, the communication control device 60, the intermediate device 50, and another base station device 40). The radio communication unit 41 operates under the control of the control unit 44. The radio communication unit 41 may support a plurality of radio access methods. For example, the radio communication unit 41 may support both NR and LTE. The radio communication unit 41 may support other cellular communication methods such as W-CDMA and cdma2000. For example, the radio communication unit 41 may support the wireless LAN communication method in addition to the cellular communication method. Needless to say, the radio communication unit 41 may be configured to support a single radio access method.

The radio communication unit 41 includes a reception processing unit 411, a transmission processing unit 412, and an antenna 413. The radio communication unit 41 may include a plurality of the reception processing units 411, a plurality of the transmission processing units 412, and a plurality of the antennas 413. In a case where the radio communication unit 41 supports a plurality of radio access methods, individual portions of the radio communication unit 41 can be configured separately for each of the radio access methods. For example, if the base station device 40 is compatible with NR and LTE, the reception processing unit 411 and the transmission processing unit 412 may be configured separately for NR and LTE.

The reception processing unit 411 processes an uplink signal received via the antenna 413. The reception processing unit 411 includes a radio receiver 411a, a demultiplexer 411b, a demodulator 411c, and a decoder 411d.

The radio receiver 411a performs processes on the uplink signal, such as down-conversion, removal of unnecessary frequency components, amplification level control, orthogonal demodulation, conversion to digital signal, removal of guard interval, and frequency domain signal extraction using fast Fourier transform. For example, it is assumed that the radio access method of the base station device 40 is a cellular communication method such as LTE. At this time, the demultiplexer 411b demultiplexes an uplink channel such as a physical uplink shared channel (PUSCH) or a physical uplink control channel (PUCCH) and an uplink reference signal from the signal output from the radio receiver 411a. Using a modulation scheme such as binary phase shift keying (BPSK) or quadrature phase shift keying (QPSK) for the modulation symbol of the uplink channel, the demodulator 411c demodulates the received signal. The modulation scheme used by the demodulator 411c may be multi-valued quadrature amplitude modulation (QAM) such as 16 QAM, 64 QAM, or 256 QAM. The decoder 411d performs a decoding process on the demodulated coded bits of the uplink channel. The decoded uplink data and uplink control information are output to the control unit 44.

The transmission processing unit 412 performs transmission processing of downlink control information and downlink data. The transmission processing unit 412 includes a coder 412a, a modulator 412b, a multiplexer 412c, and a radio transmitter 412d.

The coder 412a encodes the downlink control information and the downlink data input from the control unit 44 by using a coding method such as block coding, convolutional coding, or turbo coding. The modulator 412b modulates the coded bits output from the coder 412a by a predetermined modulation scheme such as BPSK, QPSK, 16 QAM, 64 QAM, or 256 QAM. The multiplexer 412c multiplexes the modulation symbol of each of channels and the downlink reference signal and allocates the multiplexed signals on a predetermined resource element. The radio transmitter 412d performs various types of signal processing on the signal from the multiplexer 412c. For example, the radio transmitter 412d performs processes such as conversion to the time domain using fast Fourier transform, addition of a guard interval, generation of a baseband digital signal, conversion to an analog signal, quadrature modulation, upconvert, removal of extra frequency components, and power amplification. The signal generated by the transmission processing unit 412 is transmitted from the antenna 413.

The storage unit 42 is a data readable/writable storage device such as DRAM, SRAM, a flash drive, and a hard disk. The storage unit 42 functions as a storage means in the base station device 40. The storage unit 42 stores desired transmission power information, operational parameters, resource holding information, and the like.

The desired transmission power information is information regarding transmission power required by the base station device 40 for information regarding transmission power necessary for transmission of radio waves, to the communication control device 60.

The operational parameter is information (for example, the setting information) related to the radio transmission operation of the base station device 40. For example, the operational parameter is information regarding the maximum value of the transmission power (maximum allowable transmission power) allowed for the base station device 40. Note that the operational parameter is not limited to the information of the maximum allowable transmission power.

In addition, the resource holding information is information related to holding of radio resources of the base station device 40. For example, the resource holding information is information of radio resources currently usable by the base station device 40. For example, the resource holding information is information regarding a holding amount of the interference margin allocated from the communication control device 60 to the base station device 40. The information regarding the holding amount may be information in units of resource blocks described below. That is, the resource holding information may be information regarding the resource block held by the base station device 40 (for example, the resource block holding amount).

The network communication unit 43 is a communication interface for communicating with other devices (for example, the communication control device 60, the intermediate device 50, and other base station devices 40). An example of the network communication unit 43 is a local area network (LAN) interface such as a Network Interface Card (NIC). The network communication unit 43 may be a universal serial bus (USB) interface including a USB host controller, a USB port, and the like. Furthermore, the network communication unit 43 may be a wired interface or a wireless interface. The network communication unit 43 functions as a network communication means of the base station device 40. The network communication unit 43 communicates with other devices under the control of the control unit 44

The control unit 44 is a controller that controls individual components of the base station device 40. The control unit 44 is actualized by a processor such as a central processing unit (CPU) or a micro processing unit (MPU), for example. For example, the control unit 44 is actualized by execution of various programs stored in the storage device inside the base station device 40 by the processor using random access memory (RAM) or the like as a work area. The control unit 44 may be actualized by an integrated circuit such as an application specific integrated circuit (ASIC) or a field programmable gate array (FPGA). The CPU, MPU, ASIC, and FPGA can all be regarded as controllers.

As illustrated in FIG. 11, the control unit 44 includes an acquisition unit 441, a determination unit 442, and a notification unit 443. Individual blocks (the acquisition unit 441 to the notification unit 443) constituting the control unit 44 are functional blocks individually indicating functions of the control unit 44. These functional blocks may be software blocks or hardware blocks. For example, each of the functional blocks described above may be one software module actualized by software (including a microprogram) or one circuit block on a semiconductor chip (die). Needless to say, each of the functional blocks may be formed as one processor or one integrated circuit. The functional block may be configured by using any method. Note that the control unit 44 may be configured in a functional unit different from the above-described functional block.

Note that the control unit 34 of the terminal device 30 may include individual functional blocks (the acquisition unit 441 to the notification unit 443) included in the control unit 44 of the base station device 40. In this case, the description of the "base station device 40" in the following description can be appropriately replaced with the "terminal device 30".

In addition, description of "control unit 44", "acquisition unit 441", "determination unit 442", and "notification unit 443" in the following description can also be replaced with "control unit 34" as appropriate.

<2-6. Configuration of Intermediate Device>

Figure 12:
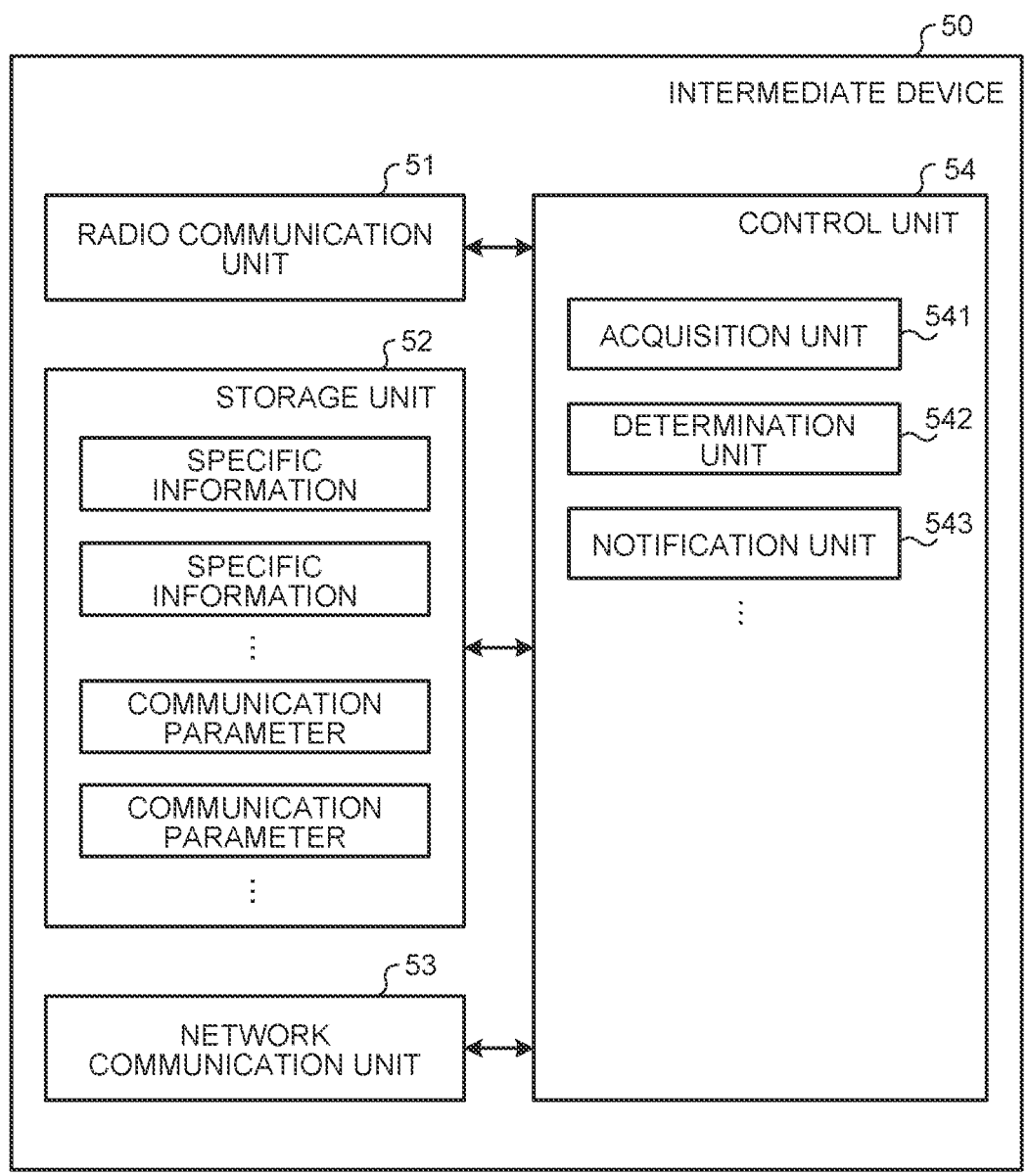
FIG. 12 is a diagram illustrating a configuration example of a proxy device according to an embodiment of the present disclosure.

Next, a configuration of the intermediate device 50 will be described. FIG. 12 is a diagram illustrating a configuration example of the intermediate device 50 according to an embodiment of the present disclosure. The intermediate device 50 is a communication device that communicates with the base station device 40 and the communication control device 60. The intermediate device 50 is a type of information processing device.

The intermediate device 50 includes a radio communication unit 51, a storage unit 52, a network communication unit 53, and a control unit 54. Note that the configuration illustrated in FIG. 12 is a functional configuration, and the hardware configuration may be different from this. Furthermore, the functions of the intermediate device 50 may be implemented in a distributed manner in a plurality of physically separated configurations.

The radio communication unit 51 is a radio communication interface that performs radio communication with other communication devices (for example, the base station device 40, the terminal device 30, the communication control device 60, and another intermediate device 50). The radio communication unit 51 operates under the control of the control unit 54. The radio communication unit 51 may support one or a plurality of radio access methods. For example, the radio communication unit 51 supports both NR and LTE. The radio communication unit 51 may support other radio access methods such as W-CDMA and cdma2000. The configuration of the radio communication unit 51 is similar to that of the radio communication unit 41 of the base station device 40.

The storage unit 52 is a data readable/writable storage device such as DRAM, SRAM, a flash drive, and a hard disk. The storage unit 52 functions as a storage means in the intermediate device 50. The storage unit 52 may store specific information, communication parameters, and the like of each of the subordinate base station devices 40 (alternatively, the terminal device 30 further subordinate to the subordinate base station device 40).

The network communication unit 53 is a communication interface for communicating with other devices (for example, the base station device 40, the communication control device 60, and another intermediate device 50). For example, the network communication unit 53 is a LAN interface such as an NIC. The network communication unit 53 may be a USB interface including a USB host controller, a USB port, and the like. Furthermore, the network communication unit 53 may be a wired interface or a wireless interface. The network communication unit 53 functions as a network communication means of the intermediate device 50. The network communication unit 53 communicates with other devices under the control of the control unit 54.

The control unit 54 is a controller that controls individual parts of the intermediate device 50. The control unit 54 is actualized by a processor such as a CPU or an MPU, for example. For example, the control unit 54 is actualized by the processor executing various programs stored in the storage device inside the intermediate device 50 using RAM or the like as a work area. Note that the control unit 54 may be actualized by an integrated circuit such as an ASIC or an FPGA. The CPU, MPU, ASIC, and FPGA can all be regarded as controllers.

As illustrated in FIG. 12, the control unit 54 includes an acquisition unit 541, a determination unit 542, and a notification unit 543. Individual blocks (the acquisition unit 541 to the notification unit 543) constituting the control unit 54 are functional blocks individually indicating functions of the control unit 54. These functional blocks may be software blocks or hardware blocks. For example, each of the functional blocks described above may be one software module actualized by software (including a microprogram) or one circuit block on a semiconductor chip (die). Needless to say, each of the functional blocks may be formed as one processor or one integrated circuit. The functional block may be configured by using any method. Note that the control unit 54 may be configured in a functional unit different from the above-described functional block. The operation of individual blocks constituting the control unit 54 will be described below.

The operations of individual blocks (the acquisition unit 541 to the notification unit 543) constituting the control unit 54 may be the same as the operations of individual blocks (the acquisition unit 441 to the notification unit 443) constituting the control unit 44 of the base station device 40. In this case, the description of the "intermediate device 50" in the following description can be appropriately replaced with the "base station device 40". Similarly, description of "control unit 54", "acquisition unit 541", "determination unit 542", and "notification unit 543" in the following description can be replaced with "control unit 44", "acquisition unit 441", "determination unit 442", and "notification unit 443" as appropriate.

<2-7. Configuration of Communication Control Device>

The communication control device 60 is a device that controls radio communication of the base station device 40. The communication control device 60 may control radio communication of the terminal device 30 via the base station device 40 or directly. The communication control device 60 is a type of information processing device.

Figure 13:
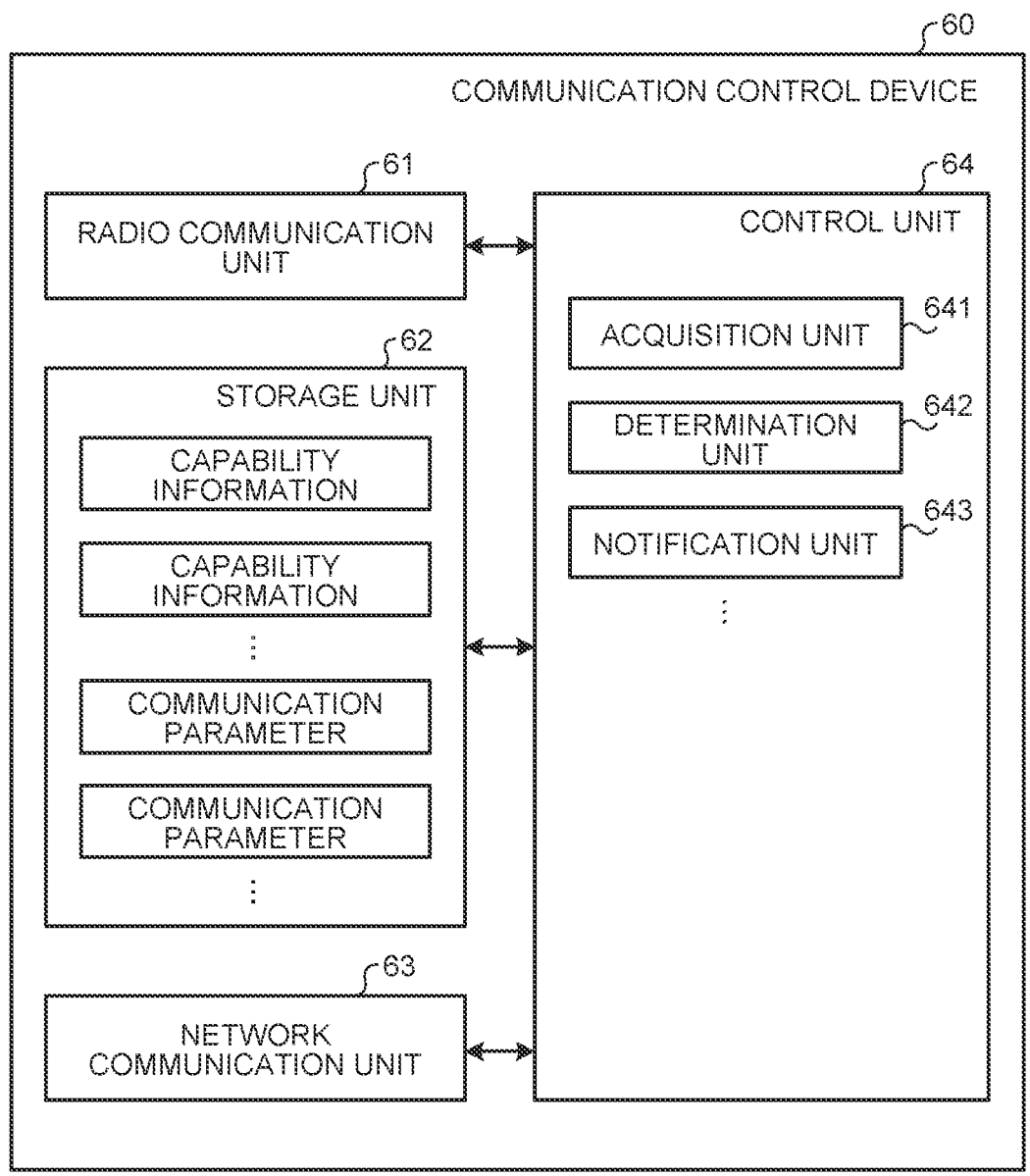
FIG. 13 is a diagram illustrating a configuration example of a communication control device according to an embodiment of the present disclosure.

FIG. 13 is a diagram illustrating a configuration example of the communication control device 60 according to an embodiment of the present disclosure. The communication control device 60 includes a radio communication unit 61, a storage unit 62, a network communication unit 63, and a control unit 64. Note that the configuration illustrated in FIG. 13 is a functional configuration, and the hardware configuration may be different from this. Furthermore, the functions of the communication control device 60 may be implemented in a distributed manner in a plurality of physically separated configurations. For example, the communication control device 60 may be constituted with a plurality of server devices.

The radio communication unit 61 is a radio communication interface that performs radio communication with other communication devices (for example, the base station device 40, the terminal device 30, the intermediate device 50, and other communication control device(s) 60). The radio communication unit 61 operates under the control of the control unit 64. The radio communication unit 61 may support one or a plurality of radio access methods. For example, the radio communication unit 61 supports both NR and LTE. The radio communication unit 61 may support other radio access methods such as W-CDMA and cdma2000. The configuration of the radio communication unit 61 is similar to that of the radio communication unit 41 of the base station device 40.

The storage unit 62 is a data readable/writable storage device such as DRAM, SRAM, a flash drive, and a hard disk. The storage unit 62 functions as a storage means in the base station device 40. The storage unit 62 stores operational parameters of each of the plurality of base station devices 40 constituting the communication system 2. Note that the storage unit 62 may store the resource holding information of each of the plurality of base station devices 40 constituting the communication system 2. As described above, the resource holding information is information regarding holding of the radio resource of the base station device 40.

The network communication unit 63 is a communication interface for communicating with other devices (for example, the base station device 40, the intermediate device 50, and other communication control device(s) 60). The network communication unit 63 may be a network interface or a device connection interface. For example, the network communication unit 63 may be a local area network (LAN) interface such as a Network Interface Card (NIC). In addition, the network communication unit 63 may be a universal serial bus (USB) interface including a USB host controller, a USB port, and the like. Furthermore, the network communication unit 63 may be a wired interface or a wireless interface. The network communication unit 63 functions as a communication means in the communication control device 60. Under the control of the control unit 64, the network communication unit 63 communicates with the base station device 40, the terminal device 30, and the intermediate device 50.

The control unit 64 is a controller that controls individual parts of the communication control device 60. The control unit 64 is actualized by a processor such as a CPU or an MPU, for example. For example, the control unit 64 is actualized by a processor executing various programs stored in a storage device inside the communication control device 60 using RAM or the like as a work area. Note that the control unit 64 may be actualized by an integrated circuit such as an ASIC or an FPGA. The CPU, MPU, ASIC, and FPGA can all be regarded as controllers.

As illustrated in FIG. 13, the control unit 64 includes an acquisition unit 641, a determination unit 642, and a notification unit 643. Individual blocks (the acquisition unit 641 to the notification unit 643) constituting the control unit 64 are functional blocks individually indicating functions of the control unit 64. These functional blocks may be software blocks or hardware blocks. For example, each of the functional blocks described above may be one software module actualized by software (including a microprogram) or one circuit block on a semiconductor chip (die). Needless to say, each of the functional blocks may be formed as one processor or one integrated circuit. The functional block may be configured by using any method. Note that the control unit 64 may be configured in a functional unit different from the above-described functional block. The operation of individual blocks constituting the control unit 64 will be described below.

Note that the control unit 44 of the base station device 40 may include individual functional blocks (the acquisition unit 641 to the notification unit 643) included in the control unit 64 of the communication control device 60. In this case, the description of the "communication control device 60" in the following description can be appropriately replaced with the "base station device 40". In addition, description of "control unit 64", "acquisition unit 641", "determination unit 642", and "notification unit 643" in the following description can also be replaced with "control unit 44", "acquisition unit 441", "determination unit 442", and "notification unit 443" as appropriate.

3. INTERFERENCE MODEL

Figure 14:
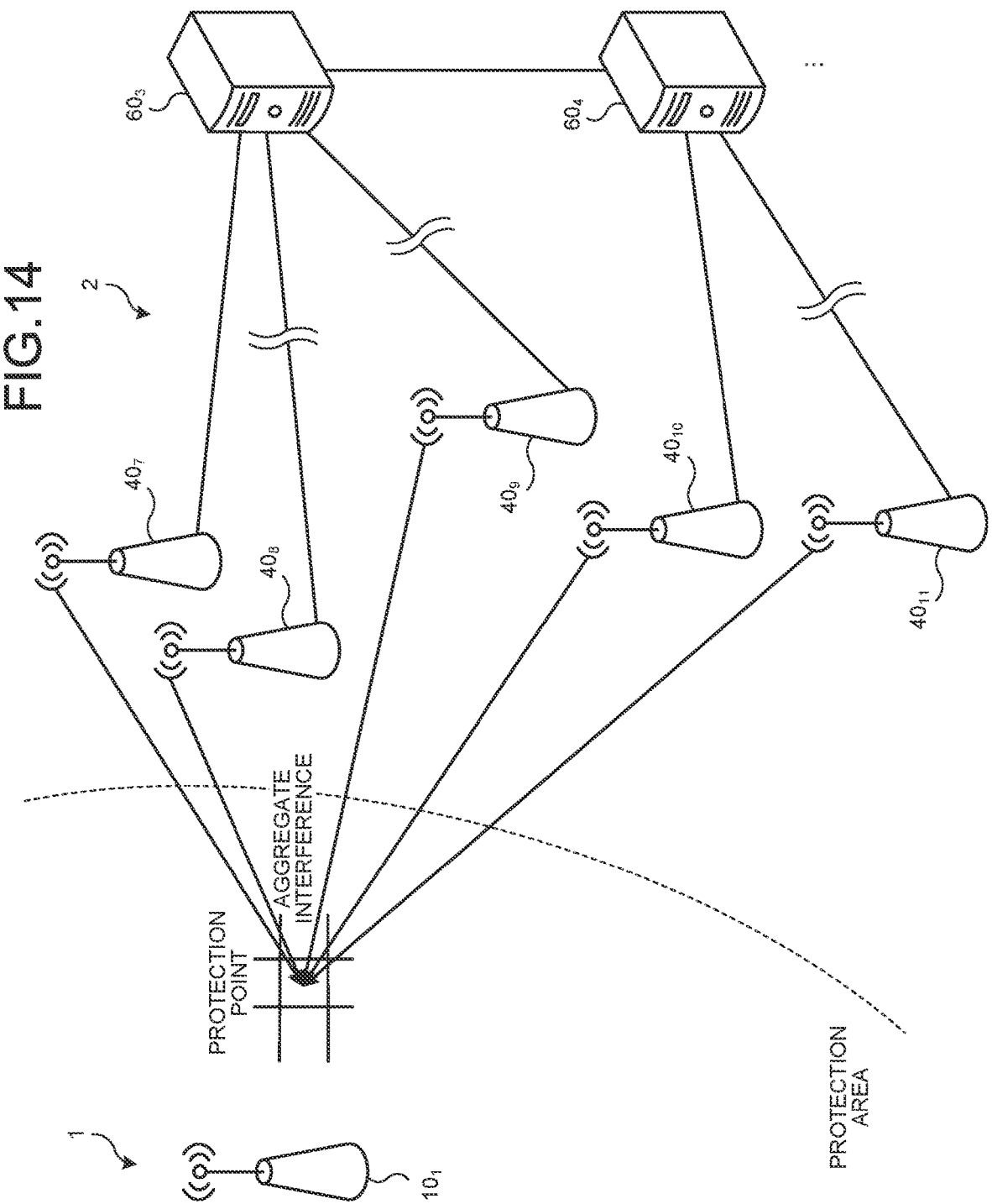
FIG. 14 is a diagram illustrating an example of an interference model assumed in an embodiment of the present disclosure.

Next, an interference model assumed in the present embodiment will be described. FIG. 14 is a diagram illustrating an example of an interference model assumed in an embodiment of the present disclosure. Note that the description of the base station device 40 in the following description can be replaced with a word indicating another communication device having a wireless communication function.

The interference model illustrated in FIG. 14 is applied in a case where the primary system has a service area, for example. In the example of FIG. 14, the communication system (primary system) is a radio communication system having a service area. This service area is to be a protection area of the communication system 1, for example. A plurality of interference calculation points of reference (hereinafter, referred to as an interference calculation point or a protection point) is set in the protection area. The protection point is set by an operator of the communication system 1, a public organization that manages radio waves, or the like (hereinafter, referred to as an administrator), for example. For example, the administrator may divide the protection area into a grid-like shape and set the center of a predetermined grid as the protection point. The protection point can be determined by any method.

The protection point may be set not only in the horizontal direction but also in the vertical direction. That is, the protection points may be arranged three-dimensionally. In the following description, a three-dimensionally arranged protection point (that is, a protection point under an assumption of a three-dimensional space, rather than in a protection point under an assumption of a horizontal plane) may be referred to as a spatial protection point.

The interference margin of each protection point is set by an administrator or the like. FIG. 14 illustrates interference given to a protection point by a plurality of base station devices 40 constituting the communication system 2 (secondary system). The communication control device 60 of the communication system 2 controls the transmission power of the plurality of base station devices 40 such that the aggregate interference at each protection point does not exceed a set interference margin.

Figure 15:
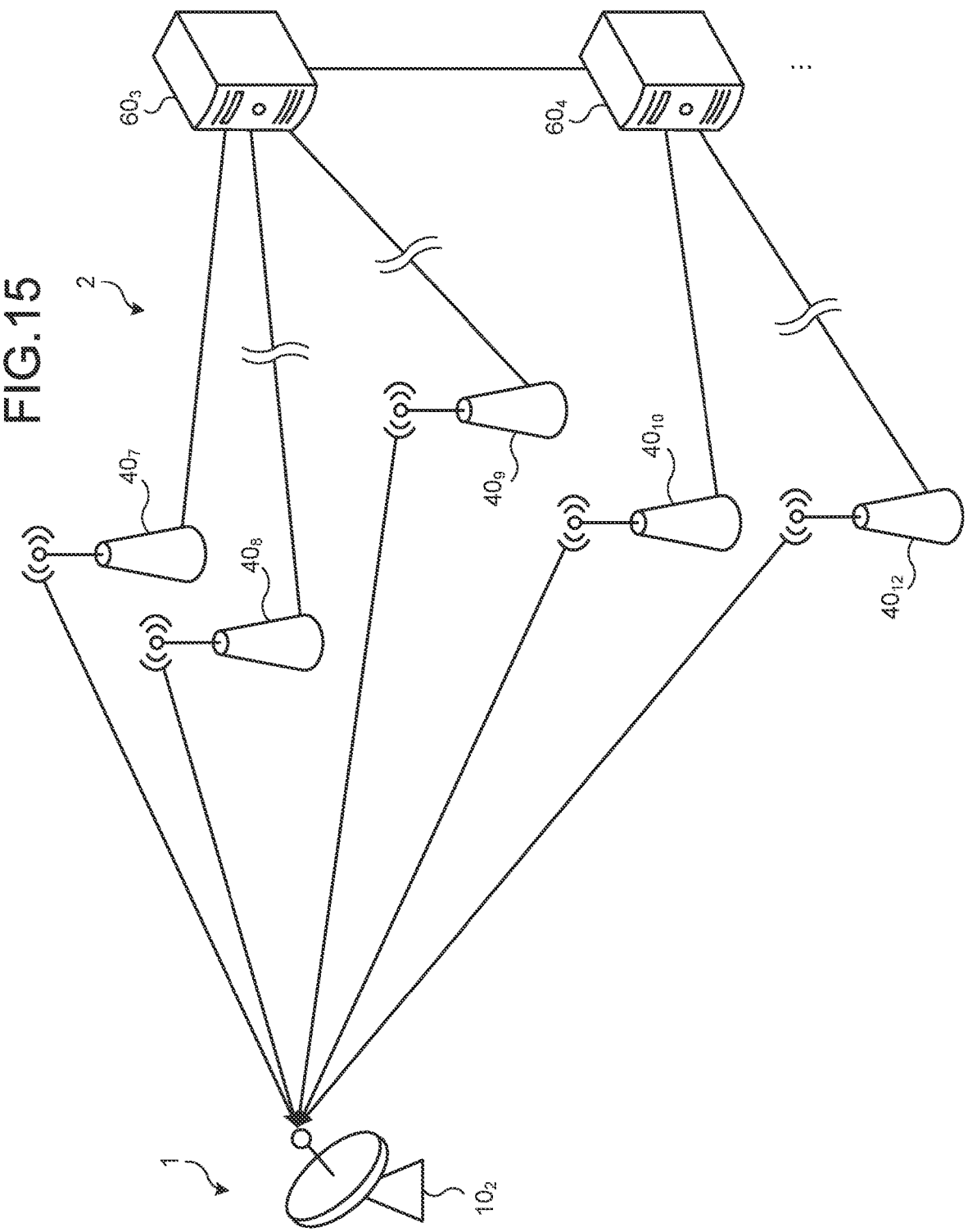
FIG. 15 is a diagram illustrating another example of an interference model assumed in an embodiment of the present disclosure.

FIG. 15 is a diagram illustrating another example of an interference model assumed in an embodiment of the present disclosure. The interference model illustrated in FIG. 15 is applied in a case where the primary system performs only reception, for example. In the example of FIG. 15, the communication system 1 (primary system) includes a reception antenna as the radio wave utilization device $10_2$. The radio wave utilization device $10_2$ is a reception antenna of a satellite ground station, for example. The communication control device 60 of the communication system 2 sets the position of the reception antenna as a protection point, and controls the transmission power of the plurality of base station devices 40 such that the aggregate interference at the point does not exceed an interference margin.

4. PRIMARY SYSTEM PROTECTION METHOD

Next, a primary system protection method will be described. As described above, the primary system protection method can be classified into the following two types, for example.

(1) Interference margin simultaneous allocation type
(2) Interference margin sequential allocation type An example of the interference margin simultaneous allocation type primary system protection method is a method disclosed in Non Patent Literature 3 (for example, a calculation method of the maximum allowable EIRP), for example. In addition, an example of the interference margin sequential allocation type primary system protection method is a sequential allocation process (referred to as Iterative Allocation Process (IAP)) disclosed in Non Patent Literature 6, for example.

Hereinafter, the "interference margin simultaneous allocation type" primary system protection method and the "interference margin sequential allocation type" primary system protection method will be described. Note that the description of the base station device 40 in the following description can be replaced with a word indicating another communication device having a wireless communication function.

<4-1. Interference Margin Simultaneous Allocation Type>

Figure 16:
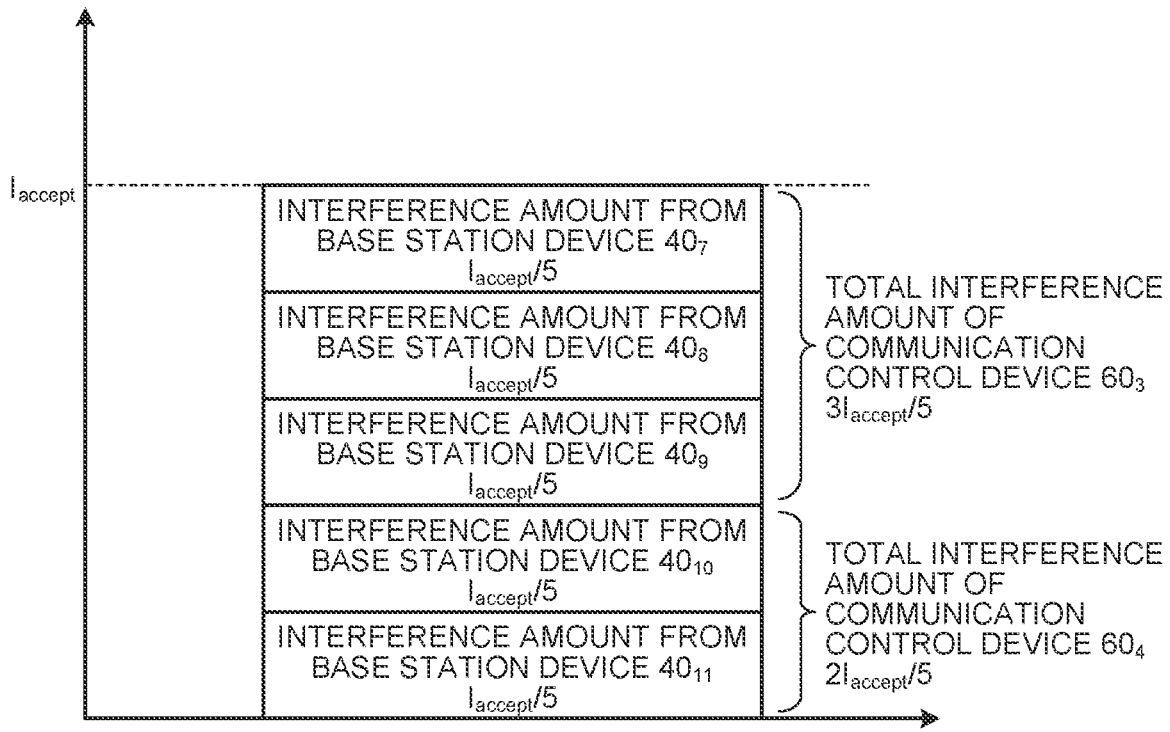
FIG. 16 is a diagram illustrating an interference margin simultaneous allocation type primary system protection method.

First, an interference margin simultaneous allocation type primary system protection method will be described. FIG. 16 is a diagram illustrating an interference margin simultaneous allocation type primary system protection method. As described above, in the interference margin simultaneous allocation type, the communication control device 60 calculates the maximum allowable transmission power of the secondary system using a "value uniquely obtained by positional relationship between the protection point of reference regarding the primary system and the secondary system" as a reference value. In the example of FIG. 16, an allowable interference threshold of the primary system is represented by $I_{accept}$. This threshold may be an actual threshold, or may be a value set assuming a certain margin (for example, a protection ratio) from the actual threshold in consideration of a calculation error and an interference variation.

In the interference margin simultaneous allocation type primary system protection method, interference control represents determination of transmission power (EIRP, Conducted Power+Antenna gain, and the like) of a radio device so as not to exceed an allowable interference threshold. At this time, when there are a large number of base station devices 40 and an attempt is made so as not to allow each to exceed an allowable interference threshold, there might be a concern that interference power received in the communication system 1 (primary system) exceeds the allowable interference threshold. To handle this, the interference margin (allowable interference amount) is "allocated" based on the number of base station devices 40 registered in the communication control device 60.

For example, in the example of FIG. 16, the total number of base station devices 40 is five. Therefore, the acceptable interference amount being $I_{accept}/5$ is allocated to each of the base station devices 40. Since the base station device 40 cannot self recognize the allocation amount, the base station device 40 recognizes the allocation amount through the communication control device or acquires transmission power determined based on the allocation amount. The communication control device cannot recognize the number of radio devices managed by other communication control devices. Therefore, by exchanging information with each other, the communication control device can recognize the total number of devices and can allocate the acceptable interference amount. For example, an acceptable interference amount of $3I_{accept}/5$ is allocated in the communication control device $60_1$.

Figure 17:
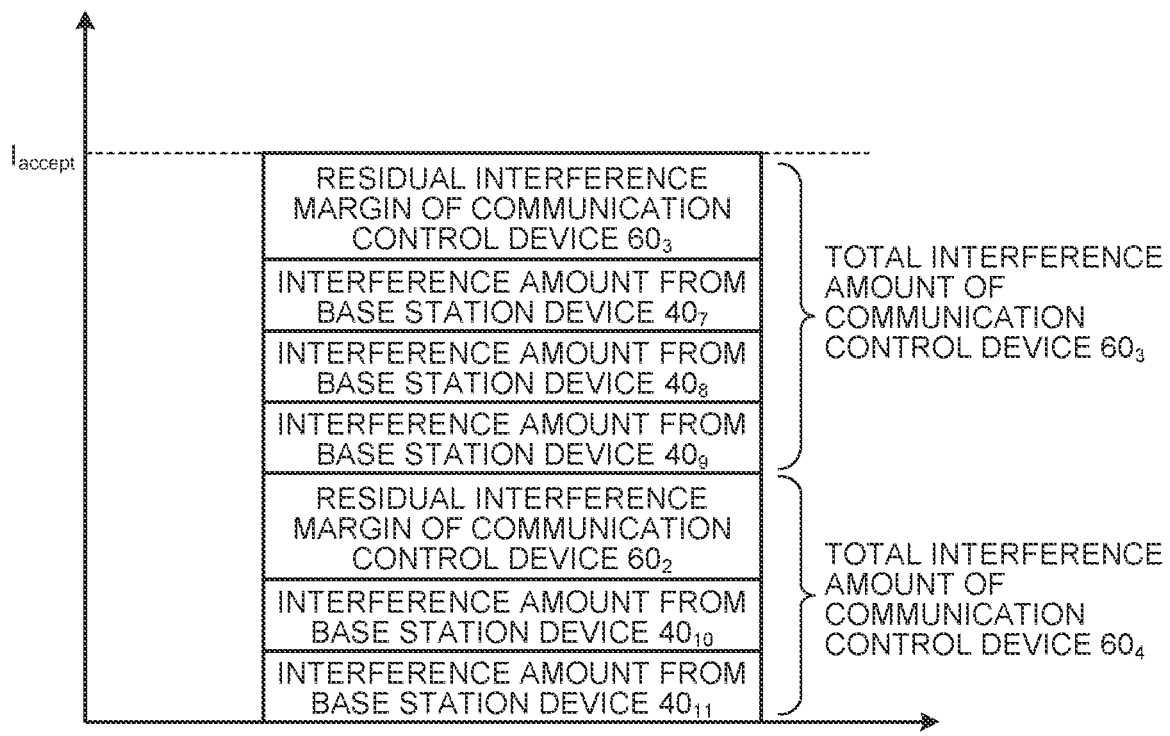
FIG. 17 is a diagram illustrating a state in which a residual interference margin occurs.

Note that, the interference margin that has not been used by the base station device 40 can be a residual interference margin in this method. FIG. 17 is a diagram illustrating a state in which a residual interference margin occurs. FIG. 17 illustrates a total interference set in each of the two communication control devices 60 (communication control devices $60_3$ and $60_4$. In addition, FIG. 17 illustrates an interference amount (interference amount) given to a predetermined protection point of the communication system 1 by a plurality of base station devices 40 (base station devices 40$_7$ to 40$_{11}$) under the management of the two communication control devices 60. An interference amount obtained by subtracting the interference amount of the base station device 40 from the total interference of each of the two communication control devices 60 is the residual interference margin. In the following description, an excessive interference amount is referred to as the residual interference margin. The residual interference margin can be rephrased as a residual interference amount.

<4-2. Interference Margin Sequential Allocation Type>

Figure 18:
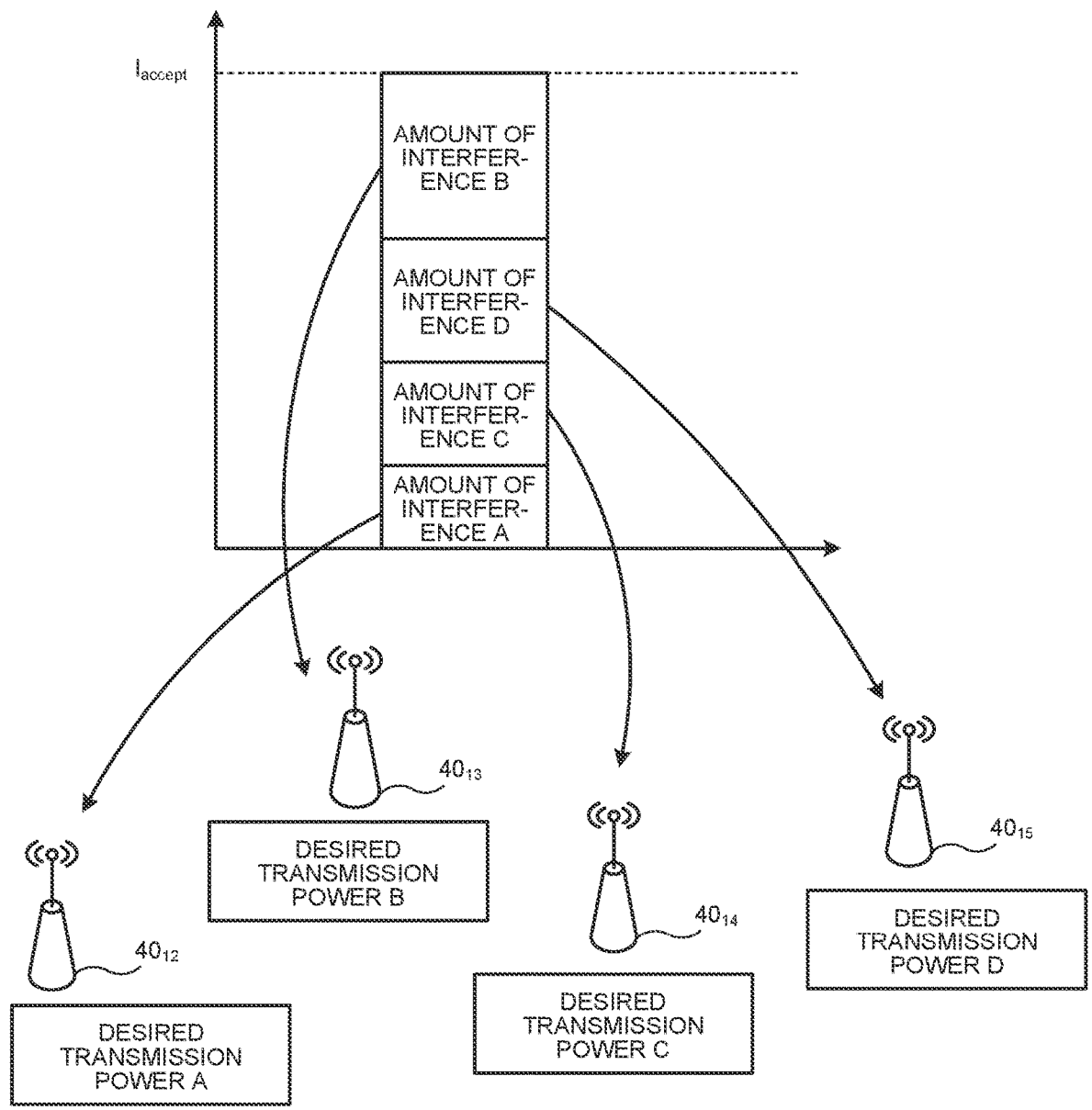
FIG. 18 is a diagram illustrating an interference margin sequential allocation type primary system protection method.

Next, an interference margin sequential allocation type primary system protection method will be described. As described above, in the case of interference margin sequential allocation type, the communication control device 60 calculates the maximum allowable transmission power of the secondary system using the "desired transmission power of the secondary system" as a reference value. FIG. 18 is a diagram illustrating an interference margin sequential allocation type primary system protection method. In the interference margin sequential allocation type, for example, each of the plurality of base station devices 40 stores the desired transmission power information in the storage unit 42. The desired transmission power information is information regarding transmission power required by the base station device 40 for information regarding transmission power necessary for transmission of radio waves, to the communication control device 60. In the example of FIG. 18, the base station devices 4012 to 4015 hold desired transmission power information A to D, respectively. The communication control device 60 allocates the interference amounts A to D to the base station devices 4012 to 4015 based on the desired transmission power information A to D, respectively.

5. DESCRIPTION OF VARIOUS PROCEDURES

Next, various procedures that can occur between entities of the communication system 2 will be described. Note that the description of the base station device 40 in the following description can be replaced with a word indicating another communication device having a wireless communication function.

<5-1. Registration Procedure>

A registration procedure is a procedure of registering a device parameter related to the base station device 40 to the communication control device 60. Typically, the registration procedure is started when one or more communication systems including the base station device 40 or the plurality of base station devices 40 notify the communication control device 60 of a registration request including the device parameter. The registration request may be transmitted by a communication system (for example, a proxy system such as the intermediate device 50) substituting (representing) one or a plurality of base station devices 40.

In the following description, the communication system that substitutes (represents) the plurality of base station devices 40 is assumed to be the intermediate device 50. However, a word of the intermediate device 50 in the following description can be replaced with a word indicating a communication system that substitutes (represents) other communication devices such as a proxy system. Naturally, the description of the base station device 40 can also be replaced with a word indicating other communication devices having a wireless communication function.

[Details of Required Parameters]

The device parameter refers to the following information, for example.

Information specific to communication device
Location information
Antenna information
Wireless interface information
Legal Information
Installer information At the time of implementation, information other than these may be handled as device parameters.

The information specific to the communication device includes information by which the base station device 40 can be specified, information regarding hardware of the base station device 40, and the like. For example, the information can include a serial number, a product model number, and the like.

The information by which the base station device 40 can be specified indicates communication device user information, a communication device serial number, and the like. For example, assumable communication device user information can include user ID, call sign, and the like. The user ID may be independently generated by the communication device user or may be issued in advance by the communication control device 60.

The information regarding the hardware of the base station device 40 can include, for example, transmission power class information, manufacturer information, and the like. In FCC C.F.R Part 96, for example, the transmission power class information can include one of two types of defined classes, namely, Category A and Category B. Furthermore, 3GPP TS 36.104 and TS 38.104 define some classes of eNodeB and gNodeB, and these can also be used as the information.

The information regarding the software of the base station device 40 can include, for example, version information, a build number, and the like regarding an execution program in which processing necessary for interaction with the communication control device 60 is described. In addition, the information may include version information, a build number, and the like of software for operating as the base station device 40.

The location information is typically information by which the geographical position of the base station device 40 can be specified. For example, the location information is coordinate information acquired by a positioning function represented by a global positioning system (GPS), Beidou, a Quasi-Zenith Satellite System (QZSS), Galileo, or an assisted global positioning system (A-GPS). Typically, the location information can include information regarding latitude, longitude, altitude, and positioning error. Alternatively, for example, the location information may be location information registered in an information management device managed by a National Regulatory Authority (NRA) or its agency. Alternatively, for example, it is allowable to use coordinates of an X axis, a Y axis, and a Z axis having its origin in a specific geographical position. In addition, coordinate information like this can be added with an identifier indicating outdoor/indoor.

Furthermore, the location information may be information indicating an area in which the base station device 40 is located. For example, it is allowable to use information defined by the government, such as a postal code and a postal address. Furthermore, for example, the area may be indicated by a set of three or more geographic coordinates. The information indicating these regions may be provided together with the coordinate information.

Furthermore, in a case where the base station device 40 is located indoors, information indicating a floor of a building may be added to the location information. For example, it is allowable to add an identifier or the like indicating floor number, ground/underground. Furthermore, it is allowable to add information indicating a further closed space inside the building, such as a room number and a room name in the building, for example.

Typically, the positioning function is desirably provided in the base station device 40. However, it is not always possible to acquire the location information satisfying required accuracy depending on the performance of the positioning function or the installation position. Therefore, the positioning function may be used by the installer. In such a case, the location information measured by the installer is to be desirably written in the base station device 40.

The antenna information is typically information indicating performance, a configuration, and the like of an antenna included in the base station device 40. Typically, for example, the antenna information can include information such as an antenna installation height, a tilt angle (Downtilt), a horizontal direction (Azimuth), an aim (Boresight), an antenna peak gain, and an antenna model.

The antenna information can also include information regarding a formable beam. For example, it is allowable to include information such as a beamwidth, a beam pattern, and an analog/digital beamforming capability.

In addition, the antenna information can also include information related to performance and a configuration of Multiple Input Multiple Output (MIMO) communication. For example, information such as the number of antenna elements and the maximum number of spatial streams can be included. In addition, the antenna information can include codebook information to be used, weight matrix information (a unitary matrix obtained by singular value decomposition (SVD), eigen value decomposition (EVD), block diagonalization (BD), or the like, a zero-forcing (ZF) matrix, or a minimum mean square error (MMSE) matrix), and the like. In addition, when equipped with Maximum Likelihood Detection (MLD) or the like that requires nonlinear calculation, information indicating the MLD or the like may be included.

The antenna information may include Zenith of Direction, Departure (ZoD). The ZoD is a type of radio wave arrival angle. The ZoD may be estimated by another base station device 40 based on the radio wave radiated from the antenna of the base station device 40. In this case, the base station device 40 may be a terminal device that operates as a base station or an access point, a device that performs D2D communication, a moving relay base station, or the like. The ZoD can be estimated by a radio wave arrival direction estimation technology such as Multiple Signal Classification (MUSIC) or Estimation of Signal Propagation via Rotation Invariance Techniques (ESPRIT). This information can be used as measurement information by the communication control device 60.

The wireless interface information is typically information indicating a wireless interface technology included in the base station device 40. For example, the wireless interface information includes identifier information indicating a technology used in GSM (registered trademark), CDMA2000, UMTS, E-UTRA, 5G NR, or technologies used in further next generation cellular system, derivative technologies based on LTE such as MulteFire or LTE-Unlicensed (LTE-U), or standard technologies such as a Metropolitan Area Network (MAN) such as WiMAX or WiMAX2+, or a wireless LAN based on IEEE 802.11. In addition, it is also possible to add a version number or a release number of the technical specification that defines the information like this. There is no need to be a standard technology, and information indicating a proprietary radio technology may be included.

The wireless interface information can also include frequency band information supported by the base station device 40. For example, the information can be expressed by: one or more combinations of the upper limit frequency and the lower limit frequency; one or more combinations of the center frequency and the bandwidth, one or more 3GPP Operating Band numbers, and the like.

The frequency band information supported by the base station device 40 can further include capability information regarding carrier aggregation (CA) or channel bonding. For example, combinable band information or the like can be included. Furthermore, the carrier aggregation can also include information regarding a band to be used as a primary component carrier (PCC) or a secondary component carrier (SCC). Also, the number of CCs that can be aggregated at the same time can be included.

The frequency band information supported by the base station device 40 may also include information indicating radio wave utilization priority such as PAL and GAA.

The wireless interface information can also include modulation scheme information supported by the base station device 40. For example, as a representative example, the wireless interface information can include information indicating a primary modulation scheme such as frequency shift keying (FSK), n-value phase shift keying (PSK) (n is 2, 4, 8, or the like), or n-value quadrature amplitude modulation (QAM) (n is 4, 16, 64, 256, or the like), or information indicating a secondary modulation scheme such as orthogonal frequency division multiplexing (OFDM), DFT spread OFDM (DFT-s-OFDM), or Filter Bank Multi Carrier (FBMC).

The wireless interface information can also include information related to an error correction code. For example, the information can include capabilities regarding a turbo code, a low density parity check (LDPC) code, and a polar code, and coding rate information to be applied.

The modulation scheme information and the information related to the error correction code can also be expressed by a Modulation and Coding Scheme (MCS) index as another aspect.

In addition, the wireless interface information can also include information indicating functions specific to each of radio technologies supported by the base station device 40. For example, there is transmission mode (TM) information defined in LTE, as a representative example. In addition, information having two or more modes with respect to a specific function can be included in the wireless interface information as in the TM described above. In addition, in a case where, in the technical specification, the base station device 40 supports a function that is not essential in the specification even in the absence of two or more modes, information indicating this function can also be included.

The wireless interface information can also include radio access method (radio access technology (RAT)) information supported by the base station device 40. For example, the wireless interface information can include: information indicating an orthogonal multiple access (OMA) scheme such as time division multiple access (TDMA), frequency division multiple access (FDMA), or orthogonal frequency division multiple access (OFDMA); information indicating a non-orthogonal multiple access (NOMA) scheme such as Power Division Multiple Access (PDMA) which is represented by techniques implemented by combining Superposition Coding (SPC) and Successive Interference Canceller (SIC), Code Division Multiple Access (CDMA), Sparse Code Multiple Access (SCMA), Interleaver Division Multiple Access (IDMA), and Spatial Division Multiple Access (SDMA); and information indicating opportunistic access schemes such as Carrier Sense Multiple Access/Collision Avoidance (CSMA/CA) and Carrier Sense Multiple Access/Collision Detection (CSMA/CD).

In addition, the wireless interface information can also include information regarding a duplex mode supported by the base station device 40. For example, frequency division duplex (FDD), time division duplex (TDD), and full duplex (FD) can be included as a representative example. In a case where TDD is included as the wireless interface information, TDD Frame Configuration information used/supported by the base station device 40 can be added. Furthermore, information regarding the duplex mode may be included for each frequency band indicated by the frequency band information.

The wireless interface information can also include information related to a transmission diversity method supported by the base station device 40. For example, space time coding (STC) or the like may also be included.

The wireless interface information can also include guard band information. For example, information related to a standard guard band size can be included. Alternatively, for example, information regarding a guard band size desired by the base station device 40 may be included.

The legal information typically corresponds to information related to regulations that the base station device 40 must comply with, which are defined by radio administration agencies in different countries and regions or equivalent organizations, authentication information acquired by the base station device 40, and the like. The information regarding the regulation typically includes, for example, upper limit value information of out-of-band emission, information regarding a blocking characteristic of the receiver, and the like. Typically, the authentication information can include, for example, type approval information (FCC ID, Technical Standard Conformance Certificate, and the like), legal/regulatory information (for example, FCC regulation number, ETSI Harmonized Standard number, and the like) to be a standard for authentication acquisition, and the like.

Among the legal information, information related to a numerical value may be substituted by information defined in the specification of the wireless interface technology. For example, the upper limit value of the out-of-band emission may be derived for application by using an Adjacent Channel Leakage Ratio (ACLR) instead of the upper limit value information of the out-of-band emission. In addition, the ACLR itself may be used as necessary. Furthermore, adjacent channel selectivity (ACS) may be used instead of the blocking characteristic. In addition, these may be used in combination, or an adjacent channel interference ratio (ACIR) may be used.

The installer information can include information capable of specifying a person who installs the base station device 40 (installer), specific information associated with the installer, and the like. For example, Non Patent Literature 2 discloses Certified Professional Installer Registration ID (CPIR-ID) and a CPI name as information that can specify the installer. In addition, for example, a postal address (mailing/contact address), an e-mail address, a telephone number, a Public Key Identifier (PKI), and the like are disclosed as specific information associated with the installer. The information is not limited thereto, and other information related to the installer may be included as necessary.

[Supplement to Required Parameters]

In the registration procedure, depending on the embodiment, it is assumed that not only the base station device 40 but also the device parameters related to the terminal device 30 are required to be registered in the communication control device 60. In such a case, the term "communication device" in the above description (details of required parameters) may be replaced with a term "terminal device" or an equivalent term for application. In addition, a parameter specific to the "terminal device" that is not described above (details of required parameters) may also be handled as a required parameter in the registration procedure. An example of this is a user equipment (UE) category defined in 3GPP.

[Details of Registration Process]

Figure 19:
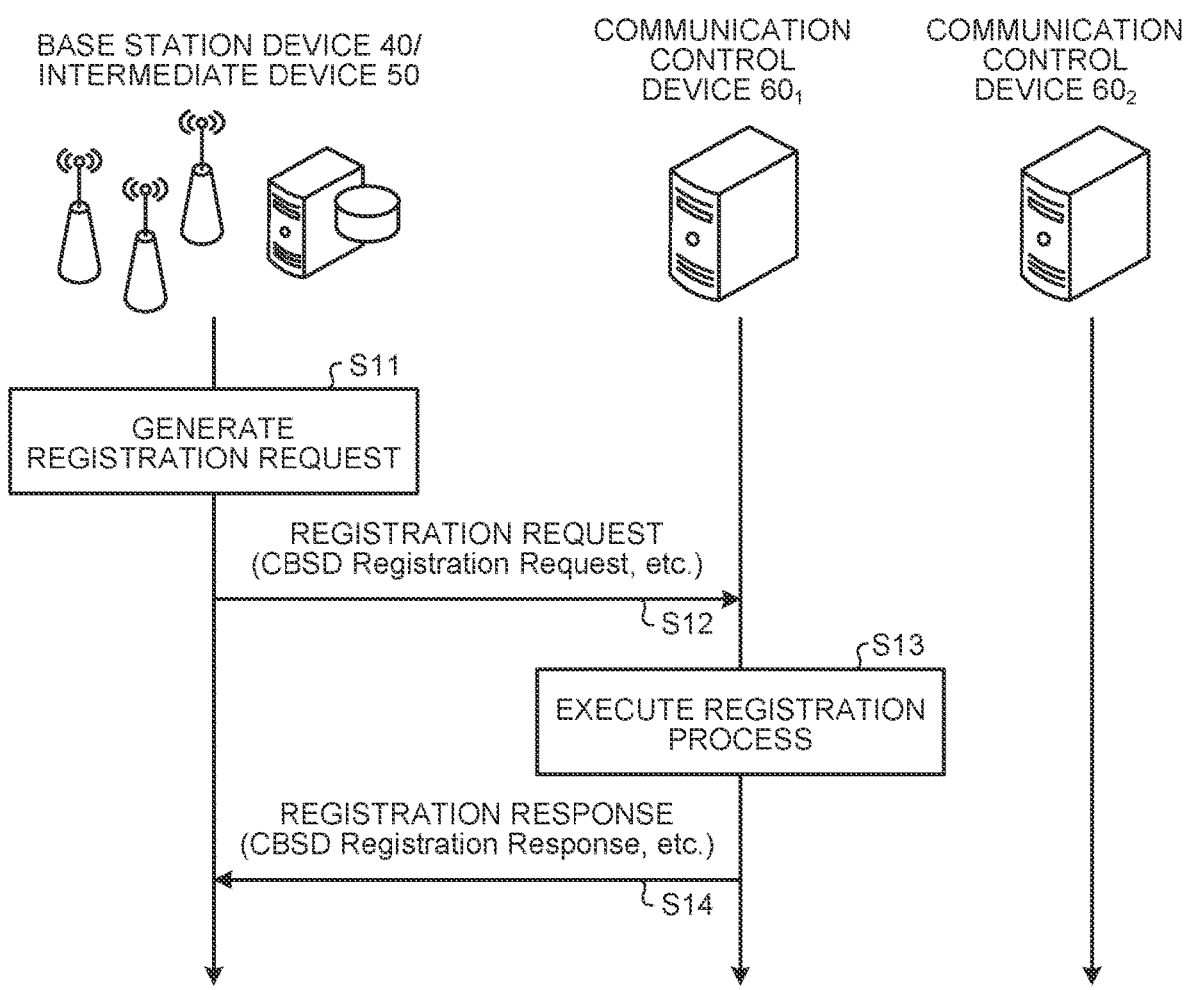
FIG. 19 is a sequence diagram illustrating a registration procedure.

FIG. 19 is a sequence diagram illustrating a registration procedure. One or more communication systems including the base station device 40 or a plurality of the base station devices 40 generate a registration request message using the device parameter (step S11), and then notify the communication control device 60 of the registration request message (step S12). The generation and/or notification of the message may be performed by the intermediate device 50.

Here, in a case where the device parameter includes installer information, falsification prevention processing or the like may be performed on the registration request by using this information. In addition, a part or all of the information included in the registration request may be subjected to an encryption process. Specifically, for example, it is possible to apply a process in which a public key specific to the installer is shared in advance between the installer and the communication control device 60, and the installer performs encryption on information using a secret key. Examples of the encryption target include security sensitive information such as location information.

Further, as disclosed in Non Patent Literature 2, the installer may directly write the location information into the communication control device 60, for example.

After receiving the registration request, the communication control device 60 performs a registration process regarding the base station device 40 (step S13), and returns a registration response according to a processing result (step S14). When there is no lack or abnormality of information necessary for registration, the communication control device 60 records the information to the storage unit 42 and notifies normal completion. Otherwise, the communication control device 60 notifies a registration failure. In a case of normal completion of registration, the communication control device 60 may assign an ID to each communication device and may notify the communication device of the ID information by enclosing the ID information at the time of response. In a case of a registration failure, typically, one or more communication systems including the base station device 40 or a plurality of the base station devices 40, or an operator (for example, a mobile network operator or an individual) or an installer thereof performs correction or the like of the registration request, and attempts the registration procedure until normal completion of the registration.

Note that the registration procedure is sometimes executed a plurality of times. Specifically, for example, when the location information is changed beyond a predetermined standard due to movement of the device, accuracy improvement, or the like, the registration procedure can be executed again. The predetermined standard is typically defined by a legal system. For example, in 47C.F.R Part 15, the Mode II personal/portable white space device is required to access the database again when the location information changes by 100 meters or more.

<5-2. Available Spectrum Query Procedure>

The available spectrum query procedure is a procedure used by the base station device 40 or the intermediate device 50 to make a query about information regarding the available spectrum to the communication control device 60. Typically, the procedure is started when the base station device 40 or the intermediate device 50 notifies the communication control device 60 of a query request including information by which the base station device 40 (or the base station device 40 under the intermediate device 50) can be specified.

As described above, the description of the "base station device 40" can be replaced with a word indicating another communication device having a wireless communication function. Furthermore, the description of "intermediate device 50" can also be replaced with a word indicating a communication system that substitutes (represents) another communication device, such as a proxy system.

(1) Example 1

Here, typically, the available spectrum information is information indicating a spectrum that can be safely provided as a secondary use without giving fatal interference to the primary system at the position of the base station device 40 (or the base station device 40 under the intermediate device 50). For example, in a case where the base station device 40 is installed in a secondary use prohibited area such as an exclusion zone in order to protect the primary system using the frequency channel F1, the frequency channel F1 is not notified as an available channel to the base station device 40.

(2) Example 2

Further, for example, when it is determined that fatal interference might be given to the primary system even outside the secondary use prohibited area, the frequency channel would not be notified as an available channel in some cases.

(3) Example 3

Moreover, in the available spectrum information, there can also be frequency channels not to be notified as available channels because of conditions other than the primary system protection requirements of Example 2. Specifically, for example, in order to avoid interference that can occur between the base station devices 40 in advance, a frequency channel being used by another base station device 40 existing in the neighborhood of the base station device 40 (or the base station device 40 under the intermediate device 50) might not be notified as an available channel in some cases.

In this case, the communication control device 60 may transmit, as recommended frequency information, information regarding a frequency at which no interference occurs between the base station devices 40, separately from the available spectrum described in Examples 1 and 2. Here, the available spectrum information referred to in Example 1 or Example 2 may be, for example, information of an available channel described in Non Patent Literature 13. The recommended frequency information may be information regarding a recommended channel described in Non Patent Literature 13. Note that the recommended frequency information can be regarded as a type of available spectrum.

(4) Example 4

Even in a case corresponding to these cases (Example 2 and Example 3), the spectrum same as that of the primary system or the neighboring base station device 40 can be notified as an available channel. In such a case, typically, the maximum allowable transmission power information is included in the available spectrum information. The maximum allowable transmission power is typically expressed by Equivalent Isotropic Radiated Power (EIRP). The present invention is not necessarily limited to this, and may be provided by a combination of conducted power and antenna gain, for example. It is also allowable to include a feeder loss. Furthermore, the antenna gain may have an allowable peak gain set for each spatial direction.

(Details of Required Parameters)

Examples of assumable information by which the base station device 40 can be specified include information specific to the communication device registered at the time of the registration procedure, and the ID information described above (details of the registration process).

The query request can also include query requirement information. The query requirement information can include, for example, information indicating a frequency band availability of which is desired to be obtained. Also, for example, transmission power information can be included. For example, the base station device 40 or the intermediate device 50 can include the transmission power information when it is desired to know only the spectrum information likely to be available for utilization of desired transmission power. The query requirement information does not necessarily need to be included.

The query request can also include a measurement report. The measurement report includes a result of measurement performed by the base station device 40 and/or the terminal device 30. The report can include not only raw data but also processed information, for example. For example, it is possible to use standardized metrics represented by Reference Signal Received Power (RSRP), Reference Signal Strength Indicator (RSSI), and Reference Signal Received Quality (RSRQ).

[Details of Available Spectrum Evaluation Process]

Figure 20:
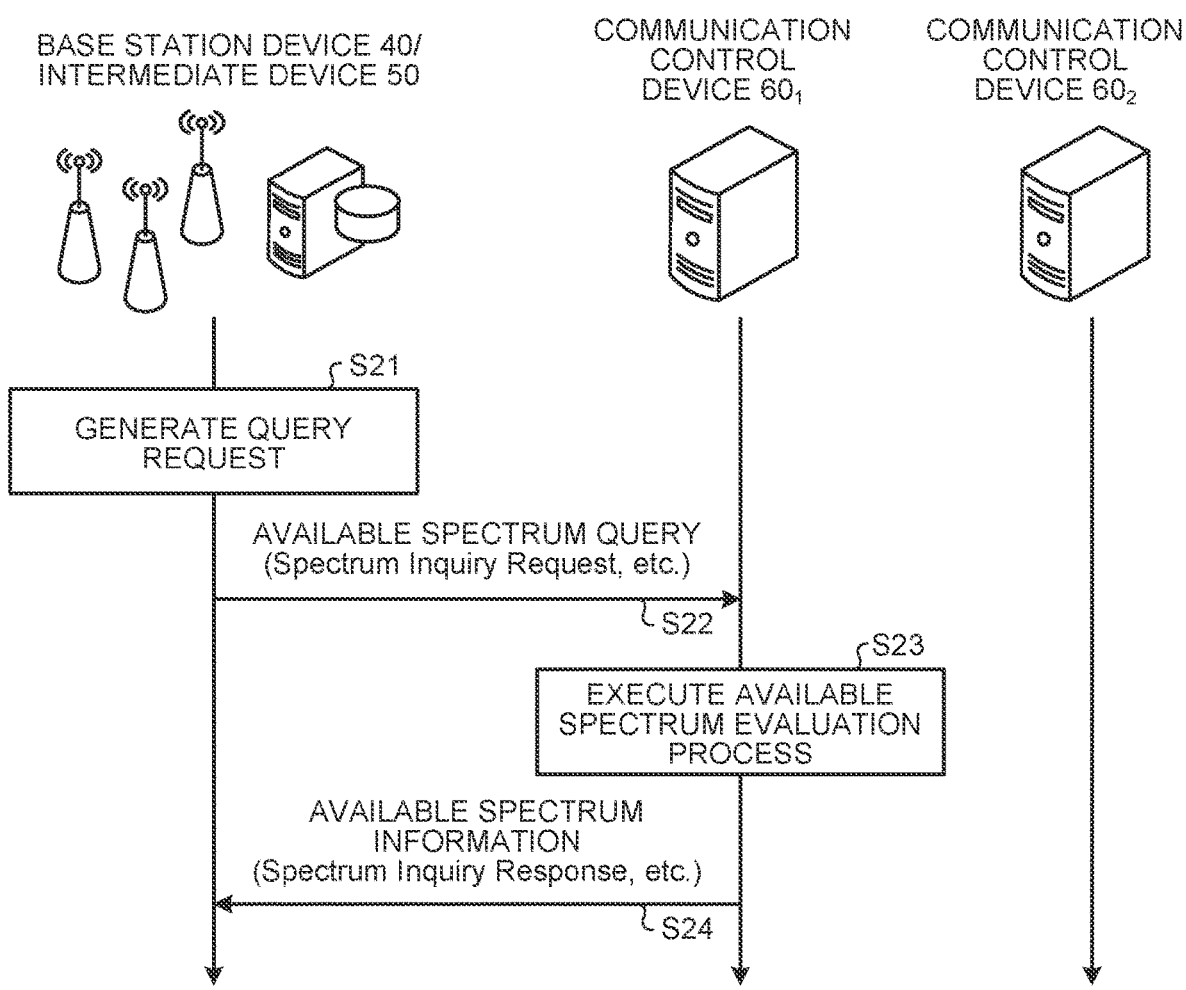
FIG. 20 is a sequence diagram illustrating an available spectrum query procedure.

FIG. 20 is a sequence diagram illustrating an available spectrum query procedure. The base station device 40 or the intermediate device 50 generates a query request including information by which the base station device 40 (or the base station device 40 under the intermediate device 50) can be specified (step S21) and notifies the communication control device 60 of the query request (step S22).

After receiving the query request, the communication control device 60 evaluates the available spectrum based on the query requirement information (step S23). For example, as described in Examples 1 to 3 described above, the available spectrum can be evaluated in consideration of the existence of the primary system, the secondary use prohibited area thereof, and the neighboring base station device 40.

As described in Example 4 above, the communication control device 60 may derive the maximum allowable transmission power information. Typically, the maximum allowable transmission power is calculated by using allowable interference power information in the primary system or its protection zone, calculation reference point information of an interference power level experienced by the primary system, registration information of the base station device 40, and a propagation loss estimation model. Specifically, as an example, calculation is performed by the following mathematical expression.

$$P_{MaxTx(dBm)} = I_{Th(dBm)} + PL(d)_{(dB)} \quad (1)$$

Here, $P_{MaxTx(dBm)}$ is maximum allowable transmission power, $I_{Th(dBm)}$ is allowable interference power, d is a distance between the reference point and the base station device 40, and $PL(d)_{(dB)}$ is a propagation loss at the distance d. Although the antenna gain in the transceiver is not explicitly indicated in the mathematical expression, the antenna gain may be included according to a method of expressing the maximum allowable transmission power (EIRP, conducted power, etc.) or a point of reference of the reception power (antenna input point, antenna output point, and the like). Furthermore, a safety margin or the like for compensating for variation due to fading may also be included. In addition, feeder loss and the like may be taken in consideration as necessary.

In addition, the above mathematical expression is described based on the assumption that the single base station device 40 is an interference source. For example, in a case where it is necessary to consider aggregated interference from a plurality of base station devices 40 at the same time, a correction value may be added. Specifically, for example, the correction value can be determined based on three types (Fixed/Predetermined, Flexible, and Flexible Minimized) of interference margin methods disclosed in Non Patent Literature 3.

Note that, although the above mathematical expression is expressed using logarithms, the mathematical expression may naturally be converted into a true number to be used at the time of implementation. In addition, all parameters in logarithmic notation described in the present embodiment may be appropriately converted into true numbers to be used.

(1) Method 1

Furthermore, as described in the section of (Details of required parameters) above, in a case where the transmission power information is included in the query requirement information, the available spectrum can be evaluated by a method different from the above-described method. Specifically, in an exemplary case where it is assumed that desired transmission power indicated by transmission power information is used and when an estimated interference amount is less than the allowable interference power in the primary system or its protection zone, it is determined that the frequency channel is available, and the base station device 40 (or the intermediate device 50) is notified of the frequency channel.

(2) Method 2

The above is an example in which the band use condition is calculated based on the other system related information, and the present disclosure is not limited to such an example. For example, similarly to an area of a radio environment map (REM), in a case where an area/space in which the base station device 40 can use the shared band is determined in advance, the available spectrum information may be derived based on only the position-related information and the height-related information. Furthermore, for example, in a case where a lookup table associating a position and a height with available spectrum information is prepared, the available spectrum information may also be derived based on only the position-related information and the height-related information.

The evaluation of the available spectrum does not necessarily need to be performed after reception of the query request. For example, after the normal completion of the above-described registration procedure, the communication control device 60 may proactively perform the procedure without any query request. In such a case, the communication control device 60 may create an REM or a lookup table exemplified in Method 2 or an information table similar thereto.

In any method, the radio wave utilization priority such as PAL or GAA may also be evaluated. For example, in a case where the registered device parameter or the query requirement includes information regarding the radio wave utilization priority, it is allowable to determine whether the spectrum is available based on the priority, and may make a notification. Furthermore, for example, as disclosed in Non Patent Literature 2, in a case where information regarding the base station device (referred to as Cluster List in Non Patent Literature 2) that performs high priority use (for example, PAL) is registered in the communication control device 60 in advance by the user, evaluation may be performed based on the information.

After the evaluation of the available spectrum is completed, the communication control device 60 notifies the base station device 40 (or the intermediate device 50) of the evaluation result (step S24). The base station device 40 may select a desired communication parameter by using the evaluation result received from the communication control device 60.

<5-3. Spectrum Grant Procedure>

The spectrum grant procedure is a procedure needed for the base station device 40 to receive secondary use grant of a spectrum from the communication control device 60. Typically, after normal completion of the registration procedure, one or more communication systems including the base station device 40 or the plurality of base station devices 40 notify the communication control device 60 of a spectrum grant request including information by which the base station device 40 can be specified, thereby starting the procedure. This notification may be performed by the intermediate device 50. Note that "after normal completion of the registration procedure" also implies that the available spectrum query procedure does not necessarily need to be performed.

As described above, the description of the "base station device 40" can be replaced with a word indicating another communication device having a wireless communication function. Furthermore, the description of "intermediate device 50" can also be replaced with a word indicating a communication system that substitutes (represents) another communication device, such as a proxy system.

In the present invention, it is assumed that at least the following two types of spectrum grant request method are usable.

Designation method

Flexible method

The designation method is a request method in which the base station device 40 designates at least a frequency band desired to be used and the maximum transmission power as desired communication parameters and requests the communication control device 60 to permit operation based on the desired communication parameters. The parameters are not necessarily limited to these parameters, and parameters specific to the wireless interface technology (such as a modulation scheme and a duplex mode) may be designated. In addition, information indicating radio wave utilization priority such as PAL and GAA may be included in the parameter.

The flexible method is a request method in which the base station device 40 designates only a requirement regarding a communication parameter and requests the communication control device 60 to designate a communication parameter that can achieve secondary use grant while satisfying the requirement. A requirement for a communication parameter can include bandwidth or a desired maximum transmission power or a desired minimum transmission power. The parameters are not necessarily limited to these parameters, and parameters specific to the wireless interface technology (such as a modulation scheme and a duplex mode) may be designated. Specifically, for example, one or more parameters of TDD Frame Configurations may be selected in advance and notified.

In any manner, a measurement report may be included in the request. The measurement report includes a result of measurement performed by the base station device 40 and/or the terminal device 30. The report can include not only raw data but also processed information, for example. For example, it is possible to use standardized metrics represented by Reference Signal Received Power (RSRP), Reference Signal Strength Indicator (RSSI), and Reference Signal Received Quality (RSRQ).

[Details of Spectrum Grant Process]

Figure 21:
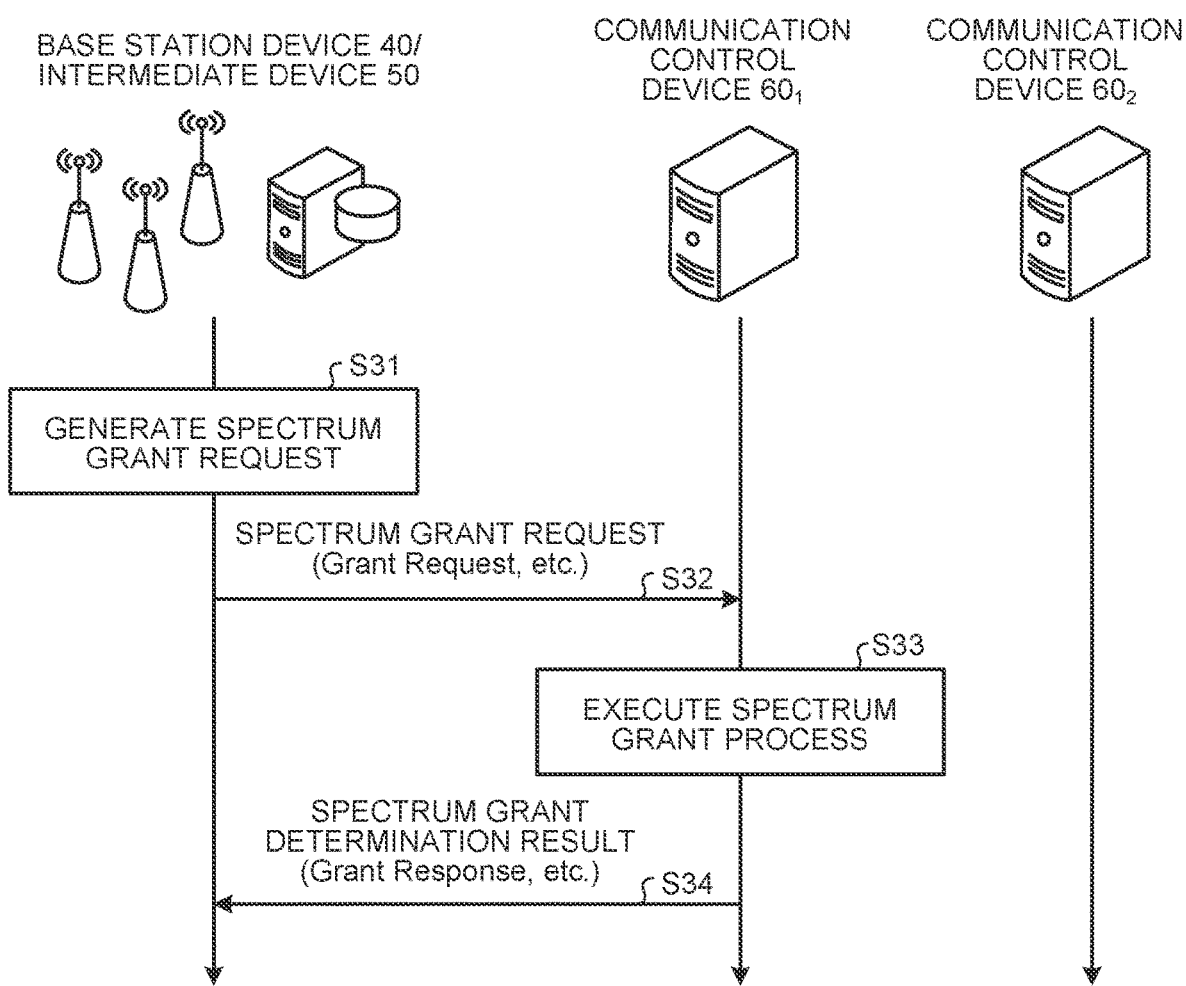
FIG. 21 is a sequence diagram illustrating a spectrum grant procedure.

FIG. 21 is a sequence diagram illustrating a spectrum grant procedure. One or more communication systems including the base station device 40 or the plurality of base station devices 40 generate a spectrum grant request including information by which the base station device 40 can be specified (step S31) and notify the communication control device 60 of the request (step S32). The generation and/or notification of the request may be performed by the intermediate device 50.

After acquiring the spectrum grant request, the communication control device 60 performs spectrum grant process based on the spectrum grant request method (step S33). For example, using the methods described in Examples 1 to 3 of <5-2. Available spectrum query procedure>, the communication control device 60 can perform the spectrum grant process in consideration of the existence of the primary system, the secondary use prohibited area thereof, and the base station device 40 in the neighborhood.

In a case where the flexible method is used, the communication control device 60 may derive the maximum allowable transmission power information using the method described in Example 4 of <5-2. Available spectrum query procedure>. Typically, the communication control device 60 calculates the maximum allowable transmission power by using allowable interference power information in the primary system or its protection zone, calculation reference point information of an interference power level experienced by the primary system, registration information of the base station device 40, and a propagation loss estimation model. For example, the communication control device 60 calculates the maximum allowable transmission power by the following Formula (2).

$$P_{MaxTx(dBm)} = I_{Th(dBm)} + PL(d)_{(dB)} \quad (2)$$

Here, $P_{MaxTx(dBm)}$ is maximum allowable transmission power, $I_{Th(dBm)}$ is allowable interference power, d is a distance between the reference point and the base station device 40, and $PL(d)_{(dB)}$ is a propagation loss at the distance d. Although the antenna gain in the transceiver is not explicitly indicated in the mathematical expression, the mathematical expression may be transformed according to a method of expressing the maximum allowable transmission power (EIRP, conducted power, etc.) or a point of reference of the reception power (antenna input point, antenna output point, and the like). Furthermore, a safety margin or the like for compensating for variation due to fading may also be included. In addition, feeder loss and the like may be taken in consideration as necessary.

In addition, the above mathematical expression is described based on the assumption that the single base station device 40 is an interference source. For example, in a case where it is necessary to consider aggregated interference from a plurality of base station devices 40 at the same time, a correction value may be added. Specifically, for example, the correction value can be determined based on three types of methods (Fixed/Predetermined, Flexible, and Flexible Minimized) disclosed in Non Patent Literature 3.

Various models can be used as the propagation loss estimation model. When a model is designated for each application, it is desirable to use the designated model. For example, in Non Patent Literature 6, a propagation loss model such as Extended Hata (eHATA) or Irregular Terrain Model (ITM) is adopted for each application. Certainly, during implementation of the present invention, the propagation loss model does not need to be limited thereto.

In a predetermined application, when a model is not designated, the model may be selectively used as necessary. As a specific example, for example, it is possible to selectively use models in such a way as to use an aggressive model such as a free space loss model when estimating the interfering power to the other base station device 40 and use a conservative model when estimating the coverage of the base station device 40.

Furthermore, in a case where the designation method is used, it is possible to perform the spectrum grant process using the method described in Method 1 of <5-2. Available spectrum query procedure>. Specifically, in an exemplary case where it is assumed that desired transmission power indicated by transmission power information is used and when an estimated interference amount is less than the allowable interference power in the primary system or its protection zone, it is determined that the use of the frequency channel can be granted, and the base station device 40 (or the intermediate device 50) is notified of the frequency channel.

In any method, the radio wave utilization priority such as PAL or GAA may also be evaluated. For example, in a case where the registered device parameter or the query requirement includes information regarding the radio wave utilization priority, it is allowable to determine whether the spectrum is available based on the priority, and may make a notification. Furthermore, for example, as disclosed in Non Patent Literature 2, in a case where information regarding the base station device (referred to as Cluster List in Non Patent Literature 2) that performs high priority use (for example, PAL) is registered in the communication control device 60 in advance by the user, evaluation may be performed based on the information.

The spectrum grant process does not necessarily have to be performed when the spectrum grant request is received. For example, after normal completion of the registration procedure described above, the communication control device 60 may proactively perform the spectrum grant process without any spectrum grant request. Furthermore, for example, the spectrum grant determination process may be performed at regular intervals. In such a case, it is allowable to create the REM and the lookup table exemplified in Method 2 of <5-2. Available spectrum query procedure> or an information table similar to these tables.

After completion of the spectrum grant process, the communication control device 60 notifies the base station device 40 of the determination result (step S34).

<5-4. Spectrum Use Notification/Heartbeat>

The spectrum use notification/heartbeat is a procedure in which the base station device 40 or the intermediate device 50 notifies the communication control device 60 of the spectrum use based on the communication parameter allowed to be used in the spectrum grant procedure. Typically, the procedure is started when the base station device 40 or the intermediate device 50 has notified the communication control device 60 of a notification message including information by which the base station device 40 can be specified.

As described above, the description of the "base station device 40" can be replaced with a word indicating another communication device having a wireless communication function. Furthermore, the description of "intermediate device 50" can also be replaced with a word indicating a communication system that substitutes (represents) another communication device, such as a proxy system.

This procedure is desirably performed periodically until the use of the spectrum is rejected from the communication control device 60. After this procedure is normally completed, the base station device 40 may start or continue radio transmission. For example, when the state of the grant indicated Granted, the state of the grant transitions to Authorized as a result of the success of this procedure. In addition, when the state of the grant indicated Authorized, failure of this procedure causes the state of the grant to transition to Granted or Idole.

Here, the grant is authorization for radio transmission given by the communication control device 60 (for example, SAS) to the base station device 40 (for example, CBSD). The grant is described, for example, in Non Patent Literature 2. According to Non Patent Literature 2, a signaling protocol between a database (SAS) and a base station (CBSD) for spectrum sharing of 3550-3700 MHz in the United States is standardized. In this standard, the authorization for radio transmission given by SAS to CBSD is referred to as a "grant". The operational parameters permitted in the grant are defined in two parameters, namely, maximum allowable equivalent isotropic radiated power (EIRP) and a frequency channel. That is, in order to perform radio transmission using a plurality of frequency channels, CBSD needs to acquire a plurality of grants from SAS.

Figure 22:
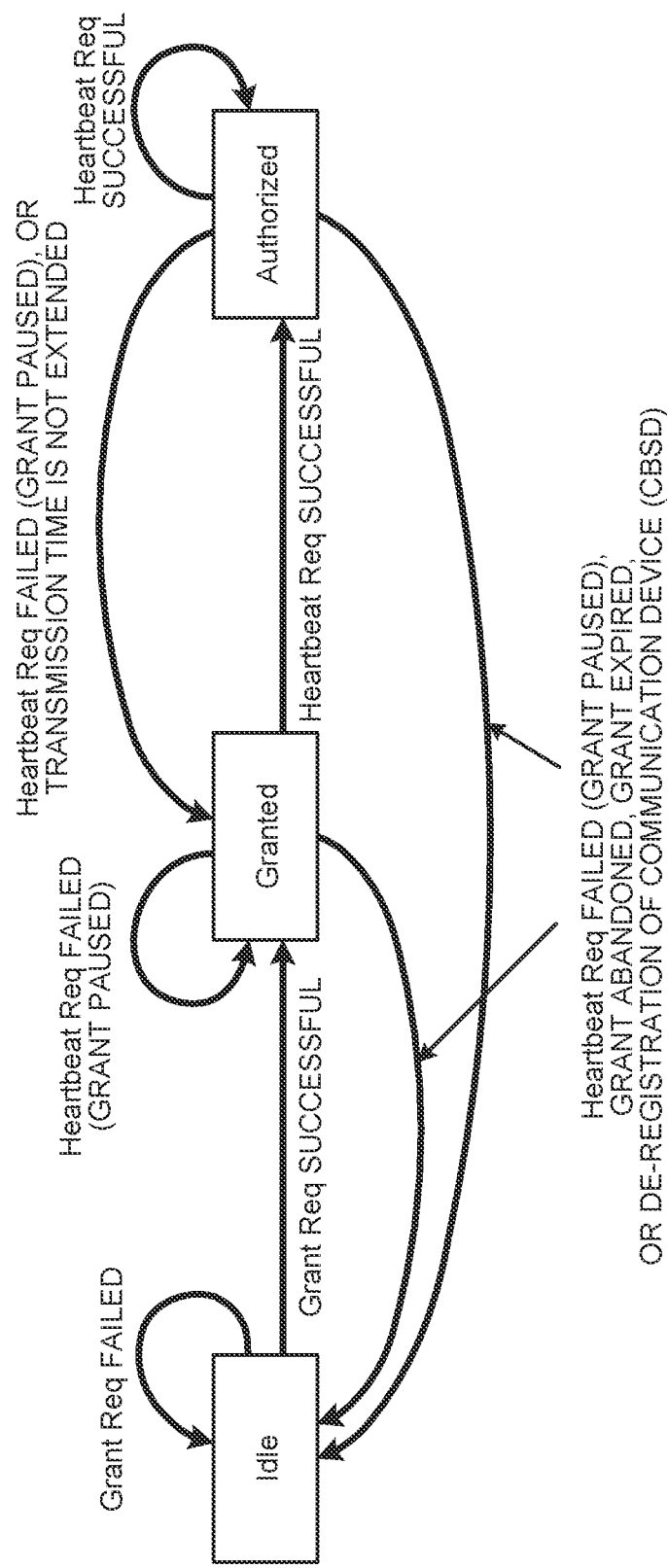
FIG. 22 is a state transition diagram illustrating a radio transmission permission state.

The grant has defined states indicating radio transmission permission states. Examples of the states indicating the radio transmission permission states include a Granted state and an Authorized state. FIG. 22 is a state transition diagram illustrating a radio transmission permission state. In FIG. 22, the Granted state indicates a state of holding a grant but being prohibited from performing radio transmission, while the Authorized state indicates a state in which radio transmission is permitted based on an operational parameter value defined in the grant. These two states transition according to a result of a heartbeat procedure defined in the same standard.

In the following description, the spectrum use notification/heartbeat will be sometimes referred to as a heartbeat request or simply a heartbeat. In addition, a transmission interval of a heartbeat request may be referred to as a heartbeat interval. Note that the description of a heartbeat request or a heartbeat in the following description can be appropriately replaced with another description indicating "a request for starting or continuing radio transmission". Similarly, the heartbeat interval can also be replaced with another description (for example, the transmission interval) indicating the transmission interval of the spectrum use notification/heartbeat.

Figure 23:
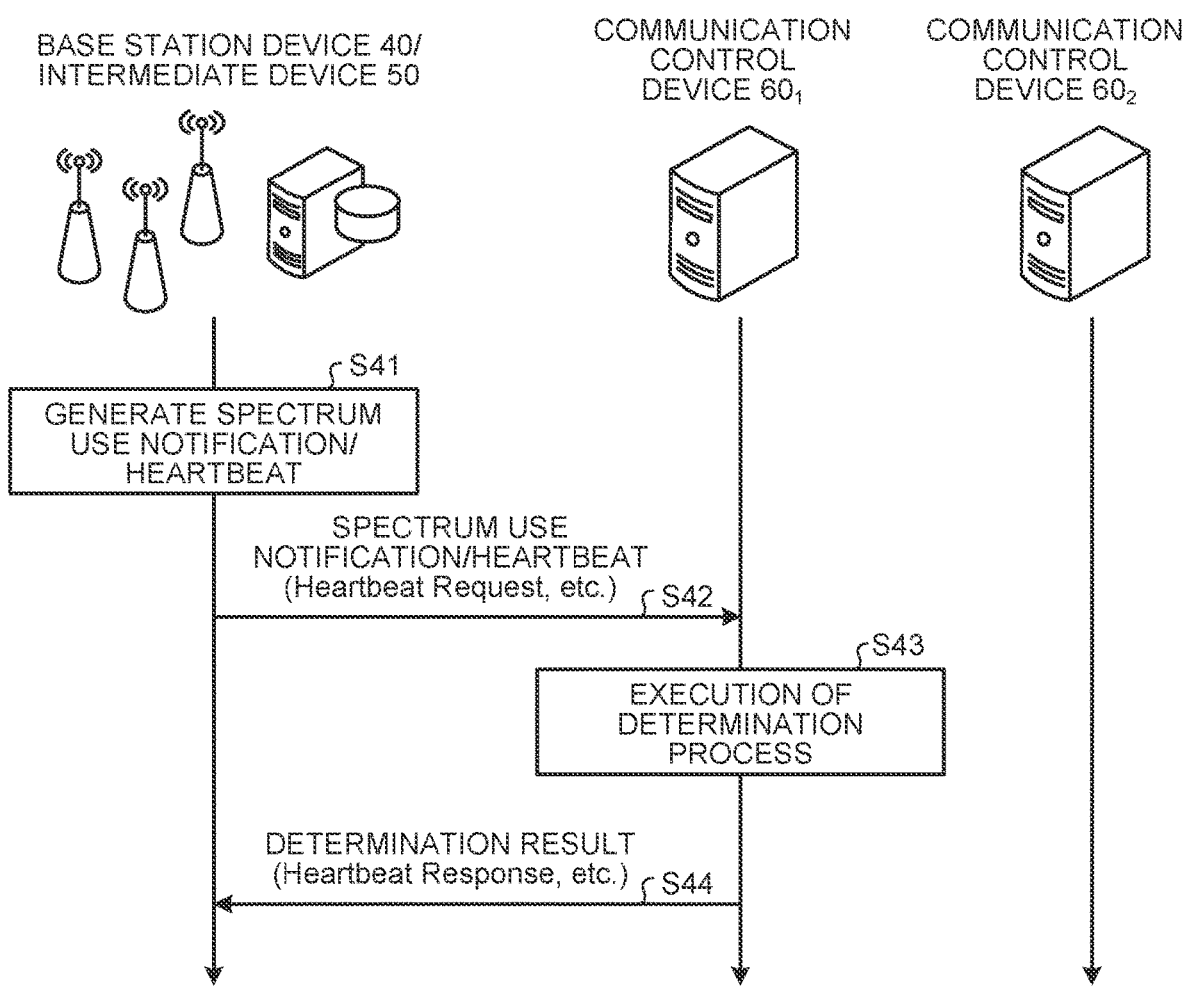
FIG. 23 is a sequence diagram illustrating a spectrum use notification/heartbeat procedure.

FIG. 23 is a sequence diagram illustrating a spectrum use notification/heartbeat procedure. One or more communication systems including the base station device 40 or the plurality of base station devices 40 generate a notification message including information by which the base station device 40 can be specified (step S41) and notify the communication control device 60 of the message (step S42). The generation and/or notification of the message may be performed by the intermediate device 50.

After receiving the spectrum use notification/heartbeat, the communication control device 60 may determine whether the start/continuation of the radio transmission is permitted (step S43). Examples of the determination method include confirmation of the spectrum use information of the primary system. Specifically, the start/continuation permission or rejection of the radio transmission can be determined based on a change in the spectrum used by the primary system, a change in the status of spectrum used by the primary system with no steady use of radio waves (for example, in-ship radar), or the like.

After the determination process is completed, the communication control device 60 notifies the base station device (or the intermediate device 50) of the determination result (step S44).

In the present procedure, a communication parameter reconfiguration command may be issued from the communication control device 60 to the base station device 40 (or the intermediate device 50). Typically, the reconfiguration command can be executed in response to the spectrum use notification/heartbeat. For example, recommended communication parameter information can be provided.

<5-5. Supplement to Various Procedures>

Here, the various procedures do not necessarily need to be individually implemented as described below. For example, the two different procedures may be implemented by substituting a third procedure with the roles of the two different procedures. Specifically, the registration request and the available spectrum information query request may be integrally notified, for example. Furthermore, for example, the spectrum grant procedure and the spectrum use notification/heartbeat may be integrally performed. It is of course allowable to set the number of combinations to three or more, not limited to these combinations. Furthermore, the above procedure may be separately performed.

In addition, in a case where the present embodiment is applied for the purpose of spectrum sharing with an incumbent system, it is desirable that appropriate procedures or equivalent procedures are selected and used based on the radio law related to the frequency band in a country or region in which the technology of the present embodiment is implemented. For example, in a case where registration of a communication device is required to use a specific frequency band in a specific country or region, it is desirable to perform the registration procedure.

In addition, the expression of "acquiring information" or an expression equivalent thereto in the present embodiment does not necessarily mean that the information is acquired precisely following the procedure described above. For example, even with a description that the location information of the base station device 40 is used in the available spectrum evaluation process, it means it is not always necessary to use the information acquired in the registration procedure. For example, when the location information is included in the available spectrum query procedure request, the location information may be used. In other words, this means that the described parameters may be included in other procedures within the scope described in the present embodiment and within the scope of technical feasibility.

Furthermore, information that can be included in the response from the communication control device 60 to the base station device 40 (or the intermediate device 50) described in the above procedure may be notified by push notification. As a specific example, available spectrum information, recommended communication parameter information, radio transmission continuation/refusal notification, and the like may be notified by push notification.

<5-6. Various Procedures Related to Terminal Device>

Basically, individual procedures described in <5-1> to <5-4> are usable for the terminal device 30. However, unlike the base station device 40, the terminal device 30 has mobility. That is, the location information is dynamically updated. Depending on the legal system, when the change in the location information is a certain level or more, re-registration to the communication control device 60 would be required in some cases. Therefore, in an operation mode defined by the Office of Communication (Ofcom) (refer to Non Patent Literature 4), the following two types of communication parameters are defined.

Specific operational parameters
Generic operational parameters

The specific operational parameters are defined as "operational parameters unique to a specific slave White Space Device (WSD)" in the Non Patent Literature. In other words, the parameter is a communication parameter calculated by using the device parameter of the slave WSD corresponding to the terminal device 30. The parameter is characterized by being calculated by a White Space Database (WSDB) using the location information of the slave WSD.

The generic operational parameters are defined as "operational parameters usable by any slave WSD located within the coverage area of a predetermined master WSD (corresponding to the base station device 40)" in the Non Patent Literature. The parameter is characterized by being calculated by the WSDB without using the location information of the slave WSD.

The information for the terminal device 30 can be provided from the base station device 40 by unicast/broadcast. For example, a broadcast signal represented by Contact Verification Signal (CVS) defined in FCC rule Part 15 Subpart H can be used for providing the information. Alternatively, the information may be provided by a broadcast signal specific to a wireless interface. Specifically, the information may be provided by using a physical broadcast channel (PBCH) or NR-PBCH used in LTE or 5G NR, for example.

<5-7. Procedure Occurring Between Communication Control Devices>

[Information Exchange]

Figure 24:
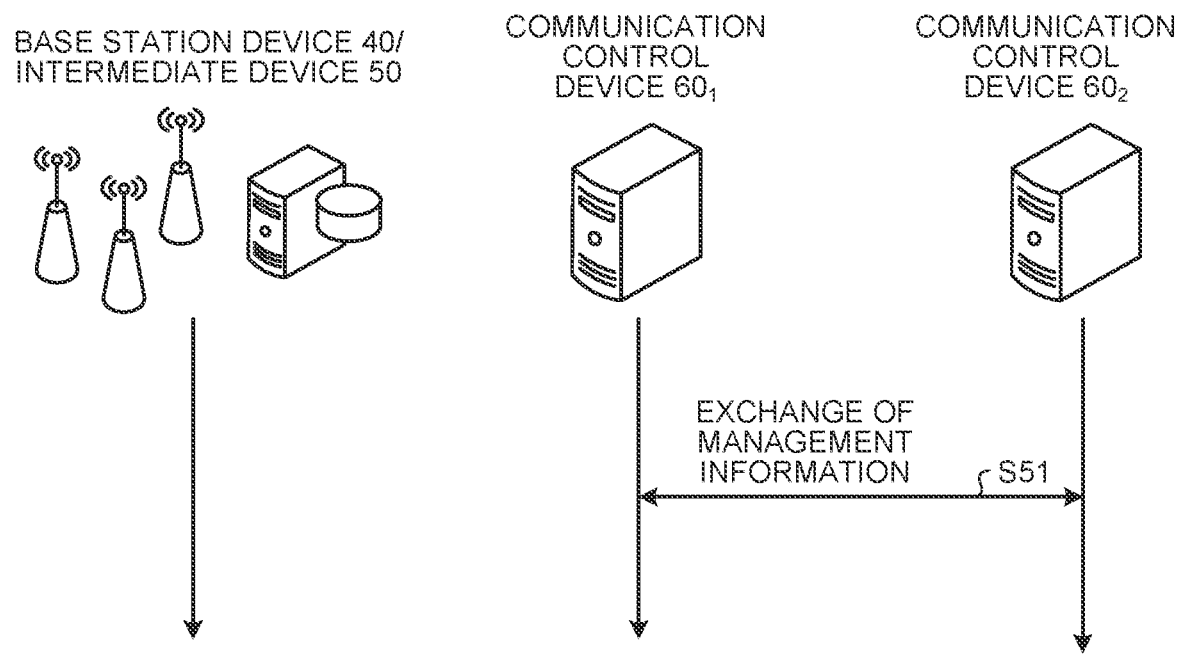
FIG. 24 is a sequence diagram illustrating a management information exchange procedure.

The communication control device 60 can exchange management information with another communication control device 60. FIG. 24 is a sequence diagram illustrating a management information exchange procedure. In the example of FIG. 24, the communication control device $60_1$ and the communication control device $60_2$ exchange information. Note that the communication control device that exchanges information is not limited to the two devices, namely, the communication control device $60_1$ and the communication control device $60_2$.

It is desirable that, in the management information exchange procedure, at least the following information is to be exchanged.

Communication device registration information
Communication device communication parameter information
Area information The communication device registration information is typically a device parameter of the base station device 40 to be registered in the communication control device 60 in the registration procedure. There is no need to exchange all the registered information. For example, there is no need to exchange information that might correspond to personal information. Furthermore, when the communication device registration information is exchanged, information that has undergone encryption or obfuscation may be exchanged. For example, information converted into a binary value or information signed using an electronic signature mechanism may be exchanged.

Typically, the communication device communication parameter information is information related to a communication parameter currently used by the base station device 40. It is desirable that the information includes at least information indicating the spectrum being used and the transmission power. The information may include other communication parameters.

The area information is typically information indicating a predetermined geographical zone. The information can include zone information of various attributes in various modes.

For example, the information may include protection zone information of the base station device 40 to be a high priority secondary system such as PAL Protection Area (PPA) disclosed in Non Patent Literature 5. The area information in this case can be expressed by a set of three or more geolocation coordinates, for example. Furthermore, for example, in a case where a plurality of communication control devices 60 can refer to a common external database, the information can be expressed by an ID indicating the information.

Furthermore, the information may include information indicating the coverage of the base station device 40, for example. The area information in this case can also be expressed by a set of three or more geolocation coordinates, for example. Furthermore, for example, the information can also be expressed by information indicating a radius size when assuming a circle having its origin in the geographical location of the base station device 40. Furthermore, for example, in a case where a plurality of communication control devices 60 can refer to a common external database, the information can be expressed by an ID indicating the information.

Furthermore, as another aspect, the area information can include information regarding an area section determined in advance by the government or the like. Specifically, for example, it is possible to indicate a certain region by indicating a postal address. Furthermore, for example, a license area or the like can be similarly expressed.

Furthermore, as still another aspect, the area information does not necessarily have to express a planar area, and may express a three-dimensional space. For example, it may be expressed using a spatial coordinate system. In addition, for example, information indicating a predetermined closed space, such as a floor number, a floor, or a room number of a building, may be used.

These pieces of information can be exchanged in various methods. Example of methods will be described below.

ID designation method
Period designation method
Zone designation method
Dump method The ID designation method is a method of acquiring information corresponding to an ID assigned in advance to specify information managed by the communication control device 60 by using the ID. For example, it is assumed that the communication control device $60_1$ manages a base station device 40 with ID: AAA. At this time, the communication control device $60_2$ designates the ID: AAA and makes an information acquisition request to the communication control device $60_1$. After receiving the request, the communication control device 60₁ searches for information of ID: AAA, and notifies the registration information and the communication parameter information of the corresponding base station device 40 as a response.

The period designation method in which a specific period is designated and information satisfying a predetermined condition can be exchanged during the period.

Examples of the predetermined condition include the presence or absence of information update. For example, in a case where acquisition of communication device information in a specific period is designated by a request, registration information regarding the base station device 40 newly registered in the period, registration information of the base station device 40 whose communication parameter has been changed, and information regarding the communication parameter, can be notified as a response.

Examples of the predetermined condition include whether the communication control device 60 has performed recording. For example, in a case where acquisition of the communication device information in a specific period is designated by the request, the registration information of the base station device 40 and the information of the communication parameter recorded by the communication control device 60 in the specific period can be notified as a response. Furthermore, the latest information in the period can be notified. Alternatively, the update history may be notified for each piece of information.

The zone designation method is a method of designating a specific zone, and exchanging information belonging to the zone. For example, in a case where acquisition of communication device information in a specific zone is designated by a request, registration information regarding the base station device 40 installed in the zone and information regarding a communication parameter can be notified as a response.

The dump method is a method of providing all information recorded by the communication control device 60. At least information and area information regarding the base station device 40 are desirably provided by the dump method.

All the above description of the information exchange between the communication control devices 60 is based on a pull method. That is, information exchange is performed in a mode in which information corresponding to the parameter designated in the request is given as a response, and can be implemented by the HTTP GET method as an example. However, the present invention is not limited to the pull method, and information may be actively provided to another communication control device 60 by a push method. The push method can be implemented by the HTTP POST method, as an example.

[Command/Request Procedure]

The communication control device 60 may send a command and/or a request to each other. A specific example of this is reconfiguration of communication parameters of the base station device 40. For example, when it is determined that the base station device 40₁ managed by the communication control device 60₁ is experiencing a large amount of interference from the base station device 40₄ managed by the communication control device 60₂, the communication control device 60₁ may request the communication control device 60₂ to change the communication parameter of the base station device 40₄.

Another example is reconfiguration of area information. For example, when incompletion is found in calculation of the coverage information and the protection zone information regarding the base station device 40₄ managed by the communication control device 60₂, the communication control device 60₁ may request the communication control device 60₂ to reconfigure the area information. Besides this, the area information reconfiguration request may be made for various reasons.

<5-8. Representative Operation Flow>

Next, a representative operation flow related to interference control calculation will be described.

Figure 25:
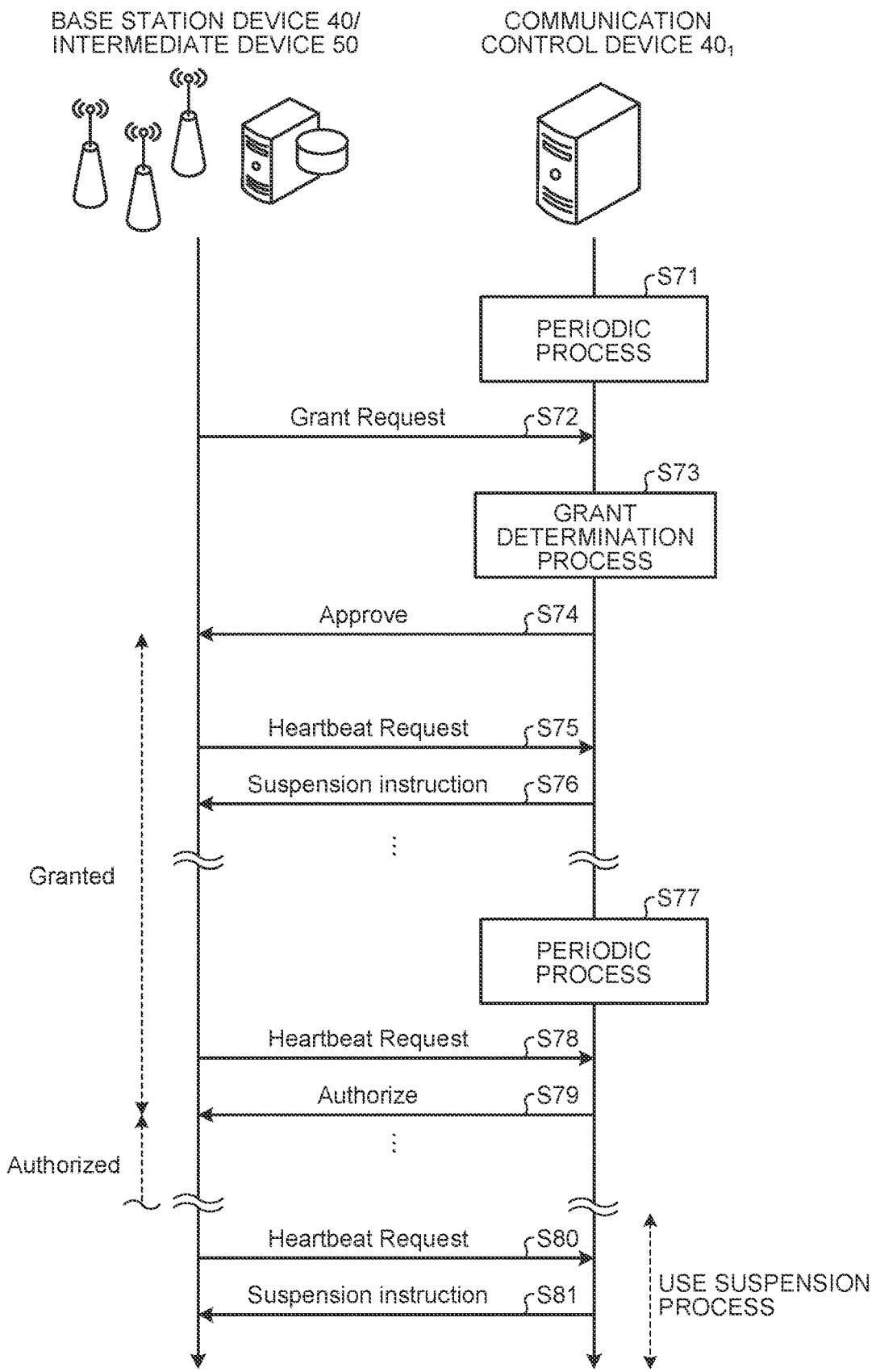
FIG. 25 is a sequence diagram illustrating an example of an operation related to a grant.

FIG. 25 is a sequence diagram illustrating an example of an operation related to a grant. Specifically, FIG. 25 is a sequence diagram illustrating an operation of the communication system 2 corresponding to procedures of <5-3. Spectrum grant procedure> and <5-4. Spectrum use notification/heartbeat>. Note that the operation flow illustrated in FIG. 25 is merely an example, and various changes are made depending on a state of the base station device 40, the communication control device 60, and the intermediate device 50, or the like.

First, the communication control device 60₁ executes a periodic process at the execution timing of the periodic process (step S71). The periodic process is a process of executing information synchronization between the communication control devices 60 and calculation related to primary system protection. An example of the periodic process is Coordinated Periodic Activities among SASs (CPAS) described in Non Patent Literature 10 and Non Patent Literature 11. In the following description, the periodic process may be referred to as periodic protection calculation. The execution timing of the periodic process is a point 24 hours after the previous execution of the periodic process, for example. Naturally, the execution interval of the periodic process is not limited to 24 hours.

Figure 26:
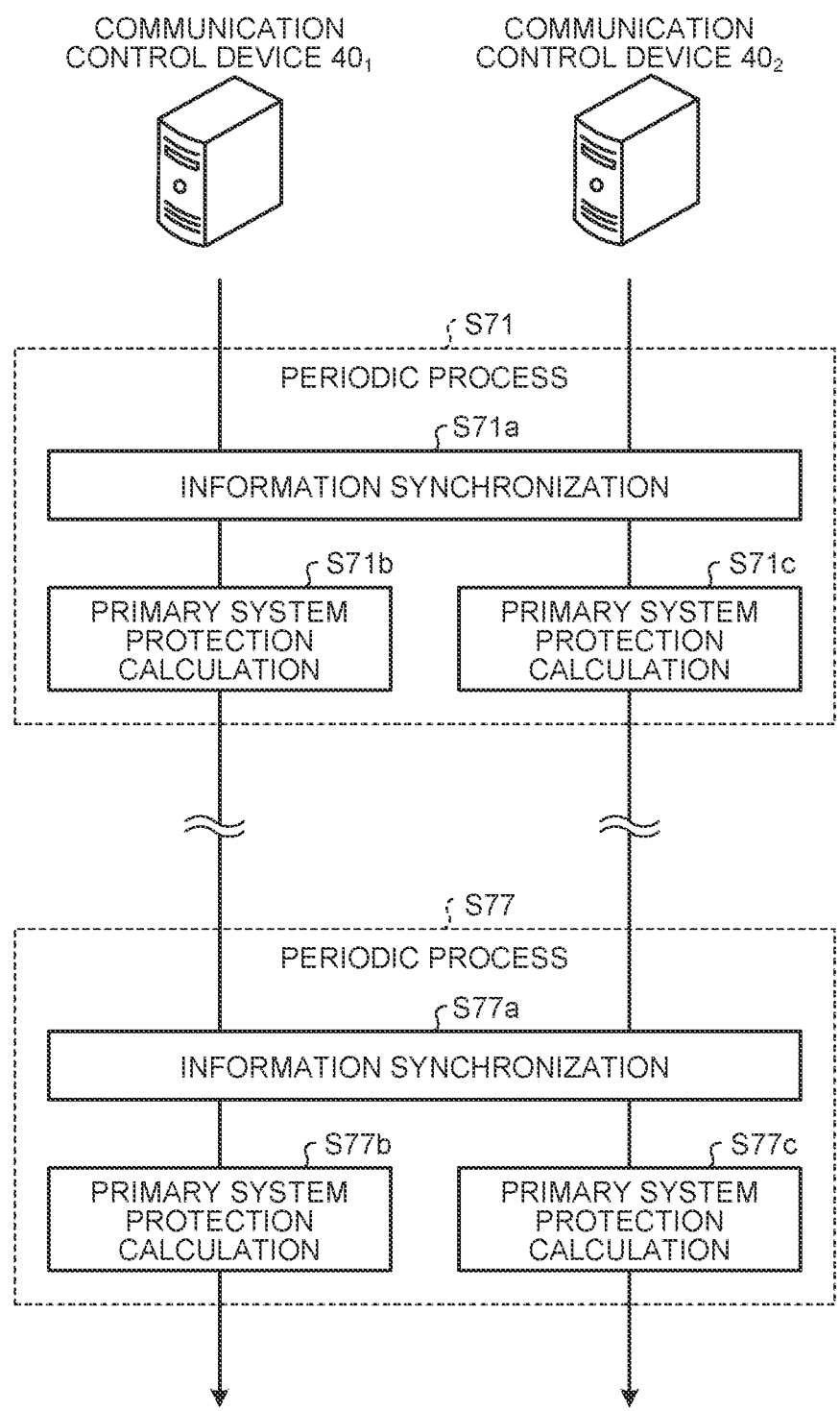
FIG. 26 is a diagram illustrating specific processing contents of a periodic process.

FIG. 26 is a diagram illustrating specific processing contents of the periodic process. In the example of FIG. 26, the communication control device 60₁ and the communication control device 60₂ perform information synchronization and primary system protection calculation. Note that the number of communication control devices 60 that perform periodic process (information synchronization or the like) may be more than two.

As illustrated in FIG. 26, each of the plurality of communication control devices 60 executes a periodic process (step S71). First, each of the plurality of communication control devices 60 synchronizes information with the other communication control device(s) 60 (step S71a). Subsequently, each of the plurality of communication control devices 60 performs primary system protection calculation (step S71b and step S71c). At this time, the communication control device 60 may calculate an estimated value of an interference amount, a residual interference margin, or the like that can be individually given to the primary system by each communication node (for example, the base station device 40).

Returning to FIG. 25, the base station device 40 or the intermediate device 50 transmits a grant request to the communication control device 60₁ (step S72). In the present embodiment, the base station device 40 or the intermediate device 50 adds, to the grant request, information regarding the use mode of spectrum resource (radio resource) allocated as a result of the grant request. For example, the base station device 40 or the intermediate device 50 adds information indicating "grant application and details" to the grant request.

The acquisition unit 641 of the communication control device 60₁ acquires a grant request to which the use mode information is added. The communication control device 60₁ performs a process related to the spectrum resources (that is, a process related to grant) based on the use mode information (step S73). For example, the communication control device 60₁ performs a grant determination process for allocating an available spectrum to the base station device 40 based on the use mode information.

After allocating the spectrum, the communication control device 60₁ transmits a grant response to the base station device 40 or the intermediate device 50. In the example of FIG. 25, the communication control device 60₁ notifies the success of the grant request (Approve illustrated in FIG. 25) as the grant response (step S74). The acquisition unit 441 of the base station device 40 or the acquisition unit 541 of the intermediate device 50 acquires the grant response from the communication control device 60₁. Due to the success of the grant request, the grant state of the base station device 40 transitions from Idole to Granted as illustrated in FIG. 22. The base station device 40 performs setting of individual parts based on the allocated grant.

Subsequently, the base station device 40 or the intermediate device 50 transmits a heartbeat request to the communication control device 60₁ (step S75). Subsequently, the acquisition unit 641 of the communication control device 60₁ acquires the transmitted heartbeat request. The communication control device 60₁ then transmits a heartbeat response.

Note that, in the example of FIG. 25, the grant allocated to the base station device 40 has not passed the periodic process (for example, CPAS) yet. Therefore, in the example of FIG. 25, the communication control device 60₁ cannot approve the start of the radio transmission. Accordingly, the communication control device 60₁ transmits a radio transmission suspension instruction as a heartbeat response (step S75).

Thereafter, the base station device 40 or the intermediate device 50 continues to transmit the heartbeat request at the heartbeat interval notified from the communication control device 60₁. In response to the heartbeat request, the communication control device 60₁ continues to transmit the radio transmission suspension instruction as a heartbeat response until the next periodic process is completed (step S76).

When the execution timing of the periodic process arrives, each of the plurality of communication control devices 60 including the communication control device 60₁ executes the periodic process (step S77). For example, as illustrated in FIG. 26, each of the plurality of communication control devices 60 synchronizes information with the other communication control device(s) 60 (step S77a). Subsequently, each of the plurality of communication control devices 60 performs primary system protection calculation (step S77b and step S77c). This protection calculation is an example of interference calculation of the present embodiment.

Subsequently, the base station device 40 or the intermediate device 50 transmits a heartbeat request to the communication control device 60₁ (step S78). Subsequently, the acquisition unit 641 of the communication control device 60₁ acquires the transmitted heartbeat request. Next, the communication control device 60₁ transmits the heartbeat response. At this time, since the grant allocated to the base station device 40 has passed the periodic process, the communication control device 60₁ can approve the start of the radio transmission of the base station device 40 that has transmitted the heartbeat request. Accordingly, the communication control device 60₁ transmits success (Authorize illustrated in FIG. 25) of the heartbeat response as the heartbeat response (step S78). As a result of the success of the heartbeat request, the grant state of the base station device 40 transitions from Granted to Authorized as illustrated in FIG. 22. The base station device 40 performs radio communication by controlling the radio communication unit 41 based on the allocated grant.

As described above, the state of the grant (the state indicating the radio transmission permission state) transitions according to the result of the heartbeat procedure. One purpose among various purposes defined in the heartbeat procedure is a radio wave suspension instruction of the base station device 40 at the time of use of the radio wave by incumbent systems (for example, in-ship radar) in a same band. For example, when it is determined that an incumbent system such as the communication system 1 is using radio waves, the communication control device 60 must suspend radio waves of all the base station devices 40 that can cause interference within a predetermined time (for example, within 300 seconds). At this time, push notification of the suspension instruction is assumed to be complicated in implementation, the communication control device 60 may issue the radio wave suspension instruction using a heartbeat response. In the following description, a process for causing the base station device 40 to suspend the use of the spectrum resources, which is executed by the communication control device 60, is referred to as a "spectrum resource use suspension process" or a "grant suspension process".

For example, the base station device 40 or the intermediate device 50 transmits a heartbeat request to the communication control device 60₁ (step S80). Subsequently, the communication control device 60₁ acquires the transmitted heartbeat request. The communication control device 60₁ then determines whether a primary system such as the communication system 1 is using radio waves. When it is determined that the primary system is performing radio wave utilization related to a predetermined spectrum resource, the communication control device 60₁ transmits a radio transmission suspension instruction as a heartbeat response (step S81). The base station device 40 suspends the transmission of the radio wave related to the predetermined spectrum resource. With this procedure, the grant state of the base station device 40 transitions from Authorized to Idle (or Granted) as illustrated in FIG. 22. Alternatively, as illustrated in FIG. 22, the grant state of the base station device 40 transitions from Granted to Idole.

6. OPERATION RELATED TO MEDIUM RESERVATION OF COMMUNICATION CONTROL DEVICE

Next, an operation related to the medium reservation scheme of the present embodiment will be described with an operation of the communication control device 60 as an example. Here, the medium reservation scheme is a reservation scheme for using radio resources such as a spectrum. In addition, here, the spectrum resource to be used is the available spectrum described in 5-2 and 5-3 in the case of a shared band. In addition, even in an unlicensed band, it is allowable to use a recommended frequency derived by the communication control device based on the above-described interference control method.

(Outline of Operation Related to Medium Reservation Scheme)

The communication control device 60 according to the present embodiment acquires communication device-specific information (hereinafter, referred to as specific information) which is information specific to one or more communication devices (for example, the base station devices 40). Examples of the specific information include ID information, installation location information, and wireless interface technical information regarding the communication device. The specific information may include capability information regarding the communication device other than these pieces of information. For example, the specific information may include information regarding a radio access method used by the communication device and information regarding whether the communication device can be synchronized with another communication device.

The communication control device 60 determines a medium reservation scheme based on the acquired specific information, and notifies the communication device (for example, the base station device 40) of information regarding the determined medium reservation scheme. The communication device executes medium reservation based on the notified medium reservation scheme.

The present embodiment assumes, as a medium reservation scheme, a method in which a reception side (for example, the base station device 40) first transmits a dedicated signal to a transmission side (for example, the terminal device 30) for medium reservation, and the transmission side performs transmission when having heard the signal. Note that the reception side may be the terminal device 30 and the transmission side may be the base station device 40. Here, examples of the assumed dedicated signal include a common waveform that does not depend on a wireless interface, a common preamble, and a common control signal.

The above is the outline of the operation of the communication control device 60 related to the medium reservation scheme. In the following, the operation of the communication control device 60 related to the medium reservation scheme will be described in detail.

Note that the following description assumes an example in which the communication device to which the information regarding the medium reservation scheme is notified from the communication control device 60 is the base station device 40. However, the communication device to which the information regarding the medium reservation scheme is notified is not limited to the base station device 40, and may be the intermediate device 50 or the terminal device 30, for example. The description of "base station device 40" or "communication device" in the following description can be appropriately replaced with a description indicating a communication device (for example, intermediate device 50 or terminal device 30) other than the base station device 40.

<6-1. Units of Application for Medium Reservation Scheme>

First, units of application for the medium reservation scheme will be described.

A mutual interference group is assumed as the units of application for the medium reservation scheme. The communication control device 60 specifies a mutual interference group from among a plurality of communication devices (for example, a plurality of base station devices 40) and determines a medium reservation scheme for each specified group. Here, the mutual interference group is a group of communication devices that can interfere with each other.

Hereinafter, examples of the mutual interference group will be described. Note that the mutual interference group is not limited to Example 1 and Example 2 described below.

(Mutual Interference Group: Example 1)

Figure 27:
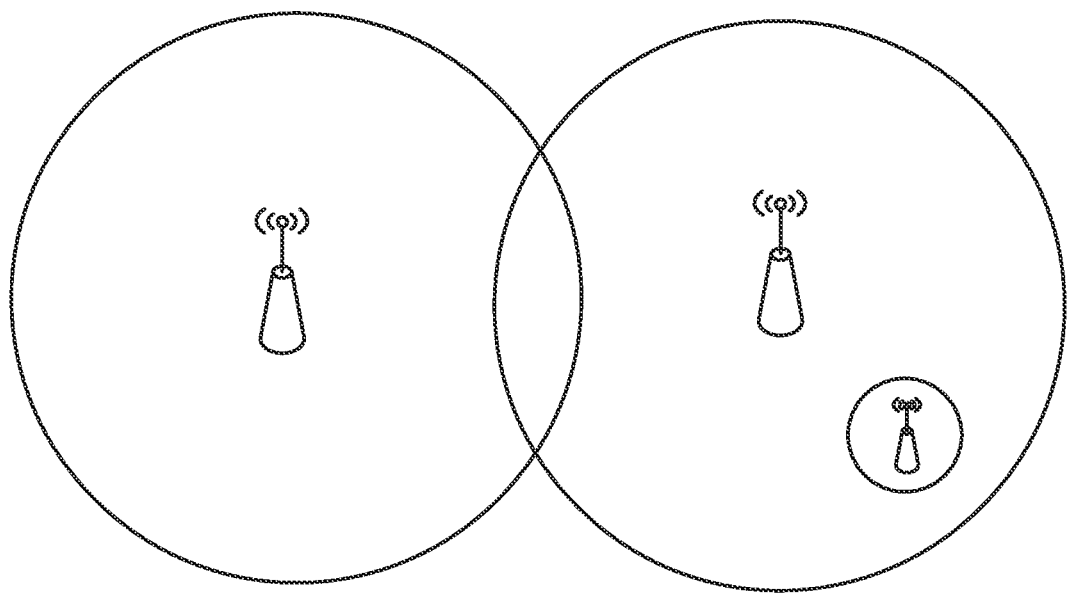
FIG. 27 is a diagram illustrating an example of a mutual interference group.

An example of the mutual interference group includes a case of a pair of communication devices in which pieces of coverage of the devices partially or entirely overlap each other. FIG. 27 is a diagram illustrating an example of a mutual interference group. In FIG. 27, three circles centered on each of three base station devices indicate pieces of coverage of the three base station devices. In the example of FIG. 27, the three base station devices correspond to a mutual interference group.

Examples of the criteria for defining "overlapping" include the following (A1) to (A3). Note that the criteria for defining "overlapping" are not limited to the examples illustrated in (A1) to (A3) below.

(A1) Ratio between overlapping portion and non-overlapping portion in entire coverage (A2) Presence of any overlap (that is, the area of the overlapping portion $>0$ m$^2$)

(A3) Whether probability that the interference power value exceeds a predetermined interference threshold (location rate, time rate, etc.) exceeds a predetermined threshold probability in the overlapping portion The communication control device 60 specifies a mutual interference group based on the above criteria and information (for example, communication device-specific information) acquired from each of the plurality of communication devices. There may be a plurality of mutual interference groups specified by the communication control device 60.

(Mutual Interference Group: Example 2)

Figure 28:
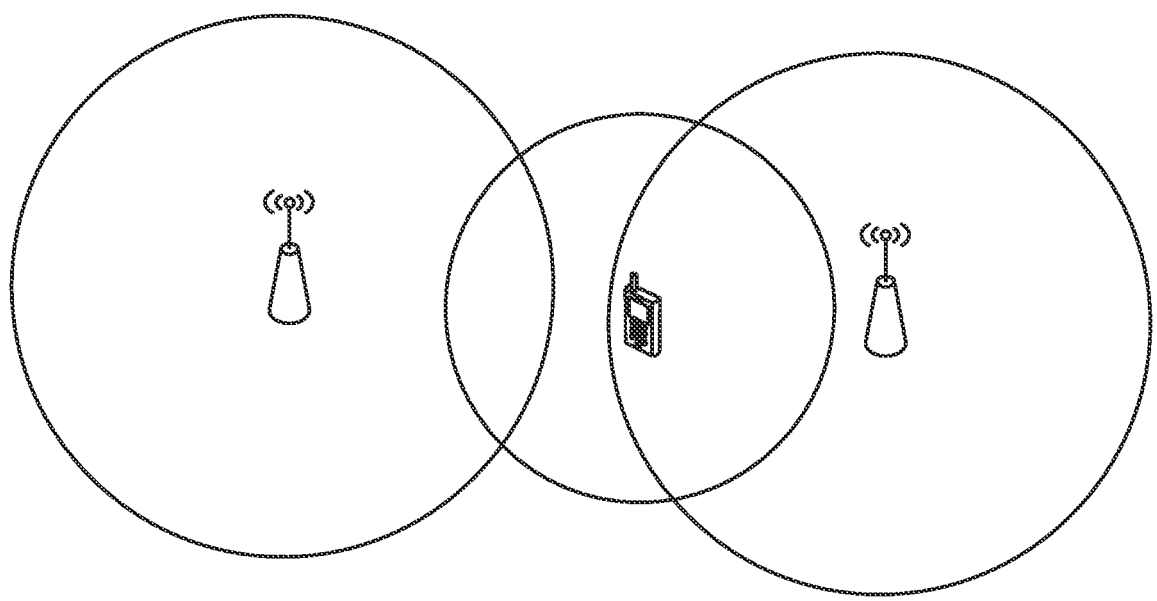
FIG. 28 is a diagram illustrating another example of the mutual interference group.

Another example of the mutual interference group includes a case of a pair of communication devices in which radio wave coverage of a terminal device overlaps with a part or all of coverage of a non-serving communication device. FIG. 28 is a diagram illustrating another example of the mutual interference group. FIG. 28 illustrates an example in which the radio wave coverage of the terminal device overlaps with a part of the coverage of the non-serving communication device.

The communication control device 60 specifies a mutual interference group based on the criteria and information (for example, communication device-specific information) acquired from each of the plurality of communication devices. There may be a plurality of mutual interference groups specified by the communication control device 60.

(Exceptions)

Note that even a pair of communication devices satisfying the above Example 1 and/or the above Example 2 can be regarded by the communication control device as communication devices that do not interfere with each other in a case where predetermined criteria are satisfied. For example, in a case where a plurality of communication devices having an interference relationship satisfying Example 1/Example 2 described above cooperates with each other using a predetermined communication technology, the communication control device can regard the plurality of communication devices as communication devices that do not interfere with each other.

The following (B1) to (B2) are assumable criteria that "they do not interfere with each other". These are considered as assumable examples. Note that the criteria for deciding "not interfering with each other" is not limited to the examples illustrated in (B1) to (B2) above.

(B1) When forming a common network (for example, having the same SSID, having the same cell ID, or the like)

(B2) When communication devices are working in cooperation (for example, Coordinated Multi Point (CoMP), Dual Connectivity, and the like)

<6-2. Determination Criteria for Medium Reservation Scheme>

Next, determination criteria of the medium reservation scheme will be described.

The communication control device 60 determines a medium reservation scheme for a plurality of communication devices to share a predetermined channel based on information (for example, specific information) acquired from each of the plurality of communication devices. For example, the communication control device 60 determines a medium reservation scheme to be applied to each of the plurality of communication devices constituting the specified mutual interference group. When there is a plurality of specified mutual interference groups, the communication control device 60 determines the medium reservation scheme for each of the specified groups.

Regarding the communication control device 60, although the following description is a case where the communication control device 60 determines the medium reservation scheme for each of the mutual interference groups, units of determination for the medium reservation scheme do not necessarily have to be the units of mutual interference groups.

Various types of criteria are assumable as criteria for determining the medium reservation scheme. Hereinafter, examples of determination criteria of the medium reservation scheme will be described.

<6-2-1. Determination Criterion 1 (Asynchronous Channel Access)>

In a case where there is a communication device that cannot be synchronized with another communication device in a specified group, the communication control device 60 determines to adopt an asynchronous channel access scheme as the medium reservation scheme of the group. Examples of the asynchronous channel access scheme include the Listen Before Talk (LBT) scheme.

Here, examples of the "communication device that cannot be synchronized with another communication device" include the following (C1) to (C2). Note that the "communication device that cannot be synchronized with another communication device" is not limited to the following example.

(C1) Device not having, in terms of specifications of the wireless interface technology, a function of recognizing a synchronization signal transmitted from another communication device (C2) Device not having a mechanism of synchronization due to an external instruction When at least one communication device satisfying (C1) or (C2) is present in a specified group, the communication control device 60 determines to use the asynchronous channel access scheme as the medium reservation scheme in the group.

<6-2-2. Determination Criterion 2 (Synchronous Channel Access)>

In a case where all the communication devices in the group are communication devices capable of synchronization, the communication control device 60 determines to adopt the synchronous channel access scheme as the medium reservation scheme of the group. For example, in a case where there is no communication device (for example, the base station device 40) satisfying (C1) and (C2) in the specified group, the communication control device 60 determines to use the synchronous channel access scheme as the medium reservation scheme in the group.

Here, the synchronous channel access scheme may be a scheme in which a plurality of communication devices shares a channel by using a synchronization frame, for example. The synchronization frame may include: a determination period used by a communication device for medium reservation; and a channel occupancy time allocated to the communication device for which medium reservation has been performed. The synchronization frame will be described in detail below.

<6-3. Case of Adopting Synchronous Channel Access Scheme>

The following is a description of a case where the communication control device 60 adopts the synchronous channel access scheme as the medium reservation scheme of the predetermined group. The following description assumes that a plurality of communication devices performs medium reservation and radio wave use by using a synchronization frame.

<6-3-1. Configuration Example of synchronization Frame>

Figure 29:
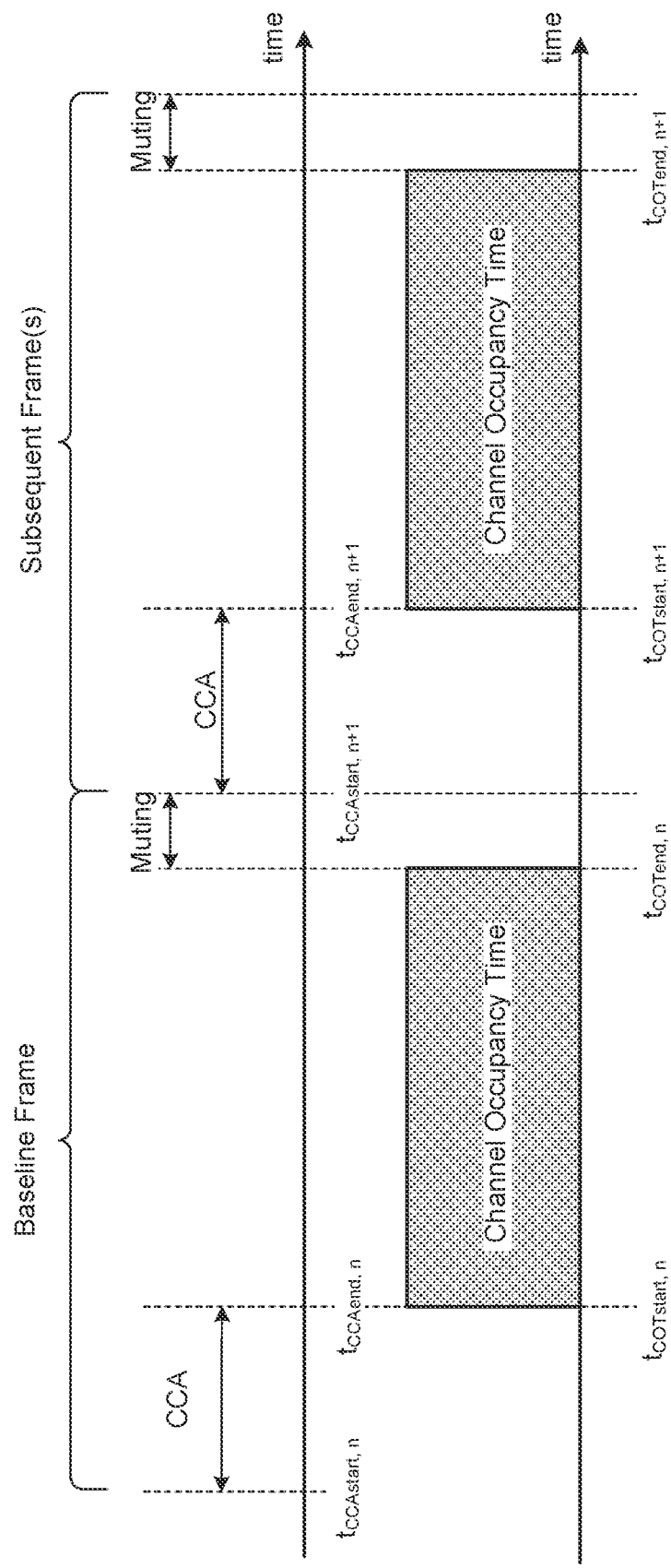
FIG. 29 is a diagram illustrating a configuration example of a synchronization frame.

First, a configuration example of a synchronization frame used in a synchronous channel access scheme will be described. FIG. 29 is a diagram illustrating a configuration example of a synchronization frame. The example of FIG. 29 illustrates a frame working as a baseline (Baseline Frame in the drawing) and frame(s) subsequent to the baseline frame (Subsequent Frame(s) in the drawing), as synchronization frames. Each of the baseline frame and the subsequence frame is one synchronization frame.

In the example of FIG. 29, one synchronization frame includes a clear channel assessment (CCA) period, a channel occupancy time, and a muting period.

Here, the channel occupancy time is a channel occupancy time allocated to the communication device that has performed medium reservation. The muting period is a period during which the radio transmission until the next frame is suspended.

In addition, the CCA period is a period used for medium reservation by the communication device. That is, the CCA period is, for example, a time for determining whether a predetermined communication device in the group may occupy the channel for a predetermined time (for example, a channel occupancy time in a frame). In the following description, the CCA period may be referred to as a determination period.

Figure 30:
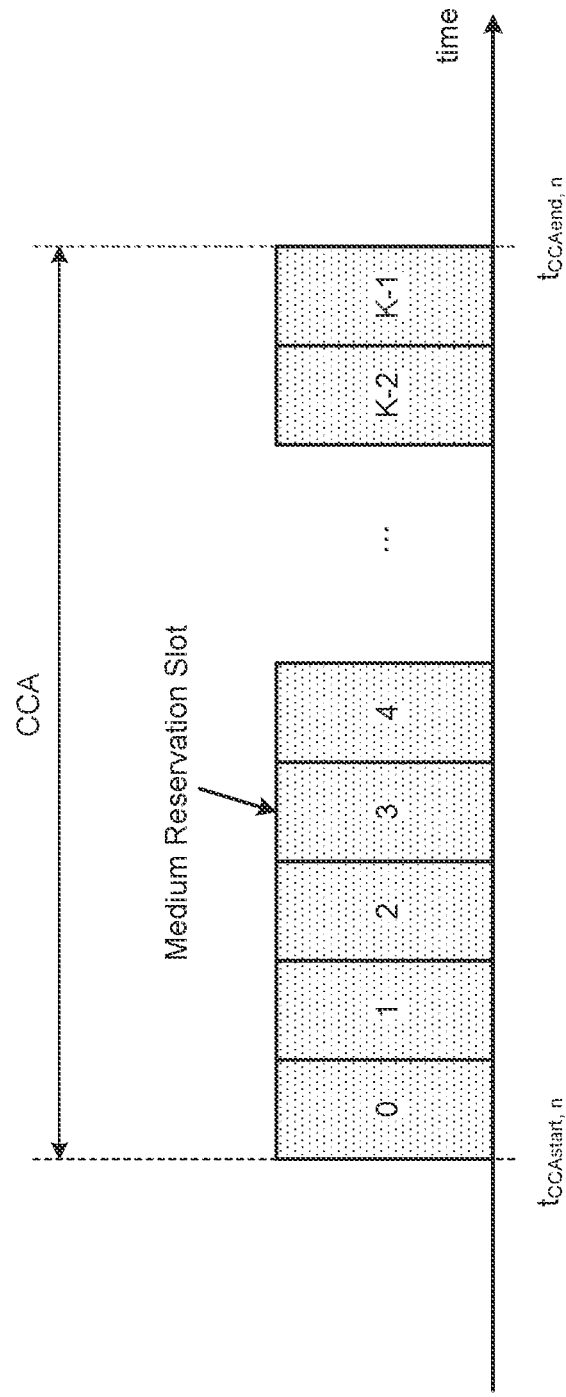
FIG. 30 is a diagram illustrating a configuration example of a CCA period.

FIG. 30 is a diagram illustrating a configuration example of the CCA period. One CCA period includes a plurality of medium reservation slots. In the example in FIG. 30, one CCA period is divided by time division into K medium reservation slots. K is an arbitrary integer. In the drawing, the number described in each of the medium reservation slots is a slot number. In the following description, the medium reservation slot may be referred to as a synchronized medium reservation slot. In the following description, the medium reservation slot may be simply referred to as a slot.

The medium reservation slot is allocated to each of the plurality of communication devices in the group. Subsequently, a predetermined communication device in the group performs medium reservation (channel occupancy reservation) by transmitting a dedicated signal in a slot allocated to the own communication device, for example. For example, it is assumed that a medium reservation slot with slot number 3 is allocated to a predetermined communication device in the group. In this case, when the predetermined communication device has not detected the transmission of the dedicated signal from another communication device in the medium reservation slots of slot numbers 0 to 2, the predetermined communication device can achieve channel occupancy (medium reservation) in the channel occupancy period in the same frame.

Although the example of FIG. 30 is a case where the CCA period is divided by time division into K medium reservation slots, the division of the CCA period is not limited to time division. The CCA period may be divided by frequency division, code division, or spatial division into K medium reservation slots.

The following description assumes that a plurality of communication devices in a group performs medium reservation and radio wave use by using the synchronization frame having the configuration illustrated in FIGS. 29 and 30. Naturally, the plurality of communication devices in the group may perform the medium reservation and the radio wave use using the synchronization frame other than the configuration illustrated in FIGS. 29 and 30.

<6-3-2. Notification Parameter>

When adopting the synchronous channel access scheme, the communication control device 60 determines a parameter required for synchronous channel access. Subsequently, the communication control device 60 notifies each of the plurality of communication devices in the group (for example, all the base station devices 40 in the group) of the determined parameter as the information regarding the medium reservation scheme.

Examples of the parameters to be notified include the following (D1) to (D2). Note that the parameters are not limited to the examples illustrated in the following (D1) to (D2).

(D1) Information regarding reference time
(D2) Information regarding medium reservation slot
Hereinafter, (D1) and (D2) will be individually described below.

(D1) Information Regarding Reference Time

First, information regarding the reference time will be described. Assumable information regarding the reference time would be information by which the start time and the end time of the CCA period can be specified. In the case of the baseline frame illustrated in FIG. 29, the start time of the CCA period is $t_{CCAstart,n}$, while the end time is $t_{CCAend,n}$. Furthermore, in the case of the first subsequence frame following the baseline frame illustrated in FIG. 29, the start time of the CCA period is $t_{CCAstart,n+1}$, while the end time is $t_{CCAend,n+1}$.

Assumable information by which the start time and the end time of the CCA period can be specified would be Examples 1 and 2 below.

(Example 1)

Assumable information by which the start time and the end time of the CCA period can be specified would be absolute reference time information and period information. Here, the absolute reference time information is time information such as 1900 01-01T 00:00:00Z, for example, while the period information is time information expressed by msec, sec, minutes, hours, or the like, for example. Note that the case of Example 1 basically assumes that the CCA period arrives at a same period continuously.

(Example 2)

Assumable information by which the start time and the end time of the CCA period can be specified would be the start time of the baseline frame, various types of time information in the baseline frame, and information regarding the number of subsequent frames following the baseline frame. Here, examples of assumable various types of time information in the baseline frame in the example of FIG. 29 include a start time $t_{CCAstart,n}$ of the CCA period, an end time $t_{CCAend,n}$ of the CCA period, a start time $t_{COTstart,n}$ of the channel occupancy time, and an end time $t_{COTend,n}$ of the channel occupancy time.

In the case of Example 2, the configuration of the baseline frame can be changed at regular intervals. For example, the communication control device 60 can extend or shorten the CCA period at regular intervals. Furthermore, the communication control device 60 can extend or shorten the channel occupancy time at regular intervals.

(D2) Information Regarding Medium Reservation Slot

Next, information regarding the medium reservation slot will be described. An example of the information regarding the medium reservation slot is allocation information of the medium reservation slot to each communication device in the group. The allocation information may be a slot number, for example. For example, the communication control device 60 in the example of FIG. 30 allocates one of the K medium reservation slots to a predetermined communication device (for example, the base station device 40) in the group.

The following description assumes that the communication control device 60 notifies the communication device of medium reservation slot allocation information as information regarding the medium reservation slot.

<6-3-3. Allocation of Medium Reservation Slots>

Next, a method of determining the allocation of the medium reservation slot will be described. The communication control device 60 determines a medium reservation slot to be allocated to each of the plurality of communication devices in a group. For example, the communication control device 60 determines allocation of the medium reservation slot to each of the plurality of communication devices in the group based on the interference relationship between the communication devices in the group. Subsequently, the communication control device 60 notifies each of the plurality of communication devices in the group of the determined allocation information as the information regarding the medium reservation scheme.

An assumable procedure of determining the allocation of the medium reservation slot is as follows. Note that the determination procedure is not to be limited to the following example. The determination procedure includes the following steps 1 and 2.

(Step 1)

In step 1, the communication control device 60 determines the number K of medium reservation slots. For example, the communication control device 60 determines the number K of medium reservation slots by the following procedure.

First, the communication control device 60 specifies the number (M) of communication devices in the group, and specifies the number ($N_{m,Interference}$) of communication devices having an interference relationship for each of the plurality of communication devices in the group. Subsequently, the communication control device 60 determines the number K of medium reservation slots based on the following formula.

$$K = \max_{0 \leq m \leq M-1} \{N_{m,Interference}\} + 1 + \alpha$$

Here, $\alpha$ is an integer of 0 or more. The number $\alpha$ corresponds to a margin for "accommodating" a new communication device. Furthermore, +1 means counting the m-th communication device.

Figures 31, 32:
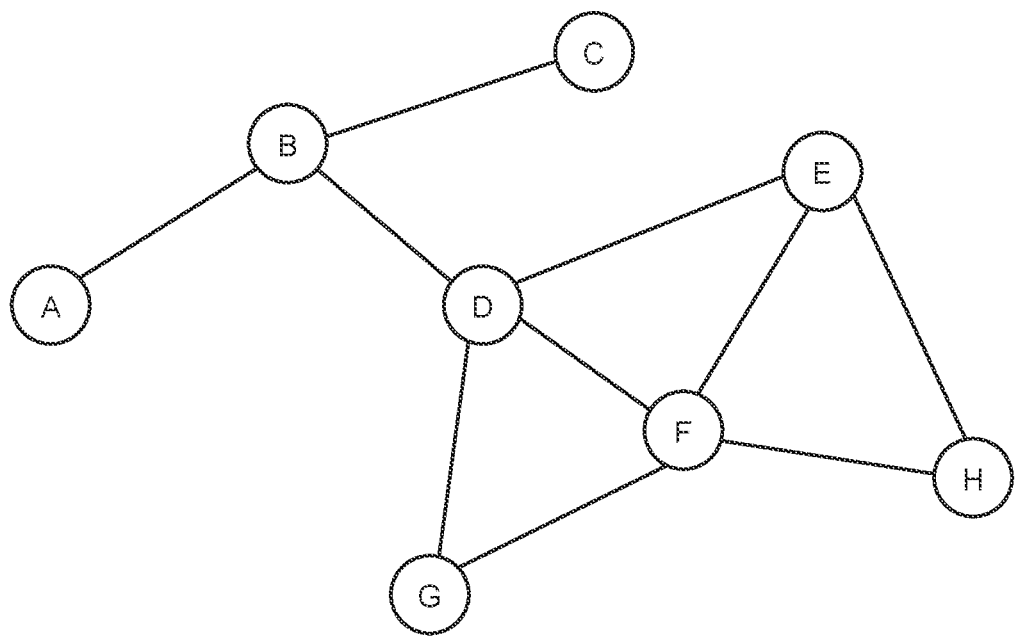
FIG. 31 is a diagram illustrating a specific calculation example of the number of medium reservation slots.
FIG. 32 is a diagram illustrating a specific calculation example of the number of medium reservation slots.

Hereinafter, a specific calculation example of the number K of medium reservation slots will be described. FIGS. 31 and 32 are diagrams illustrating a specific calculation example of the number K of medium reservation slots. In the examples of FIGS. 31 and 32, $\alpha$ is set to 0 to facilitate understanding.

For example, in the example of FIG. 31, there are eight communication devices having communication device IDs A to H. Accordingly, the communication control device 60 specifies that the number (M) of communication devices in the group is 8. Furthermore, the communication control device 60 specifies the number ($N_{m,Interference}$) of communication devices having an interference relationship for each of the eight communication devices in the group. In the example of FIG. 31, communication devices connected by lines are in an interference relationship. The second column of the table illustrated in FIG. 32 indicates the number of communication devices having an interference relationship for each of the eight communication devices illustrated in FIG. 31. By applying these to the above formula, the communication control device 60 can calculate the number K of medium reservation slots as 5.

(Step 2)

In step 2, the communication control device 60 performs scheduling of the synchronized medium reservation slot for each communication device based on the determined K. The communication control device 60 determines slot allocation to each of the plurality of communication devices in the group based on the determined K. At this time, the communication control device 60 allocates different slots to the plurality of communication devices in the interference relationship in the group. Note that the communication control device 60 may allocate an identical slot to a plurality of communication devices not interfering with each other in the group.

Figure 33:
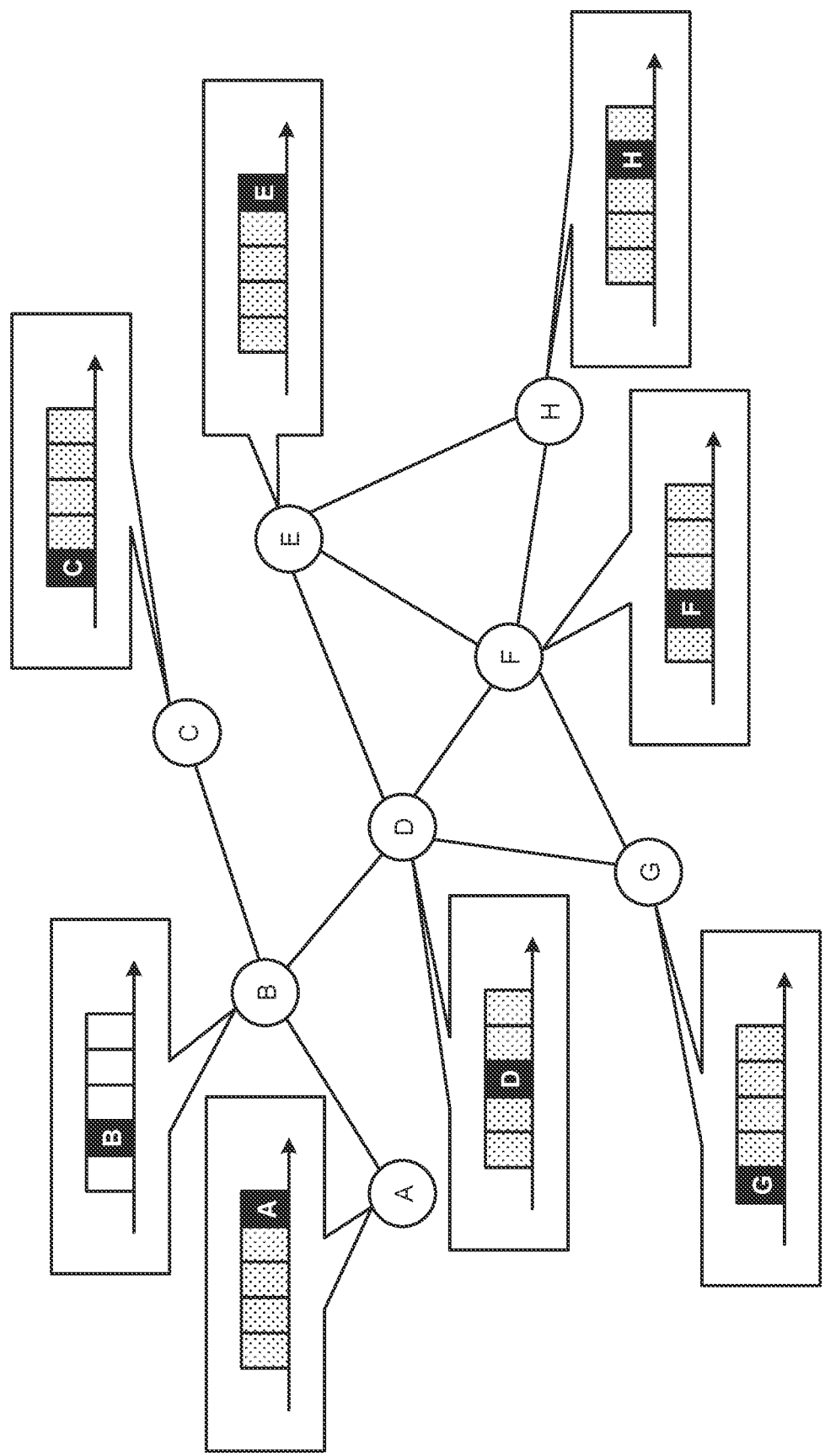
FIG. 33 is a diagram illustrating an example of an allocated slot in the examples of FIGS. 31 and 32.

FIG. 33 is a diagram illustrating an example of an allocated slot in the examples of FIGS. 31 and 32. As can be seen from FIG. 33, the communication control device 60 allocates different slots to the plurality of communication devices in the interference relationship in the group. For example, while having an interference relationship with the communication devices B, E, F, and G, the communication device D has allocation of a slot different from the slots allocated to the communication devices B, E, F, and G. On the other hand, the communication control device 60 can allocate an identical slot to a plurality of communication devices not interfering with each other in the group. For example, the communication device F is not in an interference relationship with the communication device B. Therefore, the communication control device 60 allocates the same slot as that of the communication device B to the communication device F. By focusing on the communication device F, the reason for setting K as described above can be understood.

<6-3-4. Changing Slot Allocation>

As described above, a predetermined communication device in the group performs medium reservation by transmitting a dedicated signal in the slot allocated to the own communication device. For example, in a case where the medium reservation slot with slot number 3 is allocated to a predetermined communication device in the group, the predetermined communication device can achieve channel occupancy when there is no detection of transmission of the dedicated signal from another communication device in the medium reservation slots with slot numbers 0 to 2.

In this case, depending on the slot allocation method, there is a possibility of occurrence of unfairness in the use of the radio wave. For example, there is an assumable case where slots are allocated as in the example of FIG. 33. In this case, with allocation of the head slot, the communication device C and the communication device G can perform communication at any time. On the other hand, when the communication device C or the communication device G occupies a channel, other communication devices cannot use the channel. For example, in a case where the communication device C or the communication device G constantly occupies a channel, the channel would be unavailable all the time. In this manner, some slot allocation methods lead to a problem of fairness in channel access opportunities.

Therefore, the communication control device 60 may take the following measures (E1) to (E3) from the viewpoint of ensuring fairness in channel access opportunities.

(E1) The communication control device 60 performs scheduling periodically or aperiodically. The communication control device 60 at least releases the allocation of the head slot in a certain period and allocates the head slot to another slot. In addition, the communication control device 60 may provide a determination period for the synchronized medium reservation slot information and change the allocation of the medium reservation slot at the determined period. Furthermore, the communication control device 60 may change the allocation of the medium reservation slot when there is a change in the available spectrum information capable of protecting a high-priority system in the frequency band.

(E2) The communication control device 60 performs round-robin scheduling. For example, the communication control device 60 sequentially allocates the head slot to the plurality of communication devices in the group.

(E3) The communication control device 60 performs scheduling based on the communication statuses of the communication devices in the group. For example, the communication control device 60 performs scheduling based on the proportional-fair rule (Proportional fairness). For example, the communication control device 60 may perform scheduling based on a ratio between an average and a maximum throughput in a certain period. Furthermore, the communication control device 60 may perform scheduling based on a ratio between an average and a maximum value of metrics (for example, capacity, mutual interference amount, and the like) other than the throughput.

In addition, when there is a change in the slot allocation, the communication control device 60 performs notification regarding the changed allocation information as the information regarding the medium reservation scheme.

<6-3-5. Reserved Slot>

Note that a communication device may be newly added under the management of the communication control device 60. For example, a communication device may be newly added under the management of the communication control device 60 through the above-described <5. Description of various procedures> and the like (for example, through a registration procedure, a spectrum grant procedure, a spectrum use notification/heartbeat, and the like). In this case, it is desirable that the communication control device 60 also allocate the medium reservation slot to the new communication device.

At this time, the communication control device 60 may acquire specific information of the new communication device and specify the mutual interference group to which the new communication device belongs based on the acquired specific information. The communication control device 60 may then allocate the medium reservation slot of the synchronization frame to be used in the specified mutual interference group.

In a case where the medium reservation slot is allocated to the new communication device with a set to 0 as in the examples of FIGS. 31 and 32, the communication control device 60 may not be able to allocate the medium reservation slot to the new communication device until the configuration of the synchronization frame or the medium reservation slot is changed next depending on an interference relationship between the new communication device and the incumbent other communication devices. The similar applies to a case where there is a difficulty in specifying an interference relationship between the new communication device and the incumbent other communication devices.

To handle this, the communication control device 60 sets α in the formula indicated in <6-3-3. Allocation of medium reservation slots> to be greater than 0, for example, so that a new communication device can obtain a channel access opportunity at an early stage. That is, the communication control device 60 reserves, for the new communication device, a predetermined number (for example, about α) of medium reservation slots not used by the incumbent communication devices. When having detected a new communication device, the communication control device 60 allocates the reserved medium reservation slot to the new communication device. This makes it possible to give a channel access opportunity to a new communication device at an early stage. In the following description, a medium reservation slot reserved for a new communication device will sometimes be referred to as a reserved slot.

Figure 34:
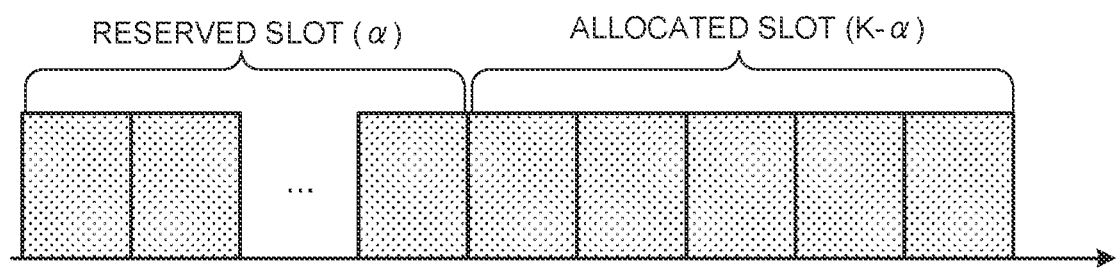
FIG. 34 is a diagram illustrating a state in which a reserved slot is provided at the head of a slot allocated to an incumbent communication device.

In a case where the reserved slot is provided (for example, when α>0), the communication control device 60 may provide the reserved slot at the head of the slot for the incumbent communication device. FIG. 34 is a diagram illustrating a state in which a reserved slot is provided at the head of a slot allocated to an incumbent communication device. With this configuration, a channel access opportunity can be given preferentially to a new communication device.

While the example of FIG. 34 is a case where the reserved slot is provided in the incumbent synchronization frame, a synchronization frame may be prepared for a new communication device. For example, the communication control device 60 may prepare a synchronization frame in which a medium reservation slot is periodically allocated to none of incumbent communication devices for a new communication device. In the following description, a frame reserved for a new communication device may be referred to as a reserved frame in the following description. The medium reservation slot included in the reserved frame may also be regarded as a reserved slot.

Now, it is also conceivable that the number of new communication devices exceeds the number of reserved slots. To handle this, the communication control device 60 may allow the new communication devices to randomly use the reserved slots. For example, the communication control device 60 assumes a reserved slot frame including a plurality of consecutive reserved slots (for example, a reserved slot group including a consecutive reserved slots illustrated in FIG. 34). In this case, the communication control device 60 may allow the new communication devices to randomly use the reserved slots by assuming the reserved slot frame as a maximum contention window (CWmax).

In many cases, an interference relationship between new communication devices is assumed to be unknown. By allowing the new communication devices to randomly use the reserved slots, the communication control device 60 can reduce the possibility of mutual interference between new communication devices, which cannot be predicted at the present time. Furthermore, the communication control device 60 can maintain fairness of channel access opportunities between new communication devices.

<6-4. Decision-Making>

There can be a plurality of communication control devices 60 that is the subject of decision-making in an unlicensed shared band or an unlicensed band. In this case, many types of variations can be assumed as decision-making performed by the communication control device 60. Hereinafter, decision-making performed by the communication control device 60 will be described in detail.

Before describing decision-making performed by the communication control device 60, terms related to decision-making are defined as follows.

Autonomous Decision-Making: Autonomous decision-making is a decision-making topology in which an entity that makes a decision (decision-making entity) makes a decision independently from another decision-making entity.

Centralized Decision-Making: Centralized decision-making is a decision-making topology in which a decision-making entity delegates decision-making to another decision-making entity.

Distributed Decision-Making: Distributed decision-making is a decision-making topology in which a decision-making entity makes a decision in cooperation with another decision-making entity.

Hereinafter, decision-making performed by the communication control device 60 in a case where there are communication devices of a plurality of communication control devices 60 will be described in detail.

<6-4-1. Autonomous Decision-Making>

First, autonomous decision-making performed by the communication control device 60 in the presence of a plurality of communication control devices 60 will be described.

In a case where the communication control device 60 performs autonomous decision-making, each of the plurality of communication control devices 60 that performs autonomous decision-making executes the following process. Note that the processing described below is merely an example, and autonomous decision-making is not limited to the process described below.

First, the communication control device 60 sets a reserved frame common among the plurality of communication control devices 60 (hereinafter, the frame is referred to as a common reserved frame). Alternatively, the communication control device 60 sets a common reserved slot among the plurality of communication control devices 60 (hereinafter, the slot is referred to as a common reserved slot). As described above, the common reserved frame can be rephrased as a common frame. The common reserved slot can also be rephrased as a common slot.

Subsequently, the communication control device 60 acquires information regarding the communication device managed by another communication control device 60. Thereafter, the communication control device 60 specifies an interference relationship with a communication device managed by the another communication control device.

Subsequently, the communication control device 60 instructs a communication device determined to have an interference relationship with a communication device managed by the another communication control device to randomly use the common reserved frame or the common reserved slot. The method of random use of the common reserved frame or the common reserved slot may be similar to the method described in <6-3-5. Reserved slot>.

Through the above process, the communication control device 60 can avoid interference of the communication device under management regardless of the determination of other communication control devices.

<6-4-2. Centralized Decision-Making>

Next, centralized decision-making performed by the communication control device 60 in the presence of a plurality of communication control devices 60 will be described.

In a case where the communication control device 60 performs autonomous decision-making, the plurality of communication control devices 60 can be divided into a master communication control device and a slave communication control device operating under the control of the master communication control device. Processes of the master communication control device and the slave communication control device will be described below. Note that the processes described below are merely an example, and the centralized decision-making is not limited to the processes described below.

(Master Communication Control Device)

The master communication control device acquires information regarding the communication device under management from the slave communication control device. Subsequently, the master communication control device determines the medium reservation scheme based on the above-described method. The master communication control device then notifies the communication device of information regarding the determined medium reservation scheme via the slave communication control device, for example.

(Slave Communication Control Device)

The slave communication control device notifies the master communication control device of information on the communication device under management. Subsequently, the slave communication control device acquires, from the master communication control device, information regarding the medium reservation scheme determined by the master communication control device. The slave communication control device then notifies the communication device under management of the information regarding the medium reservation scheme.

Through the above process, the plurality of communication devices can be centrally managed. This results in achievement of extremely high spectrum efficiency.

<6-4-3. Distributed Decision-Making>

Next, distributed decision-making performed by the communication control device 60 in the presence of a plurality of communication control devices 60 will be described.

In a case where the communication control device 60 performs distributed decision-making, each of the plurality of communication control devices 60 that performs distributed decision-making executes the following process. Note that the process described below is merely an example, and the distributed decision-making is not limited to the process described below.

First, the communication control device 60 sets a reserved frame common among the plurality of communication control devices 60 (hereinafter, the frame is referred to as a common reserved frame). Alternatively, the communication control device 60 sets a common reserved slot among the plurality of communication control devices 60 (hereinafter, the slot is referred to as a common reserved slot). The common reserved frame may be rephrased as a common frame. The common reserved slot can also be rephrased as a common slot.

Subsequently, the communication control device 60 acquires information regarding the communication device managed by another communication control device 60. Thereafter, the communication control device 60 specifies an interference relationship with a communication device managed by the another communication control device.

Subsequently, the communication control device 60 negotiates with the other communication control device 60 which communication device should change the information related to the medium reservation scheme for a pair of the communication device managed by the another communication control device 60 and the communication device under management determined to have an interference relationship with the communication device.

When it is determined as a result of the negotiation that the communication device under management should change the information regarding the medium reservation scheme, the communication control device 60 instructs the communication device under management to randomly use the common reserved frame or the common reserved slot. The method of random use of the common reserved frame or the common reserved slot may be similar to the method described in <6-3-5. Reserved slot>.

(Negotiation Method)

The above-described "negotiation" (negotiation executed by the communication control device 60 with another communication control device 60) can be conducted by using the following assumable methods (F1) to (F3). Note that the negotiation method is not limited to the following example.

(F1) The communication control device 60 performs unique determination based on a prescribed criterion For example, one or a plurality of communication control devices 60 among the plurality of communication control devices 60 that performs negotiation uses metrics such as spectrum use efficiency and channel access opportunity to calculate which of the communication devices is to be used to change the information regarding the medium reservation scheme for enhancement or improvement of the metric value. Based on the calculation result, the communication control device 60 determines which of the communication devices should be used to change the information regarding the medium reservation scheme.

(F2) In a case where each communication device has its own performance requirement value, the plurality of communication control devices 60 that negotiates with each other exchanges the information. The communication control device 60 then changes the information regarding the medium reservation scheme so as to approach the requirement value as much as possible.

(F3) The plurality of communication control devices 60 that performs negotiation repeats the command/request procedure described in <5-7. Procedure occurring between communication control devices> until mutual agreement is obtained.

7. OPERATION RELATED TO MEDIUM RESERVATION OF BASE STATION DEVICE

Next, an operation related to medium reservation of the base station device 40 will be described.

As described above, the present embodiment assumes that the communication device to which the information regarding the medium reservation scheme is notified from the communication control device 60 is the base station device 40. However, the communication device to which the information regarding the medium reservation scheme is notified does not necessarily have to be the base station device 40. The description of "base station device 40" or "communication device" in the following description can be appropriately replaced with a description indicating a communication device (for example, intermediate device 50 or terminal device 30) other than the base station device 40.

The base station device 40 can be classified into a base station device not having a function as the communication control device 60 and a base station device not having a function as the communication control device 60. Hereinafter, operation in individual cases will be described.

<7-1. Case Having No Function of Communication Control Device>

First, an operation in a case where the base station device 40 has no function as the communication control device 60 will be described.

The base station device 40 acquires information indicating a first medium reservation scheme determined by the communication control device 60. Subsequently, the base station device 40 executes the medium reservation based on the acquired information indicating the first medium reservation scheme.

At this time, the base station device 40 may generate information indicating a second medium reservation scheme based on the information indicating the first medium reservation scheme, and may notify surrounding communication devices (for example, the terminal devices 30 under management) of the information indicating the second medium reservation scheme.

Figure 35:
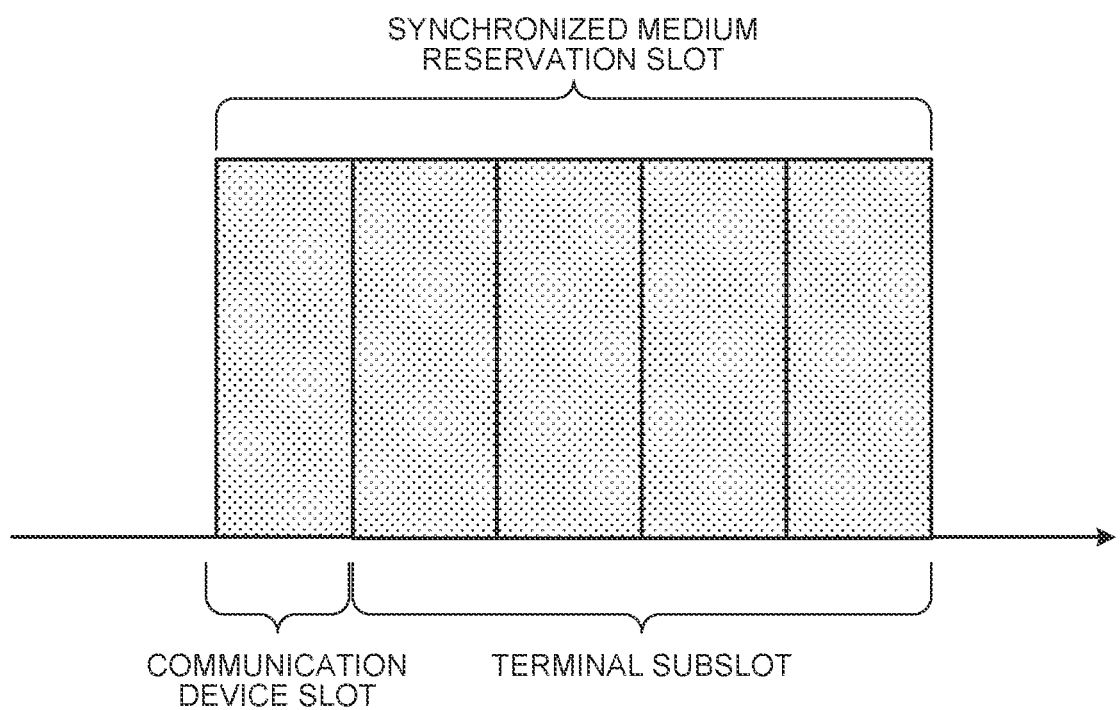
FIG. 35 is a diagram illustrating a configuration example of a synchronized medium reservation slot.

The second medium reservation scheme may be the scheme that further divide one or a plurality of medium reservation slots allocated to the base station device 40 and allocate the divided slot to the terminal devices 30. FIG. 35 is a diagram illustrating a configuration example of a synchronized medium reservation slot. The synchronized medium reservation slot illustrated in FIG. 35 is a medium reservation slot allocated by the base station device 40 from the communication control device 60. The base station device 40 performs scheduling of the terminal device 30 in the synchronized medium reservation slot.

For example, the base station device 40 performs synchronized medium reservation using a part of the synchronized medium reservation slots (communication device slot illustrated in FIG. 35) allocated from the communication control device 60. The base station device 40 sets the remaining time of the synchronized medium reservation slot to a period for random reservation to the terminal device 30 (hereinafter, also referred to as a terminal synchronized medium reservation period). The terminal subslot illustrated in FIG. 35 is an example of the terminal synchronized medium reservation period.

The base station device 40 then broadcasts information (terminal subslot information) regarding the terminal synchronized medium reservation period. The terminal device 30 uses a channel based on the broadcast information. For example, the terminal device 30 performs medium reservation by randomly using the terminal subslot, and then uses the channel based on the medium reservation. With this operation, the terminal device 30 can reduce the possibility of inter-terminal interference in a cell while avoiding inter-cell interference.

When the terminal device 30 is a fixed device (fixed station) such as Customer Premises Equipment (CPE), the base station device 40 may perform fixed scheduling and notify the terminal device 30 of the allocated slot (subslot) information in the synchronized medium reservation slot.

<7-2. Case Having Function of Communication Control Device>

Next, an operation of the base station device 40 in a case where the base station device 40 has no function as the communication control device 60 will be described.

The base station device 40 acquires specific information, that is, information specific to one or more communication devices in a predetermined range (for example, the base station device 40 in a predetermined range). The base station device 40 acquires, as the specific information, installation location information, wireless interface technical information, and the like of each of the base station devices 40 in a predetermined range. Subsequently, the base station device 40 determines the medium reservation scheme based on the acquired specific information. At this time, the base station device 40 may notify one or more communication devices in a predetermined range of information indicating the determined medium reservation scheme. The base station device 40 (one or more communication devices in a predetermined range) then performs the medium reservation based on the information indicating the determined medium reservation scheme. Note that, in addition to the above processes, the base station device 40 may perform scheduling of the medium reservation slot similarly to the above-described communication control device 60.

Incidentally, one or more communication devices in the predetermined range (for example, the base station device 40 in a predetermined range) may determine the second medium reservation scheme to be applied to the terminal device 30 under management, and may notify the terminal device 30 of the determined second medium reservation scheme. Additionally, the terminal device 30 may acquire information indicating the second medium reservation scheme notified from the communication device, and may perform the medium reservation based on the acquired information indicating the second medium reservation scheme. For example, the terminal device 30 may perform the medium reservation in a slot scheduled from the communication device.

8. OPERATION RELATED TO MEDIUM RESERVATION OF TERMINAL DEVICE

Next, an operation related to medium reservation of the terminal device 30 will be described.

The terminal device 30 acquires information indicating the second medium reservation scheme from the base station device 40, and performs channel access based on the acquired information indicating the second medium reservation scheme. Note that the terminal device 30 may directly acquire information indicating the medium reservation scheme from the communication control device 60, and may perform channel access based on the acquired information indicating the medium reservation scheme.

9. SEQUENCE RELATED TO MEDIUM RESERVATION

Next, an operation related to the medium reservation of the present embodiment will be described with reference to a sequence diagram.

<9-1. Operation Related to Medium Reservation>

Figure 36:
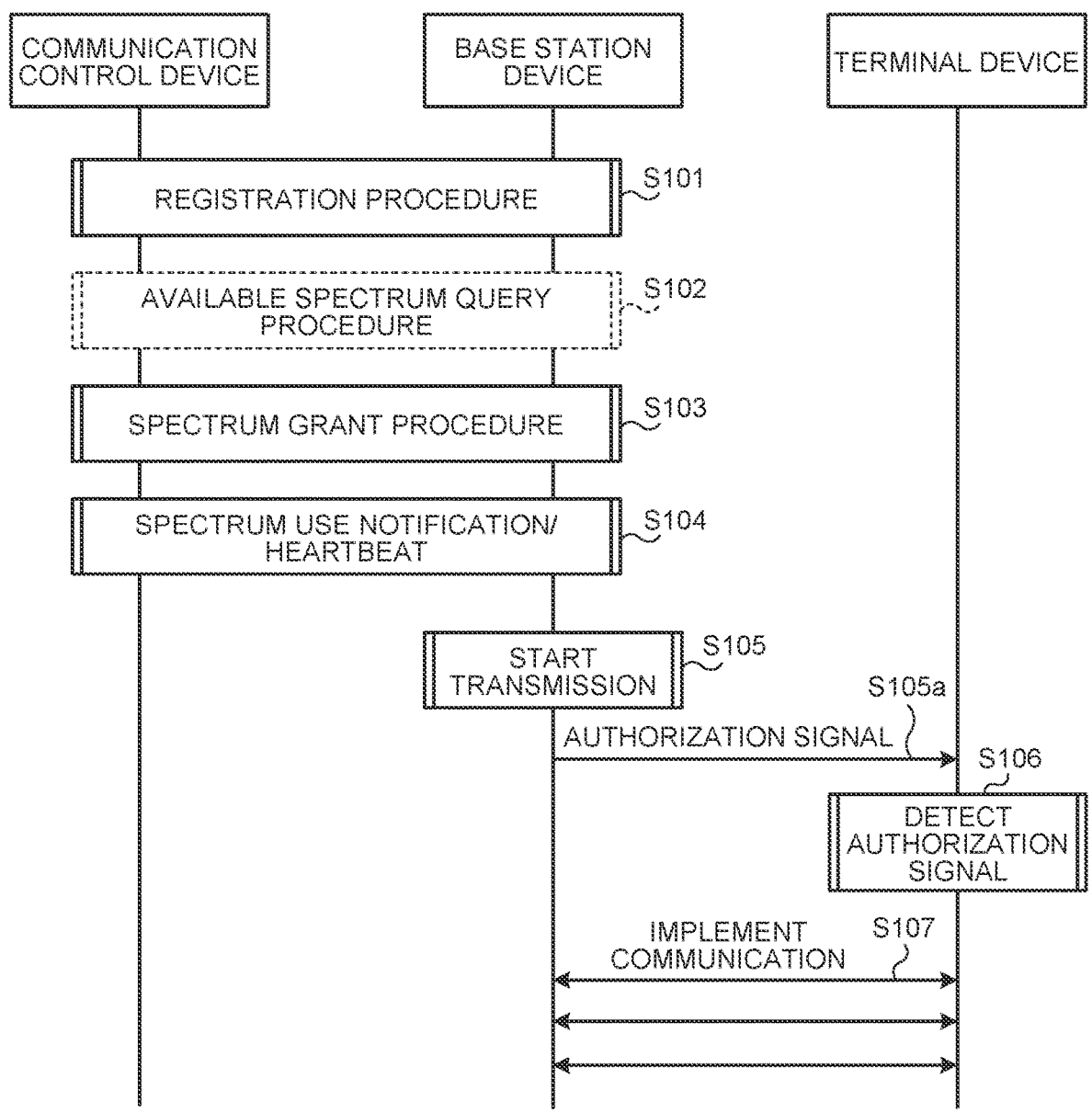
FIG. 36 is a sequence diagram illustrating an operation related to medium reservation.

FIG. 36 is a sequence diagram illustrating an operation related to medium reservation. Hereinafter, the operation related to the medium reservation will be described with reference to the sequence diagram illustrated in FIG. 36.

First, the communication control device 60 and the base station device 40 execute processes including a registration procedure (step S101), a use spectrum information query procedure (step S102), a spectrum grant procedure (step S103), and a spectrum use notification/heartbeat (step S104).

Within these procedures, the acquisition unit 641 of the communication control device 60 acquires, from the base station device 40, specific information regarding the base station device 40. Subsequently, the determination unit 642 of the communication control device 60 determines the information regarding the medium reservation scheme based on the acquired specific information.

Furthermore, the notification unit 643 of the communication control device 60 notifies the base station device 40 of the information regarding the determined medium reservation scheme. The acquisition unit 441 of the base station device 40 acquires the information regarding the medium reservation scheme from the communication control device 60. The information regarding the medium reservation scheme may be provided to the communication device through the spectrum grant procedure (step S103) or the spectrum use notification/heartbeat (step S104).

When having acquired the information regarding the medium reservation scheme, the base station device 40 starts a transmission process (step S105). At this time, the base station device 40 transmits an authorization signal to the terminal device 30 using the medium reservation slot allocated from the communication control device 60 (step S105*a*). The base station device 40 may transmit the authorization signal in broadband. Note that the authorization signal may be the dedicated signal described above. In addition, the authorization signal may include information (for example, terminal subslot information) related to the second medium reservation scheme.

The acquisition unit 341 of the terminal device 30 detects the authorization signal (step S106). Subsequently, the reservation unit 342 of the terminal device 30 performs medium reservation based on the information regarding the second medium reservation scheme (for example, terminal subslot information), and executes communication with the base station device 40 based on the medium reservation (step S107).

<9-2. Case where there is Another Entity that Determines Information>

Note that there may be a case where there is an entity (hereinafter, referred to as a medium reservation coordinator) that determines and provides information regarding the medium reservation, separately from the communication control device 60. The medium reservation coordinator may be the management device 20. The medium reservation coordinator may be regarded as a type of the communication control device 60.

FIG. 37 is a sequence diagram illustrating an operation related to medium reservation in a case where a medium reservation coordinator is present. Hereinafter, with reference to the sequence diagram illustrated in FIG. 37, an operation related to medium reservation in a case where a medium reservation coordinator is present will be described.

First, the communication control device 60 and the base station device 40 execute processes including a registration procedure (step S201), a use spectrum information query procedure (step S202), a spectrum grant procedure (step S203), and a spectrum use notification/heartbeat (step S204).

The base station device 40 transmits a medium reservation information provision request to the medium reservation coordinator (step S205). The medium reservation information provision request may include specific information regarding the base station device 40. The medium reservation coordinator acquires specific information regarding the base station device 40 and determines information regarding the medium reservation scheme based on the acquired specific information.

Subsequently, the medium reservation coordinator notifies the base station device 40 of information regarding the determined medium reservation scheme (step S206). The acquisition unit 441 of the base station device 40 acquires the information regarding the medium reservation scheme from the medium reservation coordinator.

When having acquired the information regarding the medium reservation scheme, the base station device 40 starts a transmission process (step S207). At this time, the base station device 40 transmits an authorization signal to the terminal device 30 by using the medium reservation slot allocated by the medium reservation coordinator (step S207*a*). The base station device 40 may transmit the authorization signal in broadband. Note that the authorization signal may be the dedicated signal described above. In addition, the authorization signal may include information (for example, terminal subslot information) related to the second medium reservation scheme.

The acquisition unit 341 of the terminal device 30 detects the authorization signal (step S208). Subsequently, the reservation unit 342 of the terminal device 30 performs medium reservation based on the information regarding the second medium reservation scheme (for example, terminal subslot information), and executes communication with the base station device 40 based on the medium reservation (step S209).

10. MODIFICATION

The communication control device 60 of the present embodiment is not limited to the device described in the above-described embodiment. For example, the communication control device 60 may be a device having a function other than controlling the base station device 40 that performs secondary use of a frequency band in which spectrum sharing is performed. For example, the function of the communication control device 60 of the present embodiment may be provided in a network manager. At this time, the network manager may be, for example, a centralized base band unit (C-BBU) having a network configuration referred to as a centralized radio access network (C-RAN) or a device including the C-BBU. Furthermore, the function of the network manager may be provided in a base station (including an access point). These devices (such as a network manager) can also be regarded as communication control devices.

Furthermore, in the above-described embodiment, the communication control device 60 is a device belonging to the communication system 2, but does not necessarily have to be a device belonging to the communication system 2. The communication control device 60 may be a device outside the communication system 2. The communication control device 60 may indirectly control the base station device 40 via a device constituting the communication system 2 rather than directly controlling the base station device 40. In addition, there may be a plurality of secondary systems (communication systems 2). At this time, the communication control device 60 may manage the plurality of secondary systems. In this case, each of the secondary systems can be regarded as the second radio system.

As general naming in spectrum sharing, an incumbent system using a target band is referred to as a primary system, and a secondary user is referred to as a secondary system. However, the primary system and the secondary system may be each replaced with different terms. A macro cell in a Heterogeneous Network (HetNET) may be defined as the primary system, and a small cell or a relay station may be defined as the secondary system. In addition, a base station may be defined as the primary system, and relay user equipment (Relay UE) or vehicle user equipment (Vehicle UE) that implements D2D or vehicle-to-everything (V2X) existing in the coverage may be defined as the secondary system. The base station is not limited to a fixed type, and may be a portable/mobile type.

Furthermore, the interface between the entities may be either wired or wireless. For example, the interface between the entities (communication device, communication control device, or terminal device) described in the present embodiment may be a wireless interface that does not depend on spectrum sharing. Examples of the wireless interface that does not depend on spectrum sharing include a wireless interface provided by a mobile network operator via a licensed band, wireless LAN communication using an incumbent unlicensed band, and the like.

The control device that controls the radio wave utilization device 10, the management device 20, the terminal device 30, the base station device 40, the intermediate device 50, or the communication control device 60 according to the present embodiment may be implemented by a dedicated computer system or a general-purpose computer system.

For example, a program for executing the above-described operations is stored in a computer-readable recording medium such as an optical disk, semiconductor memory, a magnetic tape, or a flexible disk and distributed. For example, the program is installed on a computer and the above processes are executed to achieve the configuration of the control device. At this time, the control device may be a device (for example, a personal computer) outside the radio wave utilization device 10, the management device 20, the terminal device 30, the base station device 40, the intermediate device 50, or the communication control device 60. Furthermore, the control device may be a device (for example, the control unit 13, the control unit 23, the control unit 34, the control unit 44, the control unit 54, or the control unit 64) inside the radio wave utilization device 10, the management device 20, the terminal device 30, the base station device 40, the intermediate device 50, or the communication control device 60.

Furthermore, the communication program may be stored in a disk device included in a server device on a network such as the Internet so as to be able to be downloaded to a computer, for example. Furthermore, the functions described above may be implemented by using operating system (OS) and application software in cooperation. In this case, the sections other than the OS may be stored in a medium for distribution, or the sections other than the OS may be stored in a server device so as to be downloaded to a computer, for example.

Furthermore, among individual processes described in the above embodiments, all or a part of the processes described as being performed automatically may be manually performed, or the processes described as being performed manually can be performed automatically by known methods. In addition, the processing procedures, specific names, and information including various data and parameters illustrated in the above Literatures or drawings can be arbitrarily altered unless otherwise specified. For example, various types of information illustrated in each of the drawings are not limited to the information illustrated.

In addition, each of the components of each of the illustrated devices is provided as a functional and conceptional illustration and thus does not necessarily have to be physically configured as illustrated. That is, the specific form of distribution/integration of each of the devices is not limited to those illustrated in the drawings, and all or a part thereof may be functionally or physically distributed or integrated into arbitrary units according to various loads and use conditions.

Furthermore, the above-described embodiments can be appropriately combined within a range implementable without contradiction of processes. Furthermore, the order of individual steps illustrated in the sequence diagram or the flowchart of the present embodiment can be changed as appropriate.

Furthermore, for example, the present embodiment can be implemented as any configuration constituting a device or a system, for example, a processor as a large scale integration (LSI) or the like, a module using a plurality of processors or the like, a unit using a plurality of modules or the like, and a set obtained by further adding other functions to the unit, or the like (that is, a configuration of a part of the device).

In the present embodiment, a system represents a set of a plurality of components (devices, modules (components), or the like), and whether all the components are in the same housing would not be a big issue. For example, a plurality of devices housed in separate housings and connected via a network or the like, and one device in which a plurality of modules is housed in one housing, are both systems.

Furthermore, for example, the present embodiment can adopt a configuration of cloud computing in which one function is cooperatively shared and processed by a plurality of devices via a network.

11. CONCLUSION

As described above, according to an embodiment of the present disclosure, the communication control device 60 acquires information regarding a plurality of base station devices 40 using a predetermined frequency band (for example, a predetermined unlicensed band). Based on the acquired information, the communication control device 60 determines information regarding a medium reservation scheme for the plurality of base station devices 40 to share the predetermined frequency band. The communication control device 60 then notifies the base station device 40 of the information regarding the determined medium reservation scheme. The base station device 40 uses the predetermined frequency band based on the notified division related to the medium reservation scheme. This enables efficient medium reservation, leading to achievement of effective use of radio resources.

The embodiments of the present disclosure have been described above. However, the technical scope of the present disclosure is not limited to the above-described embodiments, and various modifications can be made without departing from the scope of the present disclosure. Moreover, it is allowable to combine the components across different embodiments and modifications as appropriate.

The effects described in individual embodiments of the present specification are merely examples, and thus, there may be other effects, not limited to the exemplified effects.

Note that the present technology can also have the following configurations.

(1)

A communication control device comprising:
 an acquisition unit that acquires information regarding one or more communication devices;
 a determination unit that determines a medium reservation scheme for the one or more communication devices to share a predetermined channel based on the acquired information; and
 a notification unit that notifies the communication device of the determined medium reservation scheme.

(2)

The communication control device according to (1), wherein the medium reservation scheme is a scheme in which a communication device on a reception side transmits a dedicated signal to a communication device on a transmission side for reservation of use of the predetermined channel, and the communication device on the transmission side performs radio transmission when having received the dedicated signal.

(3)

The communication control device according to (1) or (2), wherein the determination unit specifies a group of communication devices having a possibility of interfering with each other from among a plurality of the communication devices, and determines the medium reservation scheme for each specified group.

(4)

The communication control device according to (3), wherein, when there is a communication device that cannot be synchronized with another communication device in the group, the determination unit determines to adopt an asynchronous channel access scheme as a medium reservation scheme for the group.

(5)

The communication control device according to (3) or (4), wherein, when all communication devices in the group are communication devices capable of synchronization, the determination unit determines to adopt a synchronous channel access scheme as a medium reservation scheme for the group.

(6)

The communication control device according to (5), wherein the synchronous channel access scheme is a scheme in which a plurality of communication devices shares a channel by using a synchronization frame including at least: a determination period used by the communication device for medium reservation; and a channel occupancy time to be allocated to the communication device that has performed medium reservation.

(7)

The communication control device according to (6), wherein the notification unit notifies the communication devices in the group in which the synchronous channel access scheme is used of at least information regarding a reference time for synchronization.

(8)

The communication control device according to (7), wherein the notification unit notifies, as the information regarding the reference time, at least one of information regarding a start time of a baseline frame working as a synchronization reference, various types of time information in the baseline frame, or information regarding the number of frames following the baseline frame.

(9)

The communication control device according to any one of (6) to (8), wherein the notification unit notifies the communication device of information regarding a slot used for the medium reservation, the slot obtained by dividing the determination period by time division.

(10)

The communication control device according to (9), wherein the determination unit determines the number of slots to be included in the determination period based on an interference relationship between the communication devices in the group, and determines slot allocation to each of the plurality of communication devices in the group based on information regarding the determined number of slots.

(11)

The communication control device according to (10), wherein the determination unit allocates an identical slot to a plurality of communication devices that does not interfere with each other among the communication devices in the group.

(12)

The communication control device according to (10) or (11), wherein the determination period includes a plurality of the slots each having different priorities related to medium reservation, and the determination unit changes the allocation of the slots periodically or aperiodically.

(13)

The communication control device according to (12), wherein the determination unit allocates the slot having the highest priority to the plurality of communication devices by using a round-robin method.

(14)

The communication control device according to (12), wherein the determination unit determines the allocation of the slots based on communication statuses of the communication devices in the group.

(15)

The communication control device according to any one of (9) to (14), wherein a plurality of the slots included in the determination period includes a reserved slot left without being allocated to the communication device, and the determination unit allocates the reserved slot to a new communication device.

(16)

The communication control device according to (15), wherein a plurality of the reserved slots is prepared, and the notification unit notifies the new communication device to randomly use the plurality of the reserved slots.

(17)

The communication control device according to any one of (6) to (16), wherein a plurality of the synchronization frames includes a common frame used in common with another communication control device, the determination unit allocates the common frame to a predetermined communication device having an interference relationship with a communication device managed by the another communication control device among one or more communication devices under management, and the notification unit notifies the predetermined communication device to randomly use a plurality of slots included in the common frame.

(18)

A communication device comprising:
an acquisition unit that acquires, from a communication control device, information regarding a first medium reservation scheme for sharing a predetermined channel with another communication device managed by the communication control device;
a determination unit that determines a second medium reservation scheme for one or more communication devices under management to share the predetermined channel based on the acquired information; and
a notification unit that notifies the communication device under management of the determined second medium reservation scheme.

(19)
A communication device comprising:
an acquisition unit that acquires, from a predetermined communication device, information regarding a medium reservation scheme for sharing a predetermined channel with another communication device managed by the predetermined communication device; and
a reservation unit that reserves use of the predetermined channel based on the acquired information regarding the medium reservation scheme.

(20)
A communication control method comprising:
acquiring information regarding one or more communication devices;
determining a medium reservation scheme for the one or more communication devices to share a predetermined channel based on the acquired information; and
notifying the communication device of the determined medium reservation scheme.

(21)
A communication method including:
acquiring, from a communication control device, information regarding a first medium reservation scheme for sharing a predetermined channel with another communication device managed by the communication control device;
determining a second medium reservation scheme for one or more communication devices under management to share the predetermined channel based on the acquired information; and
notifying the communication device under management of the determined second medium reservation scheme.

(22)
A communication method including:
acquiring, from a predetermined communication device, information regarding a medium reservation scheme for sharing a predetermined channel with another communication device managed by the predetermined communication device; and
reserving use of the predetermined channel based on the acquired information regarding the medium reservation scheme.

(23)
A communication control program for causing a computer to function as:
an acquisition unit that acquires information regarding one or more communication devices;
a determination unit that determines a medium reservation scheme for the one or more communication devices to share a predetermined channel based on the acquired information; and
a notification unit that notifies the communication device of the determined medium reservation scheme.

(24)
A communication control program for causing a computer to function as:
an acquisition unit that acquires, from a communication control device, information regarding a first medium reservation scheme for sharing a predetermined channel with another communication device managed by the communication control device;
a determination unit that determines a second medium reservation scheme for one or more communication devices under management to share the predetermined channel based on the acquired information; and
a notification unit that notifies the communication device under management of the determined second medium reservation scheme.

(25)
A communication control program for causing a computer to function as:
an acquisition unit that acquires, from a predetermined communication device, information regarding a medium reservation scheme for sharing a predetermined channel with another communication device managed by the predetermined communication device; and
a reservation unit that reserves use of the predetermined channel based on the acquired information regarding the medium reservation scheme.

REFERENCE SIGNS LIST 1, 2, 1000 COMMUNICATION SYSTEM
10 RADIO WAVE UTILIZATION DEVICE
20 MANAGEMENT DEVICE
30 TERMINAL DEVICE
40 BASE STATION DEVICE
50 INTERMEDIATE DEVICE
60 COMMUNICATION CONTROL DEVICE
11 PROCESSING UNIT
12, 22, 32, 42, 52, 62 STORAGE UNIT
13, 23, 34, 44, 54, 64 CONTROL UNIT
21 COMMUNICATION UNIT
31, 41, 51, 61 RADIO COMMUNICATION UNIT
33 INPUT/OUTPUT UNIT
43, 53, 63 NETWORK COMMUNICATION UNIT
311, 411 RECEPTION PROCESSING UNIT
312, 412 TRANSMISSION PROCESSING UNIT
313, 413 ANTENNA
341, 441, 541, 641 ACQUISITION UNIT
342 RESERVATION UNIT
442, 542, 642 DETERMINATION UNIT
443, 543, 643 NOTIFICATION UNIT

The invention claimed is:
1. A communication control device. comprising:
an acquisition unit configured to acquire information regarding one or more communication devices;
a determination unit configured to determine a medium reservation scheme for the one or more communication devices to share a specific channel based on the acquired information; and
a notification unit configured to notify a communication device from the one or more communication devices of the determined medium reservation scheme.
2. The communication control device according to claim 1,
wherein the medium reservation scheme is a scheme in which a communication device on a reception side transmits a dedicated signal to a communication device on a transmission side for reservation of use of the specific channel, and the communication device on the transmission side performs radio transmission a reception of the dedicated signal.
3. The communication control device according to claim 1, wherein the determination unit is further configured to:
specify a group of communication devices having a possibility of interfering with each other from a plurality of the communication devices; and
determine the medium reservation scheme for the specified group.

4. The communication control device according to claim 3,
wherein, when there is a communication device that cannot be synchronized with another communication device in the group, the determination unit is further configured to determine to adopt an asynchronous channel access scheme as the medium reservation scheme for the group.

5. The communication control device according to claim 3,
wherein, when all communication devices in the group are communication devices capable of synchronization, the determination unit is further configured to determine to adopt a synchronous channel access scheme as the medium reservation scheme for the group.

6. The communication control device according to claim 5,
wherein the synchronous channel access scheme is a scheme in which the plurality of the communication devices shares a channel by using a synchronization frame including:
a determination period used by the communication device for medium reservation; and
a channel occupancy time to be allocated to the communication device that has performed medium reservation.

7. The communication control device according to claim 6,
wherein the notification unit is further configured to notify the communication devices in the group in which the synchronous channel access scheme is used of at least information regarding a reference time for synchronization.

8. The communication control device according to claim 7,
wherein the notification unit is further configured to notify, as the information regarding the reference time, at least one of information regarding a start time of a baseline frame working as a synchronization reference, various types of time information in the baseline frame, or information regarding the number of frames following the baseline frame.

9. The communication control device according to claim 6,
wherein the notification unit is further configured to notify the communication device of information regarding a slot used for the medium reservation, the slot obtained by dividing the determination period by time division.

10. The communication control device according to claim 9,
wherein the determination unit is further configured to determine a number of the slot to be included in the determination period based on an interference relationship between the communication devices in the group, and determines slot allocation to the communication devices in the group based on information regarding the determined number of the slot.

11. The communication control device according to claim 10,
wherein the determination unit is further configured to allocate an identical slot to a plurality of communication devices that does not interfere with each other among the communication devices in the group.

12. The communication control device according to claim 10,
wherein the determination period includes a plurality of the slot each having different priorities related to medium reservation, and
the determination unit is further configured to change the allocation of the slot periodically or aperiodically.

13. The communication control device according to claim 12,
wherein the determination unit is further configured to allocate the slot having the highest priority to the communication devices by using a round-robin method.

14. The communication control device according to claim 12,
wherein the determination unit is further configured to determine the allocation of the slot based on communication statuses of the communication devices in the group.

15. The communication control device according to claim 9,
wherein a plurality of the slot included in the determination period includes a reserved slot left without being allocated to the communication device, and
the determination unit is further configured to allocate the reserved slot to a new communication device.

16. The communication control device according to claim 15,
wherein a plurality of the reserved slot is prepared, and
the notification unit is further configured to notify the new communication device to randomly use the plurality of the reserved slot.

17. The communication control device according to claim 6,
wherein a plurality of the synchronization frames includes a common frame used in common with another communication control device,
the determination unit is further configured to allocate the common frame to a specific communication device having an interference relationship with a communication device managed by the another communication control device from the one or more communication devices under management, and
the notification unit is further configured to notify the specific communication device to randomly use a plurality of slots included in the common frame.

18. A communication device, comprising:
an acquisition unit configured to acquire, from a communication control device, information regarding a first medium reservation scheme for sharing a specific channel with another communication device managed by the communication control device;
a determination unit configured to determine a second medium reservation scheme for one or more communication devices under management to share the specific channel based on the acquired information; and
a notification unit configured to notify the communication device under management of the determined second medium reservation scheme.

19. A communication device, comprising:
an acquisition unit configured to acquires, from a specific communication device, information regarding a medium reservation scheme for sharing a specific channel with another communication device managed by the specific communication device; and
a reservation unit configured to reserve use of the specific channel based on the acquired information regarding the medium reservation scheme.

20. A communication control method comprising:
acquiring information regarding one or more communication devices;

determining a medium reservation scheme for the one or more communication devices to share a specific channel based on the acquired information; and notifying a communication device from the one or more communication devices of the determined medium reservation scheme.

* * * * *